United States Patent [19]

Sankpal et al.

[11] Patent Number: 5,157,608
[45] Date of Patent: Oct. 20, 1992

[54] ELECTRONIC CONTROL SYSTEM FOR MULTIPLE RATIO TRANSMISSION INCLUDING CIRCUIT PRESSURE CONTROL

[75] Inventors: Balaram G. Sankpal, Rochester Hills; John A. Daubenmier, Canton; Leonard J. Kurdziel, Westland; John F. Carnago, Trenton; Woodrow Lewis, Jr., Ypsilanti; Roy S. Williams, Plymouth, all of Mich.

[73] Assignee: Ford Motor Company, Dearborn, Mich.

[21] Appl. No.: 583,614

[22] Filed: Sep. 14, 1990

[51] Int. Cl.$^5$ ............... B60K 41/24; B60K 41/06
[52] U.S. Cl. .................... 364/424.1; 74/866
[58] Field of Search ............... 364/424.1; 74/866, 867, 74/868; 192/0.032, 0.033, 0.034

[56] References Cited

U.S. PATENT DOCUMENTS

| | | | |
|---|---|---|---|
| 3,855,880 | 12/1974 | Ishimaru et al. | 74/868 |
| 4,633,738 | 6/1987 | Timte | 74/869 |
| 4,653,350 | 3/1987 | Downs et al. | 74/864 |
| 4,665,770 | 5/1987 | Van Selous | 74/733 |
| 4,680,988 | 7/1987 | Mori | 74/866 |
| 4,707,789 | 11/1987 | Downs et al. | 364/424.1 |
| 4,833,946 | 5/1989 | Lemieux | 74/868 |
| 4,845,618 | 7/1989 | Narita | 364/424.1 |
| 4,868,753 | 9/1989 | Mori | 364/424.1 |
| 4,870,581 | 9/1989 | Ito et al. | 364/424.1 |
| 4,875,391 | 10/1989 | Leising et al. | 74/866 |
| 4,890,515 | 1/1990 | Taniguchi et al. | 74/866 |
| 4,896,565 | 1/1990 | Simonyi et al. | 74/731 |
| 4,899,624 | 2/1990 | Bota et al. | 74/868 |
| 4,918,606 | 4/1990 | Ito et al. | 364/424.1 |
| 4,919,012 | 4/1990 | Bolz | 74/866 |
| 5,020,391 | 6/1991 | Aoki et al. | 74/866 |

Primary Examiner—Parshotam S. Lall
Assistant Examiner—Collin W. Park
Attorney, Agent, or Firm—Roger L. May; Frank G. McKenzie

[57] ABSTRACT

A control system for an automatic transmission for an automative vehicle having a torque converter and a combustion engine including a microprocessor that is adapted to establish optimum control pressure levels for fluid pressure operated clutch and brake servos that effect gear ratio changes wherein provision is made for adjusting system pressures to maintain ratio shift quality in accordance with variations in a plurality of control sensor inputs including vehicle deceleration during ratio shifting and changes in the rate of change of converter turbine speed wherein optimum servo pressures are maintained following a ratio shift and during a ratio shift as torque capacity of one servo is reduced in synchronism with a torque capacity increase for a companion servo.

36 Claims, 36 Drawing Sheets

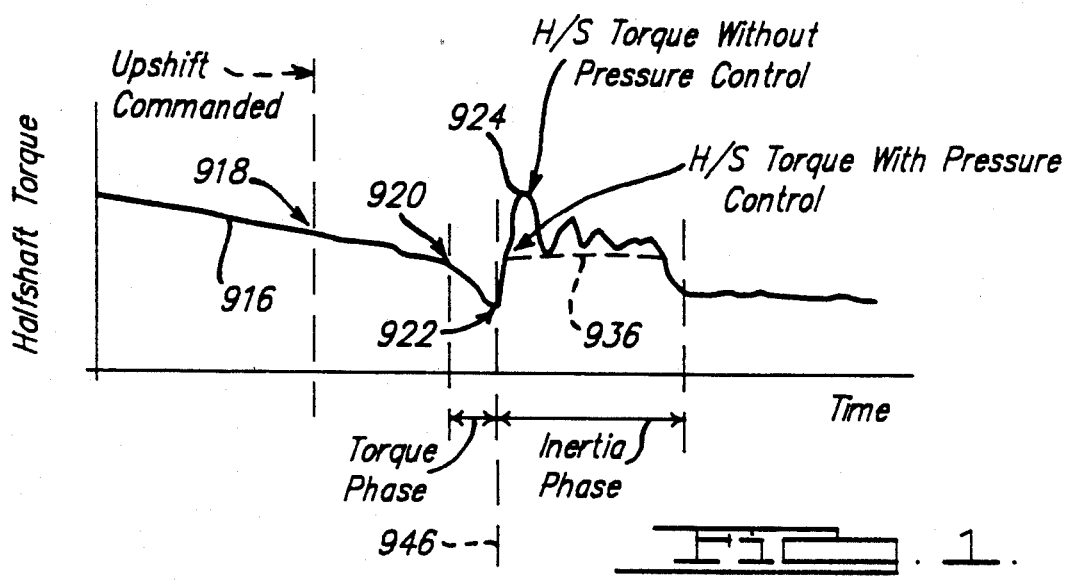
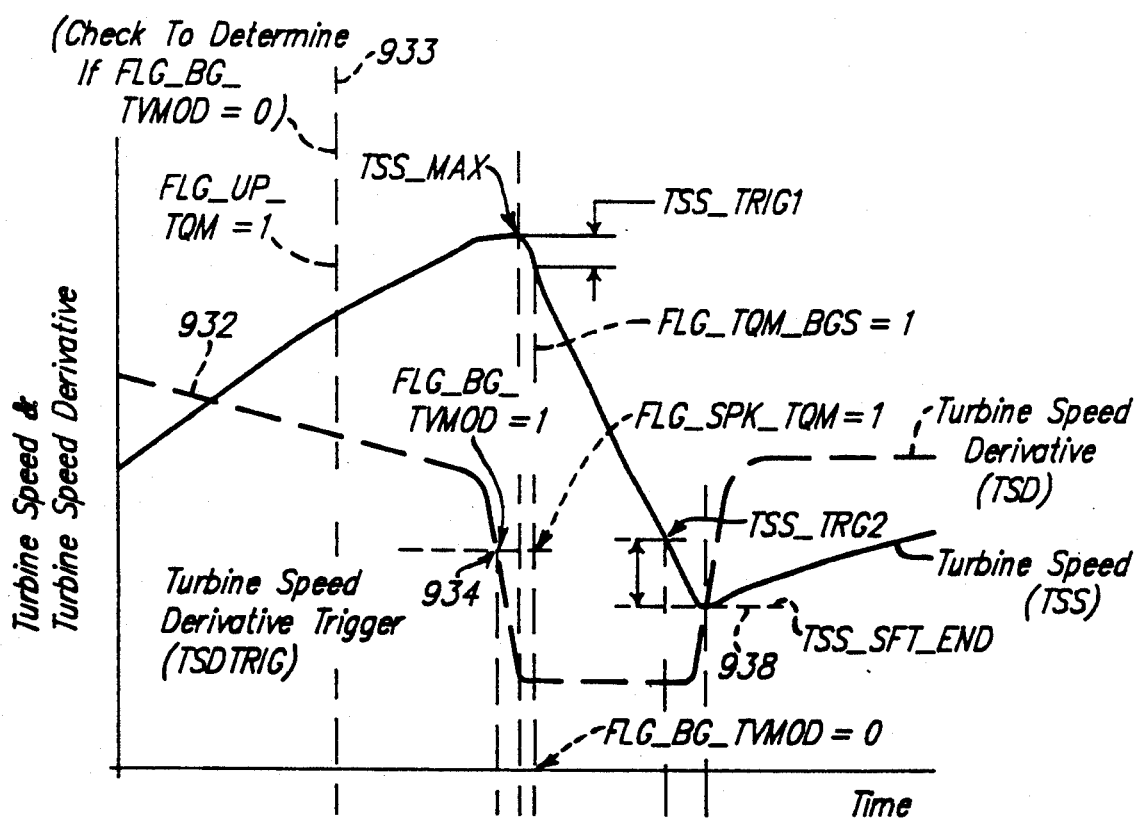

TV MODIFICATION FOR TEMPERATURE

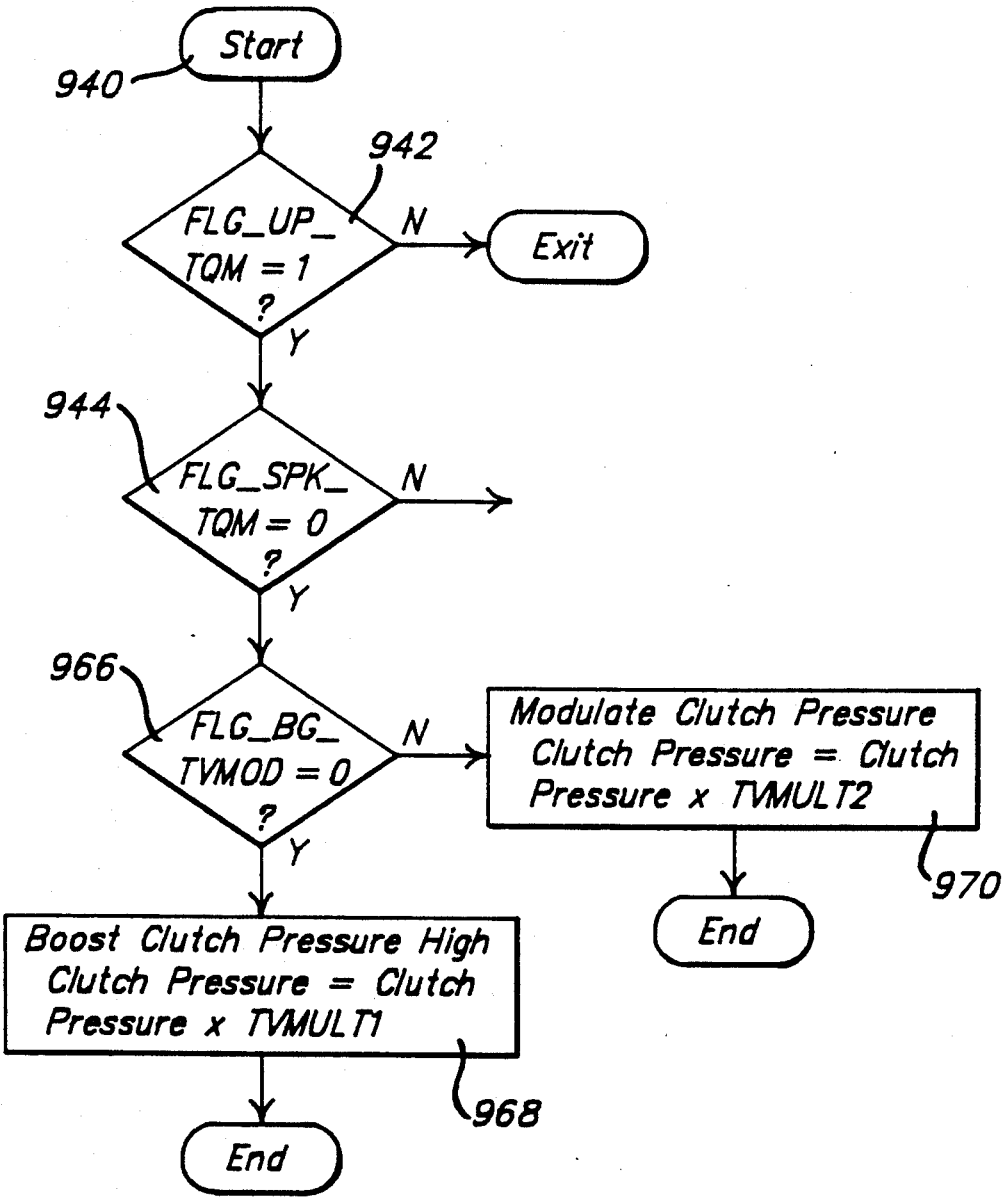

| Gear | Cl1 | Cl2 | Cl3 | Cl4 | B1 | B2 | Drive | | Coast | |
|---|---|---|---|---|---|---|---|---|---|---|
| | | | | | | | OWC 1 | OWC 2 | OWC 1 | OWC 2 |
| 1M | X | | X | | | X | X | | | X |
| 1D | X | | | | | X | X | | O/R | |
| 2 | X | X | | | | X | O/R | | O/R | |
| 3 | | X | X | | | | | X | X | |
| 4 | | X | X | X | | | | O/R | | O/R |
| R | X | | | X | | | X | | | X |

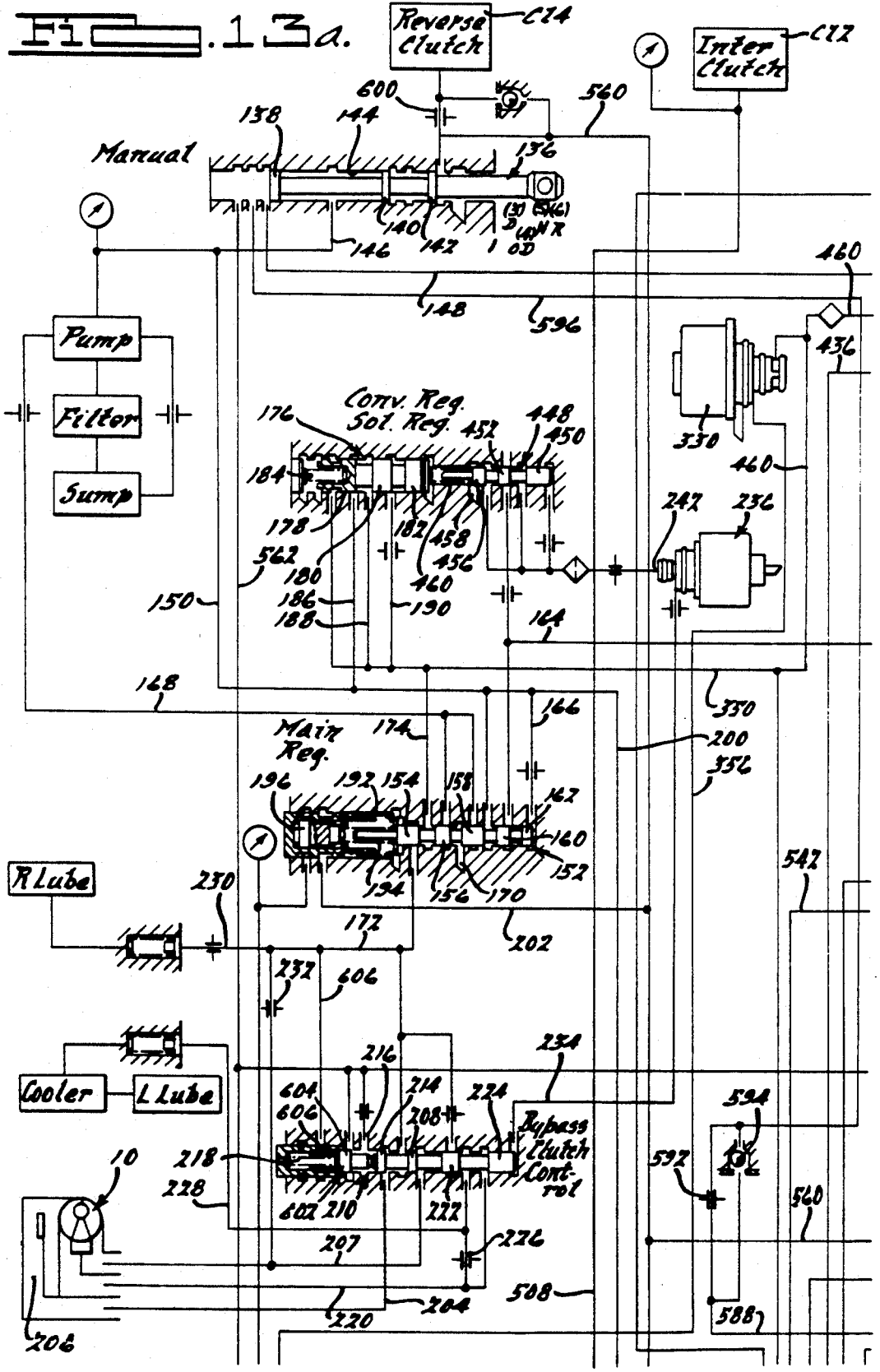

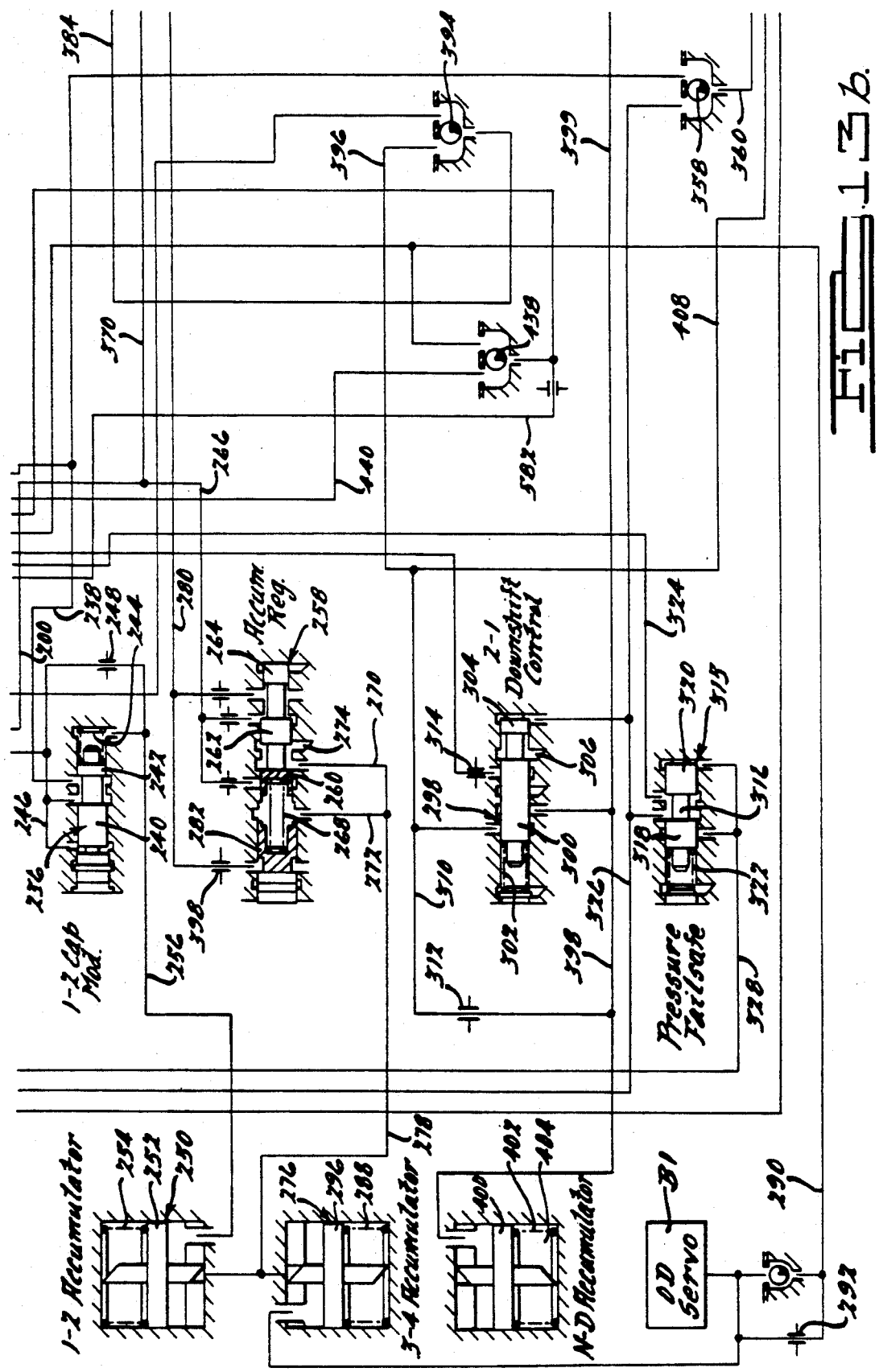

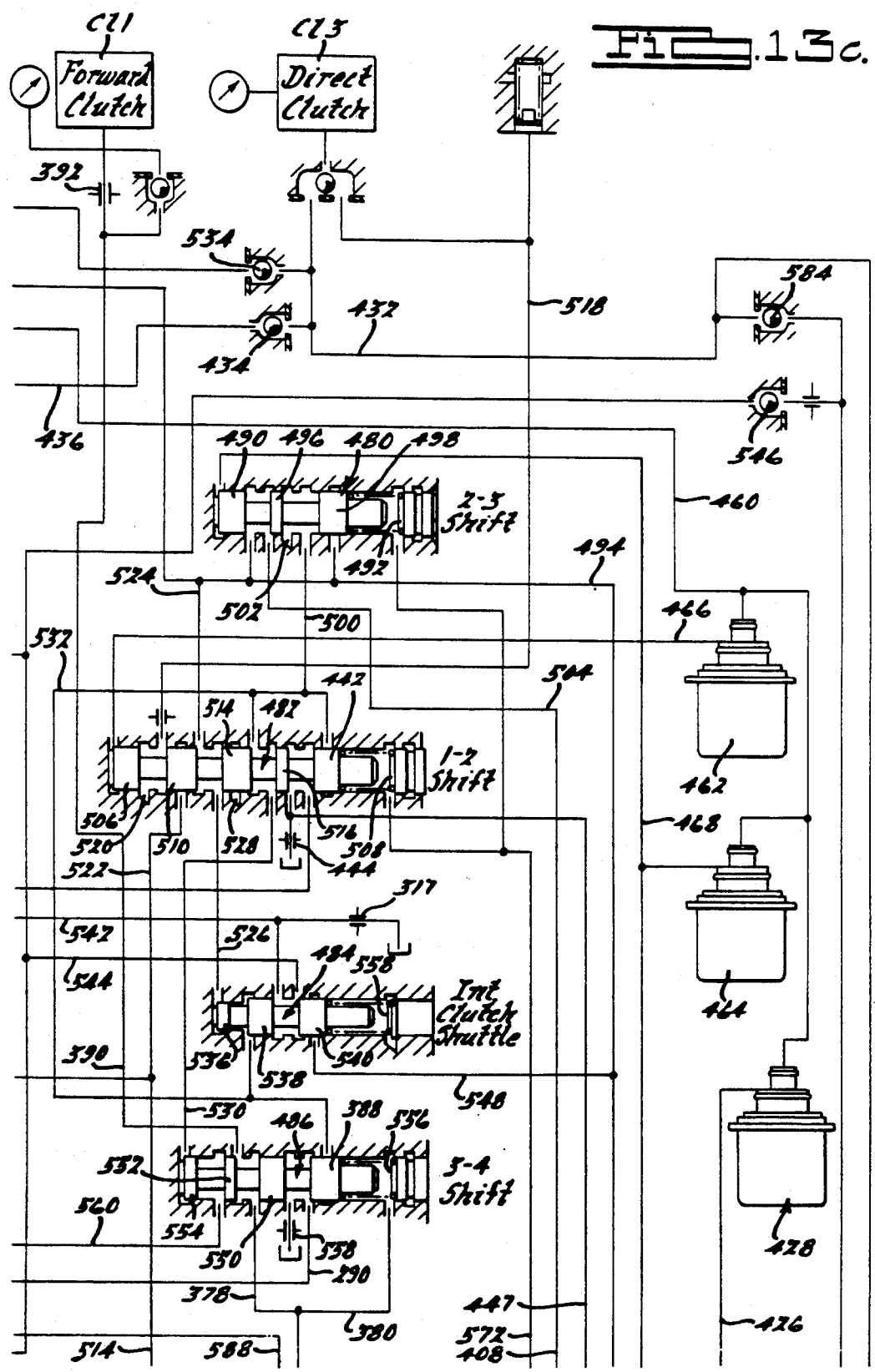

| PRNDL | OD CANCEL | GEAR | ENGINE BRAKING | SS1 | SS2 | SS3 |
|---|---|---|---|---|---|---|
| OD | OFF | 1 | NO | OFF | ON | OFF |
|  | OFF | 2 | YES | ON | ON | OFF |
|  | OFF | 3 | NO | OFF | OFF | ON |
|  | OFF | 4 | YES | ON | OFF | ON |
| 'D' | ON | 1 | NO | OFF | ON | OFF |
|  | ON | 2 | YES | ON | ON | OFF |
|  | ON | 3 | YES | OFF | OFF | OFF |
|  |  | 4 | NOT ALLOWED BY STRATEGY | | | |
| 1 |  | 1 | YES | OFF | ON | — |
|  |  | 2 | YES | OFF | OFF | — |
|  |  | 3 | NOT ALLOWED BY HYDRAULICS | | | |
|  |  | 4 | NOT ALLOWED BY HYDRAULICS | | | |
| R |  | R | NO | — | — | OFF |

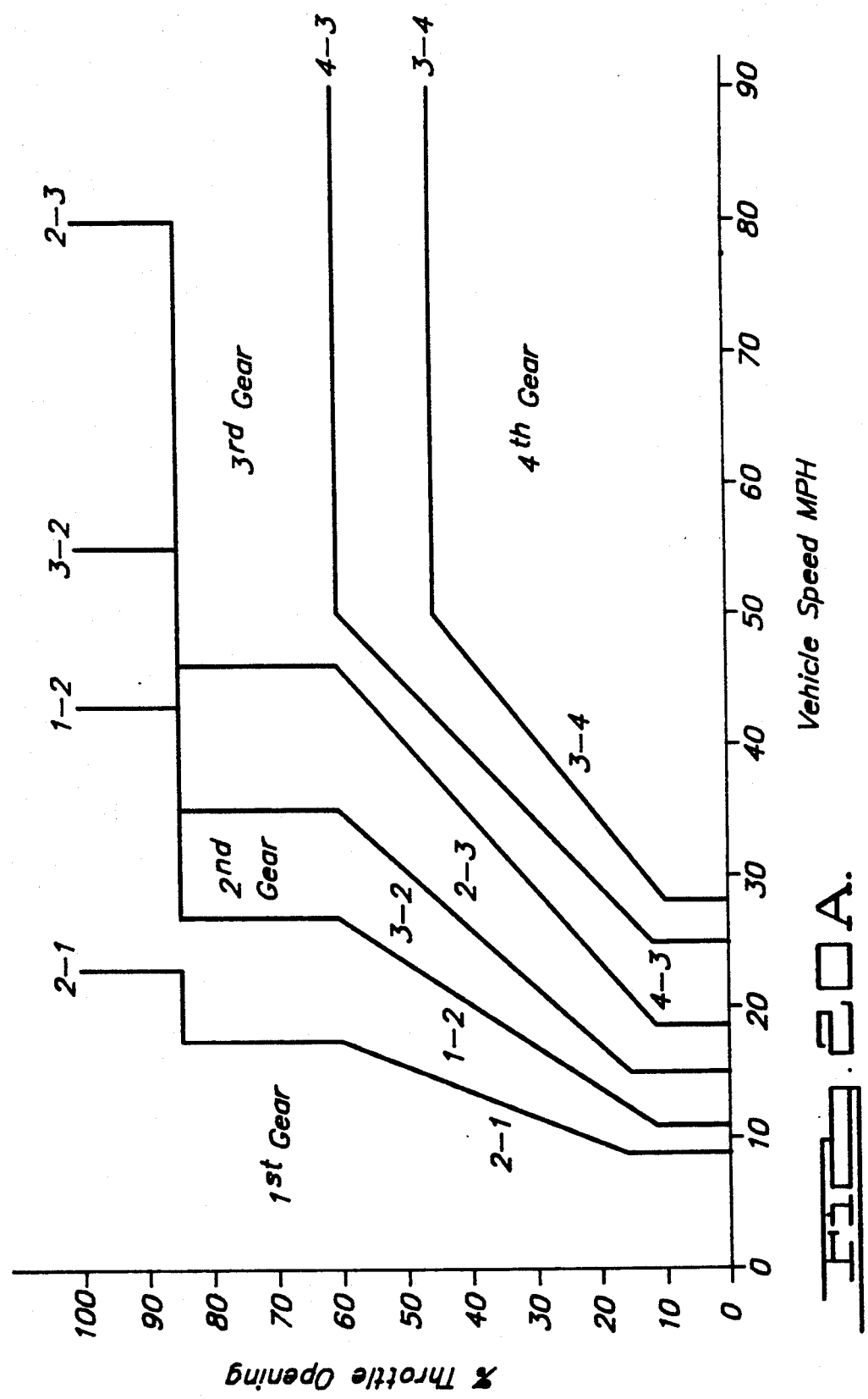

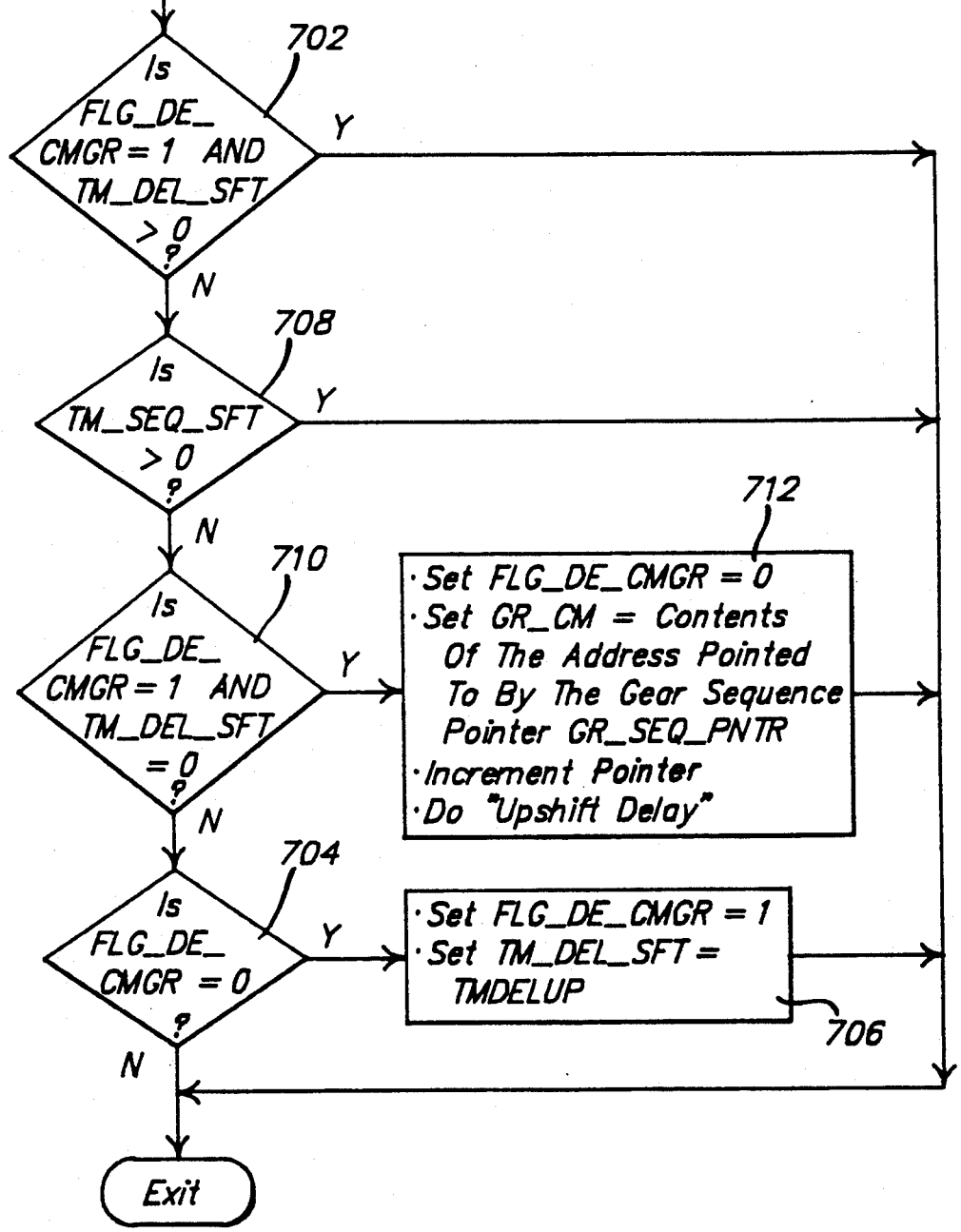

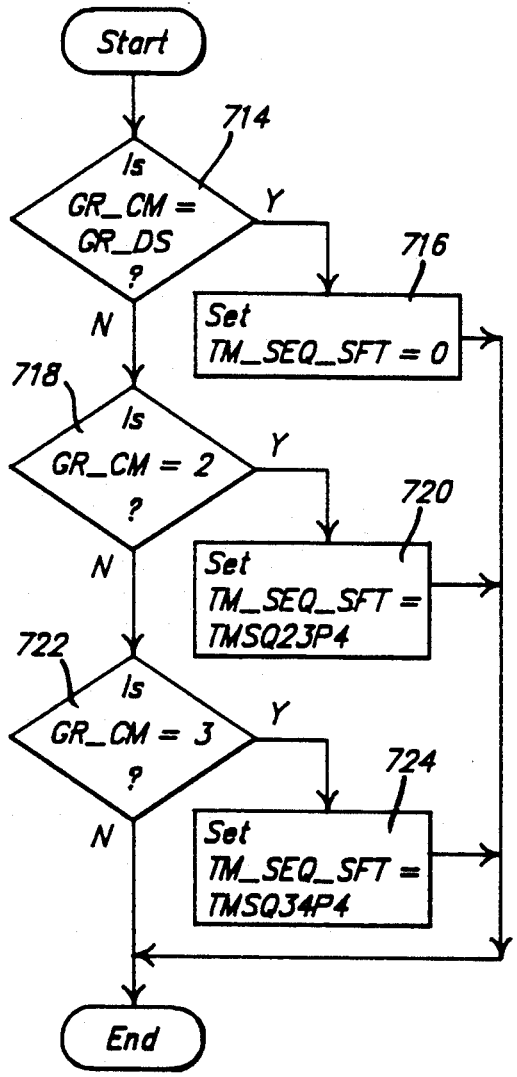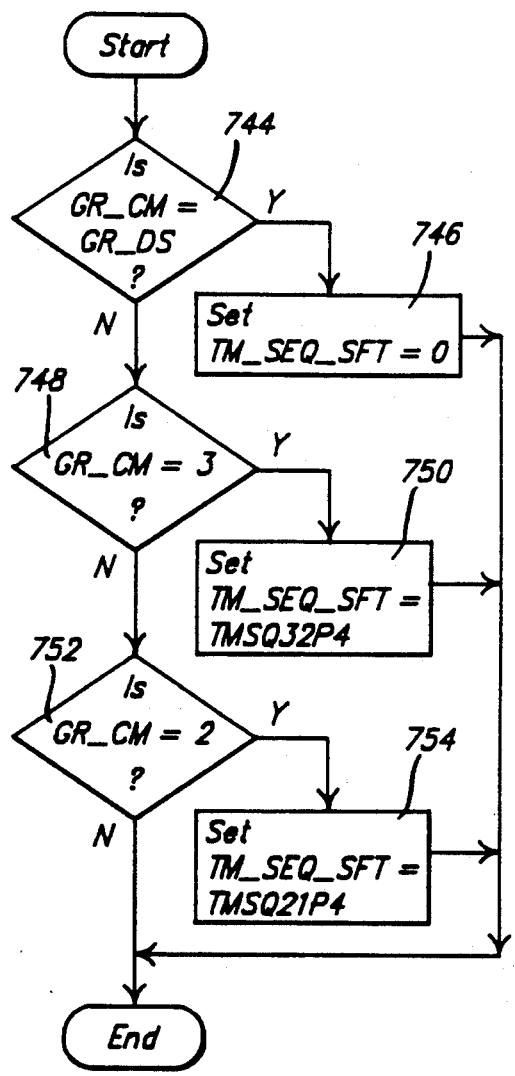
FIG. 26.
FIG. 27.

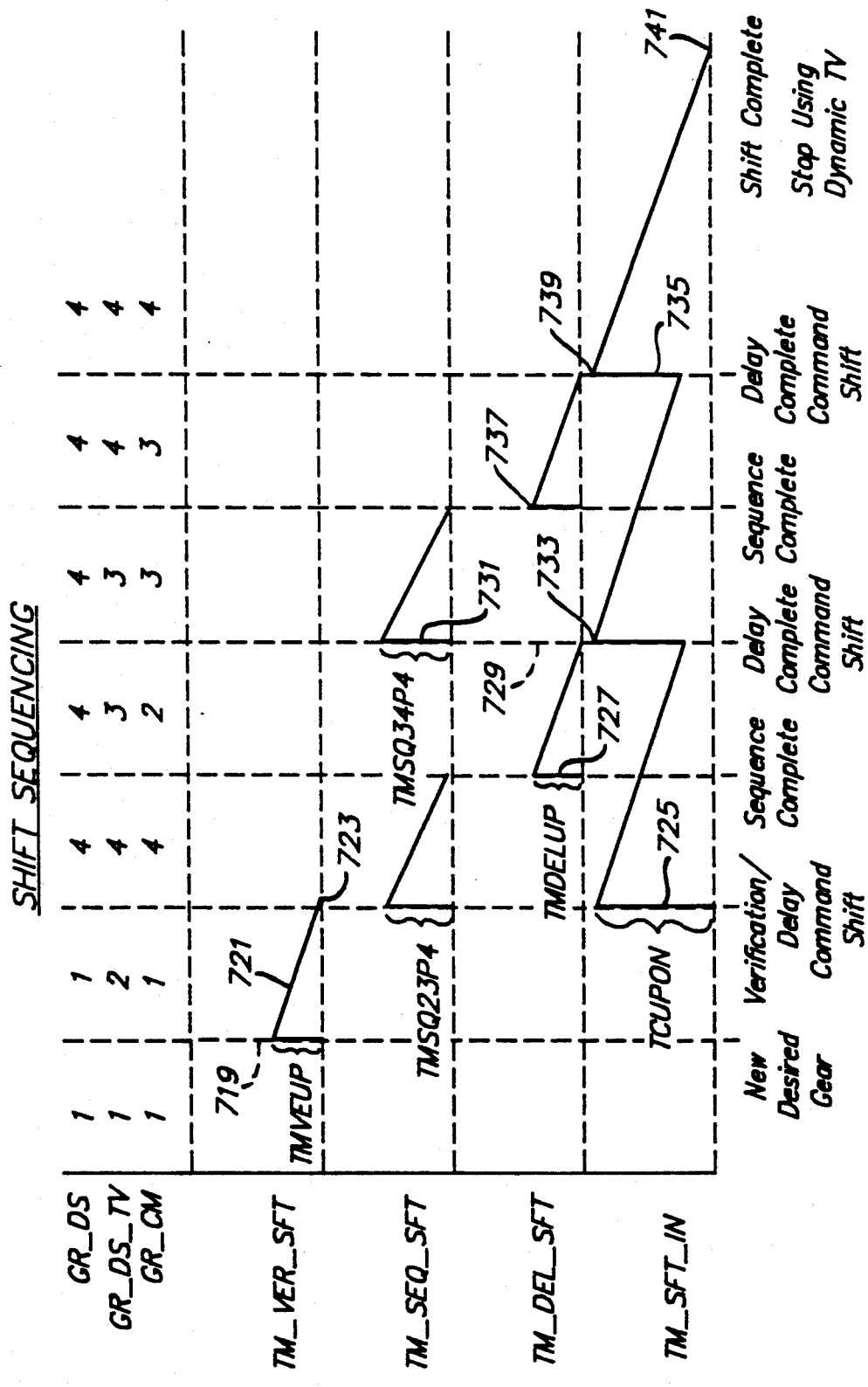

GR_SEQ_PNTR CALCULATION

| Desired Shift | GR_SEQ_PNTR (Pointer Address) | Cal Parameter Description | Possible Choices (Contents) |
|---|---|---|---|
| 1-3 | GR_SE_131<br>GR_SE_132 | First Step Of 1-3 Shift<br>Second Step Of 1-3 Shift | 2 Or 3<br>3 |
| 1-4 | GR_SE_141<br>GR_SE_142<br>GR_SE_143 | First Step Of 1-4 Shift<br>Second Step Of 1-4 Shift<br>Third Step Of 1-4 Shift | 2 Or 3 Or 4<br>3 Or 4<br>4 |
| 2-4 | GR_SE_241<br>GR_SE_242 | First Step Of 2-4 Shift<br>Second Step Of 2-4 Shift | 3 Or 4<br>4 |
| 3-1 | GR_SE_311<br>GR_SE_312 | First Step Of 3-1 Shift<br>Second Step Of 3-1 Shift | 2 Or 1<br>1 |
| 4-1 | GR_SE_411<br>GR_SE_412<br>GR_SE_413 | First Step Of 4-1 Shift<br>Second Step Of 4-1 Shift<br>Third Step Of 4-1 Shift | 3 Or 2 Or 1<br>2 Or 1<br>1 |
| 4-2 | GR_SE_421<br>GR_SE_422 | First Step Of 4-2 Shift<br>Second Step Of 4-2 Shift | 3 Or 2<br>2 |

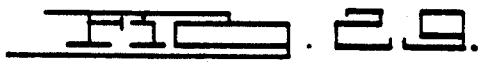

FIG. 29.

3-2 DOWNSHIFT SOLENOID STATES

| Downshift State | Solenoid 462 (SS1) | Solenoid 464 (SS2) | Solenoid 428 (SS3) | Clutch & Brake Response |
|---|---|---|---|---|
| Initial State | OFF | OFF | ON | 3rd Gear |
| 1st State | ON | OFF | OFF | Regulate Low & Int. Servo Apply |
| 2nd State | ON | ON | ON | Orifices 444 & 446 Control Dir. Cl. & LISR |
| 3rd State (Final) | ON | ON | OFF | Orifices 445 & 444 & 430 Control Dir. Cl. & LISR |

ELECTRONIC CONTROL SYSTEM FOR MULTIPLE RATIO TRANSMISSION INCLUDING CIRCUIT PRESSURE CONTROL

TECHNICAL FIELD

This invention relates generally to electronically controlled, multiple ratio vehicle transmissions and to a control circuit for establishing control pressures for optimum performance and ratio shift smoothness.

REFERENCE TO RELATED DISCLOSURES

This invention is related to the invention disclosed in patent application Ser. No. 583,921, filed Sep. 17, 1990, entitled "Electronic Shift Controls For A Multiple Ratio Transaxle", which is assigned to the assignee of this invention. It is related also to the invention disclosed in patent application Ser. No. 582,444, filed Sep. 14, 1990, entitled "Method And System For Improving Smoothness Of Upshifts In An Automatic Transmission", which also is assigned to the assignee of this invention.

BACKGROUND OF THE INVENTION

Our invention comprises improvements in pressure controls for an automatic transmission control valve circuit which is adapted to be used in an electronically controlled transmission for a vehicle with a throttle controlled engine. The circuit includes solenoid valves for controlling transmission shift valves to establish ratio changes so that the torque demand may be satisfied by the internal combustion engine to obtain optimum overall driveline performance while maintaining optimum fuel economy. The ratio changes and the operating pressure level in the control circuit are effected by solenoid valve operators that are under the control of an electronic microprocessor.

Other prior art transmission control systems use an engine throttle valve for establishing a torque signal (TV pressure) that is representative of the engine torque and a fluid pressure governor that is connected mechanically to a torque output member of the transmission for developing a signal that is representative of vehicle speed. In transmissions of this kind, ratio changes to effect desired driveline performance under varying operating conditions are made in response to these torque and speed signals. Examples of control systems of this kind are shown in U.S. Pat. Nos. 4,633,738 and 4,665,770.

Automatic transmissions of this kind normally include a hydraulic control valve system having clutch and brake servos that control relative motion of the planetary gear elements of the transmission to establish selectively in sequence multiple torque flow paths of differing ratios from the engine to the vehicle traction wheels.

A hydrokinetic torque converter is located between the engine and the torque input planetary gear elements. The converter multiplies engine torque during vehicle acceleration and acts as a hydrokinetic coupling during steady state operation. A lockup clutch is provided to bypass the converter during steady state operation in the highest speed ratio in a range of ratios selected by the operator that includes an overdrive ratio. The vehicle operator may select either of two automatic shift ranges, drive range "3" and overdrive range "4", the latter range having an overdrive ratio.

It is common practice also to use in the control system an engine-driven positive displacement pump under the control of a main pressure regulator, the latter responding to changes in the torque signal (TV pressure) made available by the throttle control valve so that the regulated pressure level in the control circuit will increase as torque increases. By controlling the magnitude of the circuit pressure in this way, the line pressure made available to the clutch and brake servos can be tailored during shifts and for other transient operating conditions to eliminate harshness in the engagement of friction torque portions of the clutch and brake servos, thereby reducing the level of harshness perceived by the occupant of the vehicle during normal shifting operations, during tip-in and tip-out shifting, and during ratio changes that occur during coasting and light throttle operation.

GENERAL DESCRIPTION OF THE INVENTION

Our invention is an improvement in known pressure control valve systems for automatic transmissions of the kind described in the preceding background discussion. Our improved control system controls the circuit pressure in the valve system in response to the control logic of an electronic processor to meet various operating conditions.

Electronic Pressure Control

The processor logic is established by independent logic modules that are calibrated for special purposes as will be described subsequently. For example, one module has special logic to effect maximum smoothness during start-up from a standing start as the clutch and brake servos are actuated for acceleration from a standing start or, for example, during a transition from a forward driving condition to a reverse driving condition which requires release of a forward torque delivery clutch or brake and the engagement of a reverse clutch or brake. Another module will establish a desired circuit pressure when the vehicle is coasting or when the vehicle is operated in a power-off mode and a shift is called for by the control logic. The circuit pressure is dependent upon engine torque as represented by throttle position, but the capacity of the clutches and brakes cannot be made solely dependent upon the throttle position since, under certain operating conditions such as high-speed coasting or power-on or power-off ratio changes, an augmented circuit pressure is required to avoid excessive friction element slipping.

Another module will determine the normal TV pressure that is required when a special condition such as start-up, coast boost or power-off shift is not present. The normal TV pressure calculation developed by this module will take into account the inertia torque resulting from a change in engine speed during a shift. It also takes into account the dynamic conditions which require modification of TV resulting from variations in engine speed during a shift.

Thus, the normal calculation for determining the torque proportional pressure, which herein is referred to as throttle valve pressure or TV pressure, will consist of both a static portion and a dynamic portion. The static TV portion is determined by the torque input to the transmission and compensates for various factors that affect the net torque such as the ambient pressure, accessory loads, etc. The dynamic portion of the TV calculation takes into account the inertia torque due to changes in rotary velocity of the engine and other rotating portions of the driveline during a shift. The dynamic portion is added to the static portion to obtain a total value that is representative of torque at any given instant. This corrected value is necessary in order to achieve optimum shift feel and to eliminate harshness that might be perceived by the passenger.

The static TV portion is calibrated by this normal TV calculation module for each gear. This requires a calculation of the effective torque, which is obtained by reading from a table stored in computer memory a value that is a function of engine speed and load, the latter being a measure of air charge. From that value, accessory losses are subtracted. The result of that subtraction is multiplied by the torque ratio of the torque converter which exists for each torque converter speed ratio, the speed ratio being a ratio of the turbine speed to the engine speed.

The calculation in this module will determine, for each gear, the slope of the functional relationship between static TV pressure and the static torque. During a shift, the dynamic torque is added to the input torque prior to the multiplication by the converter torque ratio. A different shifting slope constant is used for each gear. The dynamic TV pressure portion is added to the static portion of the throttle valve pressure during a shift.

Part of the pressure control strategy includes modulation of the clutch pressure during an upshift to improve smoothness during the shift. This involves using a converter turbine speed derivative to trigger a pressure drop so that the capacities of the clutch and brake servos are temporarily reduced to a level that will contribute to maximum smoothness but which will be sufficient to maintain adequate torque transfer capacity during the shift interval. The ability of the clutches and brakes to transmit torque depends, of course, on the level of the pressure maintained in the control circuit by the main pressure regulator. This control is unlike TV pressure controls of conventional transmissions which rely upon mechanical throttle valve linkages to maintain a desired throttle valve pressure or a vacuum diaphragm which is actuated by engine intake manifold pressure. The TV control in the present design is achieved by a variable force solenoid valve that responds to a signal developed by the electronic microprocessor. Electronic TV strategy for the processor includes the step of looking up engine torque from a table and varying appropriately the signal delivered to the variable force solenoid to adjust the torque transmitting capacity of the transmission.

The static capacity, which as mentioned previously is one of the components of the throttle valve TV pressure, is equal to the throttle valve pressure required to hold the weakest friction element because of engine combustion torque (torque net) and inertia torque (TQ_IALPHA) during a shift. When a shift is not occurring, the capacity is equal merely to static capacity. The sum of the two torque components is multiplied by the torque converter torque ratio to obtain the total torque capacity requirements (TV_STAT). Adjustments to the static torque are made by determining the dynamic TV, as explained previously, in order to obtain the desired shift feel, adjustments for rapid "tip-in shifts" and to counteract for the lag time required for the variable force TV solenoid to respond.

According to a further feature of this invention, the throttle valve pressure may be modified during a shift by retarding the engine spark at the proper instant. Throttle valve pressure is determined by a throttle valve module (TV-GUIDE) once every background loop, which may be as long as 100 milliseconds. However, a throttle valve pressure modification may occur at the beginning of a shift without waiting for the full 100 millisecond background loop to be completed. The so-called TV-GUIDE module in these circumstances will be executed as the next sequence. At initiation of a shift, an engine ignition spark retard may be called for, but this occurs during a 100 microsecond foreground loop as distinct from the 100 millisecond background loop. A delay between this spark retard and the execution of the TV-GUIDE module should be avoided so that these events occur at the same time whereby the TV pressure may be allowed to drop before a rise of inertia torque, which might be felt by the vehicle operator.

When an upshift is commanded, the torque transmitted is transferred from one friction element to another. During the torque transfer, the driven torque will be increased during the so-called inertia phase following a decrease of driven torque during the preceding torque phase of the shift. Provision is made for retarding the spark at the beginning of the inertia phase, and the TV-GUIDE module routine will be executed before any other module is addressed in the background loop. The normal sequencing thus is interrupted in order to permit the TV reduction to occur immediately.

According to another feature of the invention, the clutch pressure is modulated during an upshift, as mentioned above, by using a turbine speed derivative to trigger the pressure drop. This will avoid an undesirable rapid rise in output shaft torque during a transfer from the torque phase of the shift to the inertia phase, especially during heavy throttle upshifts. The shift smoothness is improved by quickly boosting the clutch pressure at the beginning of the shift. Just before the torque phase is completed, the pressure is lowered by using a multiplier which is derived from a table stored in computer memory so that the initial output shaft torque increase at the beginning of the inertia phase will be reduced. The end of the torque phase is anticipated or predicted by monitoring the turbine speed and taking the derivative of the turbine speed and comparing that derivative with a so-called trigger value, which also is stored in an adaptive table in memory.

According to another feature of the invention, the coasting 3-2 downshift shift quality is improved by using a signal that is dependent upon the rate of change in vehicle speed or deceleration to modify the TV pressure that normally would be available to the friction elements during a 3-2 downshift. As will be explained subsequently, it is desirable to provide synchronous operation of the clutch and brake elements during the 3-2 downshift to avoid harshness in the shift. It is desirable also to provide for application of the intermediate speed ratio brake band at a synchronous speed as the direct drive clutch becomes released. If the vehicle is braking, it becomes necessary to decelerate the engine and rotating elements in the driveline to achieve synchronism at a rate that is faster than the rate that would exist if the vehicle deceleration were less. For example, if the vehicle were not being braked, it would not be necessary to apply the intermediate speed ratio band so quickly. The faster the vehicle is braked or decelerated, the quicker the band should be applied in order to avoid harshness in the shift. We have achieved this feature by providing for an increase in throttle valve pressure during a closed throttle 3-2 downshift by utilizing vehicle deceleration as one of the input variables for the processor.

During coasting or zero throttle downshifts, the shift quality can be improved further by tailoring the normal 3-2 downshift control to take into account the vehicle deceleration during the downshift. As will be apparent from the description of the gearing for the transmission appearing later in this specification, the 3-2 downshifts are particularly sensitive to dynamic torque changes due to changes in angular velocity of the clutch and brake members involved in the downshift. During operation in direct drive, the brake drum for the low-and-intermediate torque reaction brake rotates in a first direction, but its rotation slows after the downshift begins and the direct drive clutch looses capacity. Later in the downshift, the drum will come to a stop. If at that instant the downshift is not sufficiently advanced to permit the intermediate brake to become applied, the drum will begin to rotate in the opposite direction after coming to a stop.

In view of the behavior of the brake drum during a downshift, it is important for the brake to become applied approximately at the instant that the drum stops or perhaps slightly before that instant. Otherwise, undesirable shift harshness will occur.

In order to improve the downshift quality on a 3-2 coasting or zero throttle downshift, the control strategy will take into account the vehicle deceleration by modifying the normal 3-2 downshift control function so that the downshift will be called out sooner if the vehicle is decelerating at a higher rate than would be the case of a zero throttle downshift with soft deceleration.

The Processor

The processor is an integrated central processor which converts signals such as the signals from a vehicle speed sensor and an engine throttle position sensor, engine temperature sensor, turbine speed sensor and the manual selector lever, into electrical signals for the shift solenoid valves, the solenoid valve for the converter bypass clutch and the variable force solenoid for the throttle valve pressure (TV valve). The processor receives the sensor signals and operates on them in accordance with programmed control strategy, which will be described. The processor includes appropriate gates and driver circuits for delivering the output that results from the operation of the strategy to the hydraulic control valve body for the transmission.

The processor includes a central processor unit (CPU) having a memory in which the program strategy is stored and a control unit that includes a read-write memory or RAM (random-access memory) and internal busses between the memory and the central processor arithmetic logic unit.

The processor executes programs that are obtained from the memory and provides the appropriate control signals to a valve circuit as the input signal conditioning portions of the processor reads the input data and the computation logic portions deliver the results of the computation to the output driver system under the program control.

The memory includes both a random-access memory (RAM) and a read-only memory (ROM) which stores the information that comprises the control logic. The result of the computations carried out on the input data is stored in the RAM where it can be addressed, fetched, erased, rewritten or changed, depending upon the operating conditions of the vehicle. The CPU portions that perform the computations comprise an integrated circuit distinct from the microprocessor chip that comprises the memory portions. The memory and the CPU computation portions are connected by internal bus and interface circuitry.

Data may be read from a first memory location as the processor seeks an instruction from the memory. The fetched data is then fed into a data register or storage area and then to an instruction decoder. When an instruction is to be carried out, the data that is fetched is transferred to an arithmetic logic unit. Then sequentially, pursuant to instructions in the instruction decoder, other data may be fetched from memory and fed into the data registers. The data may be a shift time delay value, for example, and may be stored in an accumulator until it is addressed during the sequencing of the processor.

Also sequentially, the data in the accumulator may be transferred to the data register and then fed back into memory and stored in the next memory location within the random access memory where it may be addressed during the next background loop.

The data that is stored in memory may, for example, be shift schedule information or functions in which two variables such as throttle position and vehicle speed are related one to the other in accordance with a shift function. The data also may be in the form of information in a table containing three variables or data such as a timer value and values for the other two pieces of data or variables.

The control strategy for the transmission is divided into several routines or control modules which are executed sequentially in known fashion during each background pass. The strategy for each module is executed furthermore in sequential fashion, just as the modules themselves are executed in sequential fashion. The various data registers are initialized as input data from the previously mentioned sensors are introduced into the input signal conditioning portion of the processor. The information that results from the inputting of the sensor data, together with information that is stored in memory and learned from a previous background pass, is used to carry out the control functions of the shift solenoid valves, the throttle pressure solenoid valve, and the bypass clutch solenoid valve. The modules and sub-modules are executed in sequence in each background loop. Each module or logic portion is independent of the others and performs a specific function. They are executed as they are separately addressed by the processor pointer. These functions occur after the input signals are received by the input gates and the signal conditioning portions of the processor and after the input signal conditioning has occurred.

Shift Controls

In the case of the shift control modules, the four main modules are the PRNDL Based Desired Gear Determination module, the PRNDL Based Commanded Gear Determination module, the Load Shift and Progress Timer module, and the Determine Shift Solenoid States module.

The PRNDL Based Desired Gear Determination module is divided into three sub-modules called the GR_DS_PRNDL=3 or 4 sub-module, GR_SEQ_PNTR calculation sub-module, and the Delay Verify Shift sub-module.

The second main module, namely, the PRNDL Based Command Gear Determination module, has four sub-modules which are identified as the GR_CM,PRNDL=1 Logic sub-module, the GR_CM,PRNDL=2 Logic sub-module, GR_CM,PRNDL=3 or 4 Upshift Logic sub-module, and the GR_CM,PRNDL=3 or 4 Downshift Logic sub-module.

The PRNDL Based Desired Gear Determination module determines the gear that the transmission should assume to satisfy a given set of steady state operating conditions. For example, it will choose the appropriate gear or the "desired gear" for certain throttle openings and vehicle speeds and for a given road load, but it will change if any of the prevailing conditions should change. If the selector and lever PRNDL position is manual 1, the desired gear is set to 1.

If the manual lever PRNDL is in neutral, the desired gear is set to 3 when the vehicle is coasting at a relatively high speed. This will avoid harshness if the manual lever is subsequently moved to the drive position during such a coasting maneuver. On the other hand, if the vehicle speed is low or the vehicle is stopped when the transmission is shifted to neutral, the desired gear is 1 and the output of this module then will be 1. This sets the shift solenoids to the appropriate states to achieve that gear ratio.

If the manual lever is placed in the overdrive position or the 3 position (overdrive cancel), then sub-module GR_DS,PRNDL=3 or 4, the GR_SEQ_PNTR calculation sub-module, and the Delay Verify Shift sub-module are executed. If a vehicle shift is taking place at this time, the sequence will be interrupted.

The sub-module GR_DS_PRNDL=3 or 4 has a sub-routine that selects the desired gear using stored information based upon vehicle speed and throttle position. The desired gear is set to the next higher gear if the engine speed is greater than the sea level wide-open throttle engine upshift speed for the current gear.

The next module is the Delay Verify Shift Module. If a change occurs in the desired gear, this module will delay a change to that gear until a new desired gear has been present a sufficient length of time to verify that a shift is appropriate. For example, if the shift is the result of a transient condition that begins and ends during a time less than the time required for a delay timer to expire, a change in desired gear will not occur. Further, the delay will permit the new desired gear to be delayed by a time that is determined by a sub-module called "Load TM_VER_SFT for Upshifts", which determines the delay time required to verify that an upshift should be made. If a fast "backout" rate is detected during this routine, for example, the time required to verify a tip-out upshift is used. Otherwise, the time required to verify a normal upshift is used.

Next, the processor addresses the module called GR_SEQ_PNTR which carries out a gear sequence calculation. This module determines how multi-step shifts will be sequenced based upon a series of calibration parameters. Each step of every multi-step shift has a calibration parameter that is unique to it. For example, if the current gear is 1 and the desired gear is 4, a 1-4 upshift is called for. There are three calibration parameters; namely, GR_SEQ_141, GR_SEQ_142, and GR_SEQ_143 to determine which gear to command during each step of the shift. This will result in a 1-2-3-4 shift, a 1-2-4 shift, a 1-3-4 shift, or a 1-4 shift.

The next main routine is carried out by the PRNDL Based Commanded Gear Determination module which determines which gear should be commanded. If the range selector (PRNDL) is in the manual low position, the GR_CM,PRNDL=1 logic is executed. If the PRNDL is in 3 or 4 and an upshift is desired, the GR_CM,PRNDL=3 or 4 upshift control logic is executed. If the manual lever PRNDL is in 3 or 4 and a downshift is desired, GR_CM,PRNDL=3 or 4 downshift logic is performed. If PRNDL is in neutral and vehicle speed is high, the commanded gear is set to 3, as explained previously. Otherwise, the PRNDL, when in neutral, commands the gear to be set at 1.

The GR_CM,PRNDL=1 module (Gear Command) determines the commanded gear when the range selector (PRNDL) is in manual low. Downshifts are scheduled based upon vehicle speed, and no upshifts are allowed. The downshifts are sequenced with a minimum amount of time spent in each gear, and those times are determined by calibratable sequence timers. If manual low is selected, for example, and the vehicle speed is low, the shift will be sequenced through the third and second gears from the fourth gear as the transmission is conditioned for operation in the first gear. A unique calibratable sequence time is used for each step of such a multiple-step downshift.

The next sub-module that is executed in this routine is the GR_CM,PRNDL=3 or 4 upshift module (Gear Command). This sub-module determines the commanded gear when the range selector (PRNDL) is in 3 or 4 and an upshift is desired. If a single step upshift is desired, the commanded gear is set to the desired gear. If a multi-step upshift is desired, the commanded gear is set to the first step of the multiple ratio shift, as determined by the calculation of the GR_SEQ_PNTR calculation sequence. Again, shifts from one step to another are delayed by the sequence time determined by the upshift delay logic.

The upshift delay logic is a routine executed by the sub-module that determines the time that should be spent in each gear before the next step of a multiple step upshift can be executed. If an upshift from the second gear to the third gear is desired, the sequence time for that shift must expire before the upshift can be completed. If the current gear is 3, the sequence timer is set to a new value before the execution of the 3-4 shift can be completed.

Following completion of the logic steps for an upshift, the GR_CM,PRNDL=3 or 4 Downshift (Gear Command) module will address the downshift delay logic and will execute it if it is called for. This module determines the time that must be spent in each gear before the next step of a multi-step downshift can be executed. In this respect, its function is similar to the upshift delay logic function described previously. If the current gear is 3, the sequence timer is set to the sequence time before the execution of the 3-2 shift. If the current gear is 2, the sequence timer is set to the sequence time before the execution of the 2-1 shift.

Each time a new gear is commanded, the Load Shift In Progress Timer module loads a unique time into the shift in progress timer. Calibration constants are provided for power-on upshifts, power-off upshifts, power-on downshifts, power-off manual downshifts, and power-off automatic downshifts. This timer must count down to zero before the PRNDL Based Desired Gear Determination module will begin its execution for a new desired gear while the range selector (PRNDL) is in 3 or 4.

If the transmission has been in park or neutral, the 3-2 downshift and the shift solenoid states are determined by the 3-2 downshift control logic. Otherwise, during normal operation, the shift solenoid states are set according to the commanded gear and the range selection (PRNDL) position. If conditions call for execution of the 3-2 downshift control logic, the Determine Shift Solenoid States module will control the shift solenoid state during a 3-2 downshift. For power-on 3-2 downshifts, the delay is determined as a function of the input of vehicle speed and throttle position. This delay is obtained from a table stored in memory. If the 3-2 downshift is a power-off downshift, a separate power-off 3-2 control logic is executed as it controls the states of the shift solenoids.

Normal Upshifts When Manual Lever (PRNDL)=3 or 4

A general description of the shift logic for normal upshifts now will be made. That will be followed by a general description of the shift logic for normal downshifts. These are examples of how the control logic will react to various changes in the operating conditions that are encountered during a typical driving maneuver with the driver-controlled manual range selector valve (PRNDL) in 3 or 4.

A check is made by the processor for an appropriate vehicle speed controlled upshift. All schedules for upshifts into the higher ratios are checked and the desired gear is set to the highest gear that is allowed by the shift schedules. If the vehicle speed is higher than the upshift function for throttle position corrected for altitude and other variables, then an upshift is commanded.

The new desired gear is not allowed to pass through to the commanded gear module until the upshift timer has run down. This delay is achieved by the previously mentioned logic called "Delay/Verify Shift Logic". When the new desired gear is passed through to the PRNDL Based Commanded Gear Determination module, the GR_CM,PRNDL=3 or 4 logic is executed. In that case, if this is the first execution of the logic, the commanded gear is set to the desired gear. If this is a single step shift, that logic then is finished. If it is a multiple-step shift, a new sequence timer is loaded to effect a shift delay time for that part of the multiple-step shift. Similar delay times are introduced for each other step of the multiple-step shift. When all of the delays are completed, the commanded gear is set to the gear for the final step of the shift.

If the desired gear is one greater than the current gear, a single-step shift is desired. If it is more than one greater than the current gear, a multiple-step shift is desired. The previously mentioned calculation called "GR_SEQ_PNTR Calculation" will determine the first step of the shift. If the shift is a tip-out shift, which results from a quick relaxation of the engine throttle, the new desired gear value is not allowed to pass through to the commanded gear module until the tip-out upshift verification time has passed. Thus, a timer will prevent continuation of the logic until the tip-out upshift verification time has elapsed.

If the upshift desired is not a tip-out upshift, the new desired gear is not passed to the commanded gear module until the upshift verification timer for that upshift has expired. When that occurs and the shift delay is over, the commanded gear is set to the gear for the second step of a multiple-step shift. If still another step is required to complete the shift sequence, the shift sequence timer for the next step is loaded and a second delay, independent of the first, delays the next step. When that shift sequence time is expired, the commanded gear is set to the gear for the final step of the multiple-step shift.

Normal Downshifts PRNDL=3 or 4

If there is no shift in progress, then a check is made to see if there is a new desired gear. The processor checks all schedules for downshifts into lower gears and sets the desired gear to the lowest gear allowed by the shift schedules. As in the case of upshifts, if the desired gear is one less than the current gear, the commanded gear is set to that desired gear. If the desired gear is more than one less than the current gear, the GR_SEQ_PNTR calculation determines the first step of the shift. Each step of the shift has an independent calibration constant.

If the downshift is a 3-2 downshift, a logic called "Determine Shift Solenoid States" will control the feel of a 3-2 downshift by timing the movement of the 1-2 shift valve and the 2-3 shift valve, thus determining the timing of the exhaust of the direct clutch and the application of the low-and-intermediate brake band. If the downshift is a power-off 3-2 downshift, the sequence times are different than in the case of a power-on 3-2 downshift, the latter sequence times being read from a 3-2 downshift table containing the functional relationship between timer value, vehicle speed and throttle position. The table contains timer values for various throttle positions and for various vehicle speeds. If the time that is read from the table is at a first value, the shift solenoids are actuated in a first operating sequence to effect a ratio change to second gear. If the time read from the table is at a different value, the shift solenoids are actuated in a second operating sequence and a different calibrated time elapses before a ratio change to second gear operation occurs.

As explained previously, one of the input variables that is used during a downshift from the third ratio to the second ratio with minimum or closed throttle is a vehicle deceleration value. This will force the throttle pressure to be increased during rapid deceleration so that the desired transmission clutch pressure will be increased when the vehicle deceleration is increased, thus forcing the intermediate speed ratio brake band to be applied sooner than otherwise would be the case.

BRIEF DESCRIPTION OF THE DRAWINGS

FIG. 1 is a chart showing the relationship between output shaft torque and shift duration during an upshift as friction torque is transferred from one friction element to another following an upshift command.

FIG. 1A is a chart showing the relationship between turbine speed and turbine speed derivative and the shift time during an upshift as torque is transferred from one friction element to another.

FIG. 6 is a graph showing a typical relationship between dynamic TV and relative throttle position.

FIG. 8D is a flow chart of the background logic for determining which of the two clutch pressure calibration multipliers should be used to modify clutch pressure during a shift.

FIGS. 13a, 13b, 13c and 13d show a hydraulic valve system that responds to the control signals developed by the microprocessor of FIG. 11.

FIG. 20A is a chart that shows the shift points for upshifts and downshifts between the four driving ratios that are represented in FIGS. 9 and 10, the upshift points and the downshift points being functions of throttle position and vehicle speed.

FIGS. 24A and 25 show a flow chart of the control strategy for the Commanded Gear, PRNDL=3 or 4 Upshift Logic module.

FIG. 26 is a flow chart showing the control strategy for the Upshift Delay Logic module.

FIG. 27 is a flow chart showing the control strategy for the Downshift Delay Logic module.

FIG. 27A is a chart showing the shift scheduling for a commanded gear upshift starting with the lowest ratio and continuing to the overdrive ratio.

FIG. 29 is a table showing the various gear shift ratio sequences that are addressed by the gear sequence pointer.

PARTICULAR DESCRIPTION OF THE INVENTION

Part A—Transaxle

Figures 9, 10:
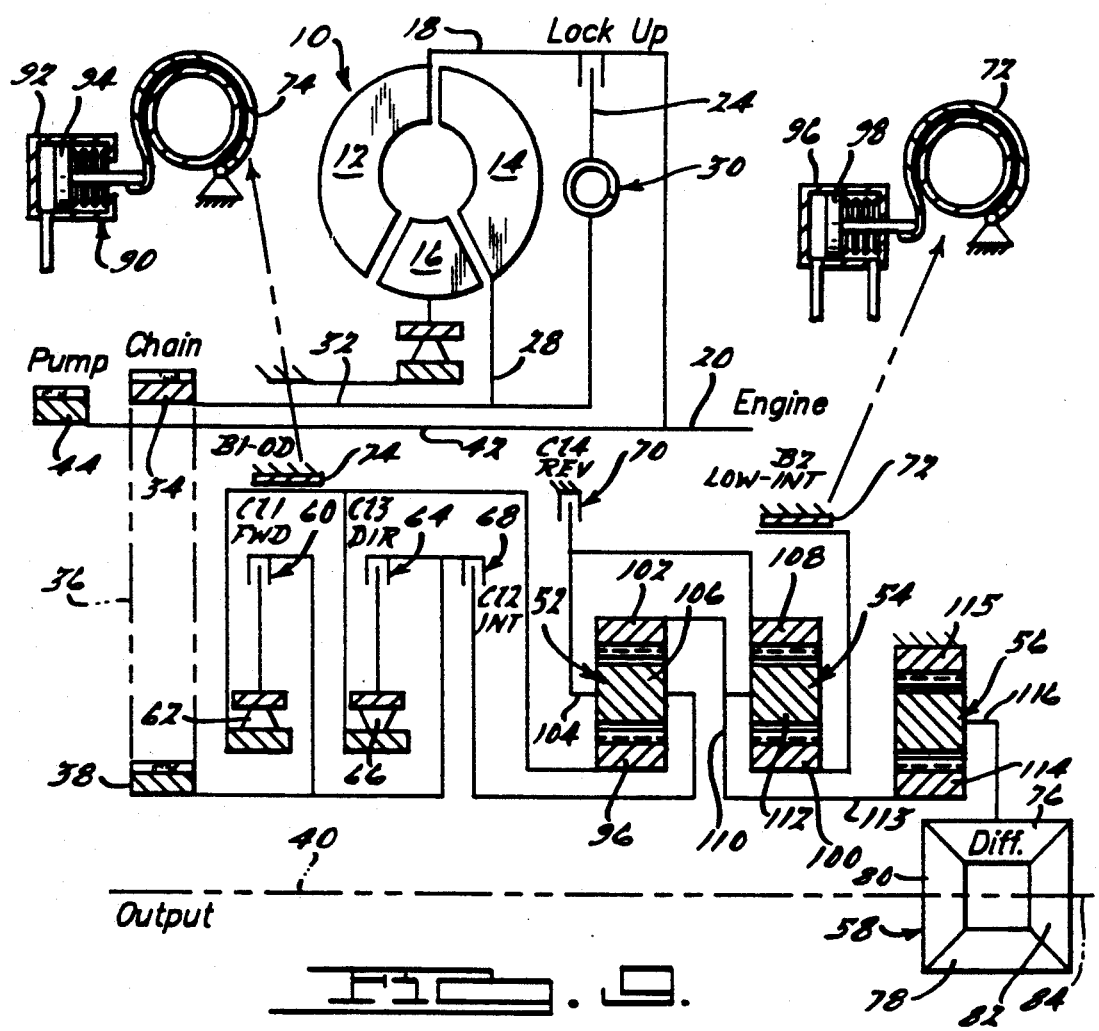
FIG. 9 is a schematic representation of a transaxle, torque converter and gearing arrangement capable of embodying the improved control system of our invention.
FIG. 10 is a chart that shows the clutch and brake engagement and release pattern for the clutches and brakes of the transaxle of FIG. 9 during ratio changes.

Shown in FIG. 9 is a schematic cross-sectional view of the torque converter and planetary gearing of a transaxle capable of being controlled by the control system of this invention. The transaxle includes a torque converter 10 having a bladed impeller 12, a bladed turbine 14 and a bladed stator 16 arranged in a toroidal fluid flow circuit. The impeller 14 includes an impeller housing 18 which is connected drivably to an engine crankshaft 20 by means of a drive plate 22.

A bypass clutch assembly 24 is situated in the impeller housing 18 and is adapted to establish a mechanical torque flow path between the impeller and the turbine. The bypass clutch 24 includes a clutch plate 26 having an annular friction surface at an outward radial location which engages a friction surface on an outward radial portion of the impeller housing 18. Clutch plate 26 is connected to the hub 28 of the turbine 14 by means of a torsional damper assembly 30. A turbine sleeve shaft 32 is connected drivably to a driving sprocket 34 of a torque transfer chain drive, which includes a drive chain 36 and a driven sprocket 38 located on the axis of a torque output shaft 40.

The impeller housing 18 is connected drivably by means of central shaft 42 to a positive displacement gear pump 44 which serves as a fluid pressure source for the control system. The control valve system is located in a valve body secured to a housing portion enclosing the chain transfer drive.

The planetary gear units for the transaxle comprise a first simple planetary gear unit 52 and a second simple planetary gear unit 54. A final drive gear unit 56 is located on the torque output side of the planetary gear units between the gear units and a differential gear assembly 58.

The speed ratios achieved by the two simple planetary gear units are controlled by a forward clutch 60 and a low ratio overrunning coupling 62, a direct clutch 64, a direct overrunning coupling 66, an intermediate clutch 68, and a reverse clutch 70. In addition to the clutches and the overrunning couplings, there are two friction brakes comprising low-and-intermediate brake bands 72 and overdrive brake band 74.

The differential gear assembly 58 includes differential pinions 76 and 78, which mesh with differential side gears 80 and 82. Side gear 80 is splined to one end of output shaft 40, and side gear 82 is splined to a companion output shaft 84. Universal joint assemblies connect the shafts 40 and 84, respectively, to axle half shafts for each of the vehicle traction wheels.

A fluid pressure operated brake servo applies and releases overdrive brake band 74. That servo comprises a cylinder and servo piston that define a pressure chamber which, when pressurized, applies brake band 74, thereby anchoring sun gear 96 for the planetary gear unit 52.

Low-and-intermediate brake band 72 is applied and released by a brake servo comprising a cylinder and a double-acting piston located within the cylinder. The piston 98 and cylinder 96 define a pair of opposed pressure chambers. When both chambers are pressurized, brake band 72 is released. When the pressure chamber on one side of the piston 98 is pressurized, the pressure chamber on the other side of the piston is exhausted and the piston is stroked, thereby engaging the brake band 72, thus anchoring sun gear 100 for gear unit 54.

Gear unit 52 comprises, in addition to the sun gear 96, a ring gear 102, a carrier 104, and planet pinions 106 journalled on the carrier 104. Pinions 106 mesh with ring gear 102 and sun gear 96.

Gear unit 54 comprises, in addition to sun gear 100, ring gear 108, carrier 110 and planet pinions 112 journalled on the carrier 110.

Ring gear 102 of the gear unit 52 is connected drivably to carrier 110 which, in turn, is connected to output shaft 113 which delivers torque directly to sun gear 114 of the final drive gear unit 56. Ring gear 115 of the gear unit 56 is connected to and anchored by the transmission housing. Carrier 116 of gear unit 56 is connected directly to the differential housing which supports the pinion shaft on which the pinions 76, 78 are journalled.

The forward clutch 60, the direct clutch 64, the intermediate clutch 68 and the reverse brake 70 are actuated by their respective servo pistons which are received in servo cylinders and which define with the cylinders pressure working chambers that energize multiple friction discs. In each instance, a piston return spring acts on the piston to oppose the fluid pressure force of the working pressure.

The chart of FIG. 10 shows the clutch and brake engagement and release pattern for the clutches and brakes illustrated schematically in FIG. 10. For purposes of correlating the schematic representation of FIG. 9 with the chart of FIG. 10, the forward clutch is identified in FIG. 10 by the symbol CL1, the direct clutch 64 is identified in FIG. 2 by the symbol CL3, the intermediate clutch 68 is identified in FIG. 10 by the symbol CL2, the reverse brake 70 is identified in FIG. 10 by the symbol CL4, the low-and-intermediate brake band 72 is identified in FIG. 10 by the symbol B2, and the overdrive brake band 74 is identified in FIG. 10 by the symbol B1. Further, the forward overrunning coupling 62 is identified in FIG. 10 by the symbol OWC1, and the direct overrunning coupling 66 is identified in FIG. 10 by the symbol OWC2.

The gear ratios that may be obtained with the gearing of FIG. 9 are listed in the left-hand vertical column of FIG. 10. The corresponding clutch or brake that is applied to achieve any given gear ratio is identified in FIG. 10 by the symbol X. In the case of the overrunning couplings, the engaged state of the overrunning coupling is identified in FIG. 11 by the symbol X; and the overrunning state is identified by the symbol OR, which is an overrunning condition.

The various drive ranges that may be obtained for the transmission structure of FIG. 9 are determined by the position of a manual valve, which will be described with reference to FIG. 13a.

To obtain the low-speed driving ratio, clutch CL1 is applied, as indicated in FIG. 10. If coast braking is desired at low ratio, direct clutch C13 is applied. On the other hand, if the transmission is conditioned for the normal drive mode, with a full range of ratios, clutch CL3 is not applied and no braking torque is available since overrunning coupling OWC2 transmits torque reaction in only one direction.

Low-and-intermediate brake band B2 is applied in low ratio, thereby anchoring sun gear 100 which serves as a reaction point. The torque on the driven sprocket 38 thus is transferred through the forward clutch CL1 to the sun gear 96. A split torque delivery path, therefore, occurs through gear unit 52 as the carrier 104 drives a ring gear 108 which, in turn, delivers torque to the carrier 110 and the output shaft 112.

A ratio change from the low speed ratio to the intermediate speed ratio is achieved by engaging clutch CL2. This causes overrunning coupling OWC1 to freewheel as torque is transferred through the engaged clutch 68 to the carrier 104. A ratio change from the intermediate ratio to the direct drive ratio is achieved by engaging clutch CL2 as clutch CL1 is released. Clutch CL3 remains applied so all of the elements of the gear units rotate together in unison with a one-to-one ratio.

Overdrive ratio is achieved by continuing to release clutch CL3, by continuing to apply clutch CL2, and by continuing to apply clutch CL3 as the overdrive brake band B1 is applied. Since the sun gear 96 is anchored by the overdrive brake band, the ring gear 102 and the output shaft 112 are overdriven. Overrunning coupling OWC2 freewheels during overdrive.

Reverse drive is achieved by engaging simultaneously clutch CL1 and reverse brake CL4. Clutches CL2, CL3, and brake B1 are released. Torque of the driven sprocket 38 then is transferred through clutch CL1 and the overrunning coupling OWC1 to the sun gear 96. Since carrier 104 is anchored by the reverse brake CL4, ring gear 102 is driven in a reverse direction together with output shaft 112.

Part B—Control Valves (the Control Valve Circuit of FIGS. 13a and 13b)

The drive shaft 42, which extends through the torque converter 10 drives the pump rotor 118.

As the rotor is driven, pump vanes rotate within the pump cavity, thereby developing a fluid pressure in known fashion. Fluid is supplied to the intake ports for the pump 44 from sump 132 through filter 134.

Fluid is supplied from the pump to manual valve 136 shown in FIG. 13a. This valve comprises a valve spool with spaced lands 138, 140 and 142 which register with internal valve lands in manual valve bore 144. The manual valve, in known fashion, may be adjusted by the vehicle operator to any drive range position. In the embodiment disclosed in this specification, the positions are drive range D, which provides for three forward driving ratios; an overdrive position OD, which conditions the transmission for operation in each of four forward driving ratios including an overdrive; a manual low position; a neutral position N and a reverse drive position R. In the position shown in FIG. 13a, manual valve 136 distributes pressure from pump supply passage 146 to passage 148 which is pressurized during operation of overdrive OD and drive range D.

The manual valve also supplies passage 150, which leads to main regulator valve spool 152. Regulator valve spool 152 comprises lands 154, 156, 158, 160 and 162. The first three lands are of equal diameter, but land 162 has a smaller diameter. This permits line pressure from passage 164 to be distributed to the differential area of lands 160, 162 during operation in the second, third and fourth ratios following an upshift from the first ratio. Pump pressure passage 150 supplies the valve chamber for the valve spool 152 at a location intermediate lands 158, 160. The feedback passage 164, including a control orifice, provides for a pressure regulating feedback pressure.

An output pressure passage 168 communicates with ports that register with lands 156 and 158, and exhaust port 170 is located between the lands 156 and 158. A regulated converter pressure in passage 174 communicates with passage 172 when land 154 uncovers passage 172.

Passage 174 is supplied with pressure from converter regulator valve assembly 176. This valve assembly comprises pressure regulating valve lands 178, 180, and 182 which are spring loaded in a right-hand direction by valve spring 184. Pump pressure is supplied to the converter regulator valve through passage 186. Passage 188 feeds passage 174 described previously as converter regulator valve assembly 176 modulates the pressure in passage 186, with passage 190 being a feedback passage.

The main regulator valve assembly includes valve springs 192 and 194. A TV booster valve element 196 provides an anchor for the spring 194. When throttle valve pressure is admitted to the left side of the valve element 196, the fluid pressure force is transmitted to the valve 152 through the spring.

The presence of a throttle valve pressure on the valve element 196 will cause an increase in the spring force of spring 194, thereby increasing the regulated line pressure made available to line pressure passage 200. During operation in reverse drive, reverse line pressure from passage 202 is distributed to the differential area of spaced lands on the valve element 196, thereby creating an additional force on the spring 194 which augments the line pressure in passage 200.

Passage 172, which receives regulated converter pressure from passage 174 through the space between lands 154 and 156, communicates with bypass clutch passage 204. This pressure regulates the pressure made available to the control space 206 of the torque converter 10. Passage 172 communicates with lube pressure passage 207 when land 208 of the bypass clutch control valve 210 uncovers passage 172 leading to passage 207. Regulated converter pressure in passage 172 acts on the differential area of lands 208 and 214. Land 208 registers with the port communicating with passage 172, and land 214 registers with the land adjacent port 216 which is exhausted through the manual valve. Thus, the bypass clutch pressure in passage 204 is a regulated pressure.

Valve 210 is urged in a right-hand direction by valve spring 218.

Converter fluid is returned from the converter through passage 220 which passes through the space in the bypass clutch control intermediate valve lands 222, 224. This flow complements the flow of converter return fluid through orifice 226. The fluid in passage 220 ultimately is distributed to lubrication passage 228 and the front lubrication circuit, the rear lubrication circuit including passage 230 communicates with passage 172 and with passage 206 through orifice 232.

The bypass clutch control valve 210 is a regulating valve, as explained previously. The regulating valve lands are the differential diameter lands 214 and 208. It regulates converter pressure and produces a bypass pressure in passage 204.

Converter pressure is subject to variables such as changes in throttle opening, road conditions, etc. In order to make the bypass clutch pressure insensitive to such variables in converter pressure, the bypass clutch control valve 210 is provided with a valve element 602 that engages the main valve spool. The spring 218 acts directly on the element 602. Element 602 comprises a valve land 604 and a valve extension 606, the diameter of the land 604 being greater than the diameter of extension 606. This creates a differential area which communicates with converter pressure passage 172 through passage 606. The effective area on the valve element 604 is the same as the differential area of valve lands 208 and 210. Thus, a change in converter pressure due to a variation in operating variables will produce a force on the main valve spool that is directly cancelled by the corresponding force on the valve element 604.

Thus, when the bypass clutch is calibrated to produce a desired slip for any given operating condition, the magnitude of that desired slip may be changed only by changing the duty cycle of the bypass clutch solenoid. A change in converter pressure will not require a compensating change in the duty cycle, and the control of the clutch thus is improved with respect to reliability. Torque fluctuations due to changing clutch capacity are avoided.

The regulated pressure level maintained by the bypass clutch control is changed by introducing a bypass clutch solenoid pressure to the right end of land 224 through passage 234.

Figure 18:
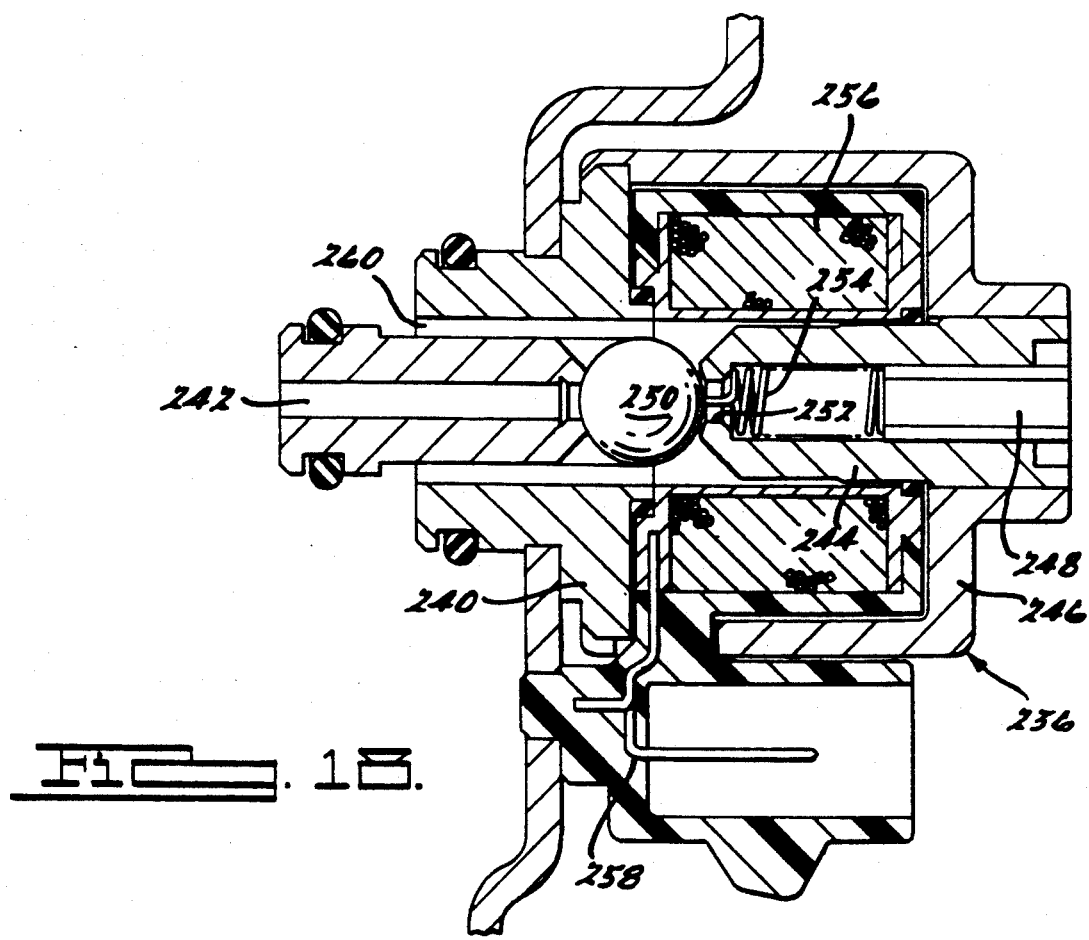
FIG. 18 is a cross-sectional view of a bypass clutch solenoid valve assembly.

The bypass clutch solenoid shown in FIG. 13a at 237 is shown in an enlarged form in FIG. 18. It comprises a housing 241 which receives regulated solenoid pressure through an opening 243. An orifice element 245 is secured to housing portion 247 with an exhaust passage 249 aligned with passage 243. Ball valve element 251 registers with orifice 253 of the orifice element 245. A compression spring 255 is located within the orifice element 245 and has a stem at its end that normally engages the ball 251, holding it out of contact with the valve seat surrounding the opening 253.

An electromagnetic coil 257 surrounds the ball 251. It is embedded in a suitable insulating material 259. When the coil 257 is energized, ball valve element 251 acts as an electromagnetic core causing the spring 255 to compress. This increases the pressure in delivery passage 460.

Passage 243 communicates with passage 234 indicated in FIG. 13a. Thus, the magnitude of the pressure in passage 234 is related inversely and proportionately to the pressure in passage 204.

Ratio changes from low ratio to the intermediate ratio are cushioned by capacity modulator valve 236, which is supplied with fluid through feed line 238 when the transmission is operated in the second, third or fourth ratio. Line pressure is distributed through passage 238 to the 1-2 capacity modulator valve at a location intermediate lands 240 and 242, as seen in FIG. 13b. That valve includes a pressure regulating valve spring 244 which opposes feedback pressure distributed to the left side of the land 240 through feedback pressure passage 246. Intermediate clutch pressure is fed from the valve 236 through orifice 248 to the 1-2 accumulator 250, which includes an accumulator chamber defined in part by a piston 252, which is biased by accumulator piston spring 254. The pressure on the other side of the piston 252 is distributed to the accumulator 250 through passage 256.

The accumulator pressures for the 1-2 accumulator and the 3-4 accumulator are developed by the accumulator regulator valve 258. This comprises spaced lands 260, 262 and 264, lands 262 and 264 having a differential area which is subjected to pump pressure in passage 266. That passage communicates with passage 200 discussed with reference to FIG. 4a. A regulator spring 268 urges the regulator valve spool toward the right. The regulated output pressure of the accumulator regulator 258 is line 270 which communicates with the spring side of the 3-4 accumulator and the 1-2 accumulator. Feedback pressure is distributed to the left side of the land 260 through passage 272. Land 262 registers with exhaust port 274, and land 260 registers with a port that communicates with passage 266, thereby providing each of these two accumulators 250 and 276 with a pressure that opposes a spring force, the accumulator pressure being delivered to the accumulator 276 as well as to the accumulator 250 through passage 278.

Forward clutch pressure is delivered from a forward clutch control, to be described subsequently, through line 280. This pressure shortens the spring 268 as front clutch pressure acts on the left side of the plunger 282.

Figure 14:
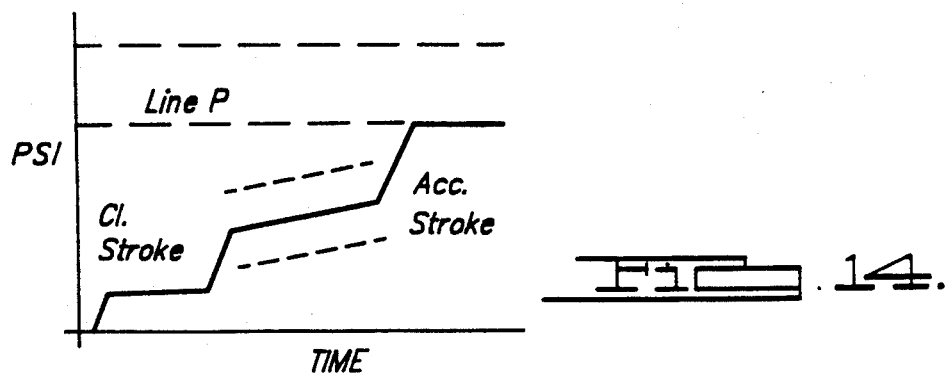
FIG. 14 is a chart showing the relationship between the intermediate clutch servo pressure and time during a ratio change from the low ratio to the intermediate ratio.

The stroke pressure for the 1-2 accumulator then will rise or fall, depending upon the magnitude of the line pressure in passage 280. This is illustrated in the chart in FIG. 14 where time is plotted against forward clutch pressure. During the initial time interval, the pressure rises until the intermediate clutch spring force is overcome. The piston for the clutch then will stroke, as indicated by the clutch stroke line. Clutch capacity increases as the pressure in the accumulator builds up against the opposing force of the spring. After the spring force and the pressure force of the accumulator regulator valve are overcome, the accumulator piston will begin to stroke following the accumulator stroke line of FIG. 14. After stroking is complete, the clutch pressure will rise sharply until line pressure is achieved in the clutch. The dashed stroke lines in FIG. 14 correspond to the dashed line pressure lines. As line pressure rises and falls, the stroke pressure will rise and fall accordingly.

Unlike the case of the front clutch pressure on a 1-2 shift, the 3-4 line pressure does not act on the plunger 282 to shorten the spring. Thus, it does not modify the output pressure in line 278 received by the 3-4 accumulator. Thus, the accumulator-regulator functions during a 3-4 shift as brake B1 becomes applied.

The 3-4 accumulator includes piston 286 and an accumulator spring 288 acting on the piston to supplement the force of the accumulator-regulator pressure supplied to the 3-4 accumulator to passage 278.

Overdrive servo pressure is supplied to the overdrive servo B1 through line 290. The pressure in passage 290, after passing through orifice 292, is transmitted to the upper side of the piston 296 of the 3-4 accumulator.

Neutral-to-drive engagements are regulated by 2-1 downshift control 298. This control comprises valve spool 300 situated in a valve chamber and includes a valve that is urged in a right-hand direction by valve spring 302. It is urged in a left-hand direction by throttle valve pressure which acts on the right side of land 304.

During a 2-1 downshift, the intermediate clutch exhaust flow path from the intermediate clutch includes line 304. If the 2-1 downshift is a power-on downshift, throttle pressure is sufficient to move the valve to the left, allowing intermediate clutch exhaust fluid to exhaust through exhaust port 306. If the 2-1 downshift is a coasting downshift, the valve 300 will assume the position shown in FIG. 13b, and line pressure from line pressure passage 310 passes through orifice 312 as line pressure is fed through the engagement valve to be described subsequently. Thus, a second orifice is introduced during a power-on downshift, the first orifice in the intermediate clutch exhaust flow path being orifice 314 and the second orifice being orifice 317 in FIG. 13c. This allows the intermediate clutch to be applied more quickly than in the case of a coasting 2-1 downshift.

Shown in FIG. 13b is a pressure failsafe valve 315 which comprises a simple shuttle valve spool 316 having spaced valve lands 318 and 320. Valve spring 322 urges the spool 316 in a right-hand direction, as viewed in FIG. 13b.

When the valve spool 316 is positioned as shown in FIG. 13b, converter regulator output pressure in passage 324 communicates directly with TV passage 326. This pressure acts on the left side of throttle booster valve element 196 of the main regulator valve assembly described with reference to FIG. 13a.

During normal operation, variable force solenoid pressure is distributed to the right end of land 320 through passage 328. This pressure is developed by variable force TV solenoid valve 330 shown in FIG. 13a. Under the influence of variable force solenoid pressure, valve element 316 is shifted to the left, thereby establishing communication between passage 326 and passage 328 so that line pressure can be distributed to the booster element of the main regulator valve assembly of FIG. 13a. Thus, if the variable force solenoid circuit should fail for some reason, or if the valve should stick and become nonfunctional, line pressure will be boosted to a maximum by the main pressure regulator valve as converter regulator output pressure is substituted for TV pressure at the booster valve element 196.

Figures 19, 20:
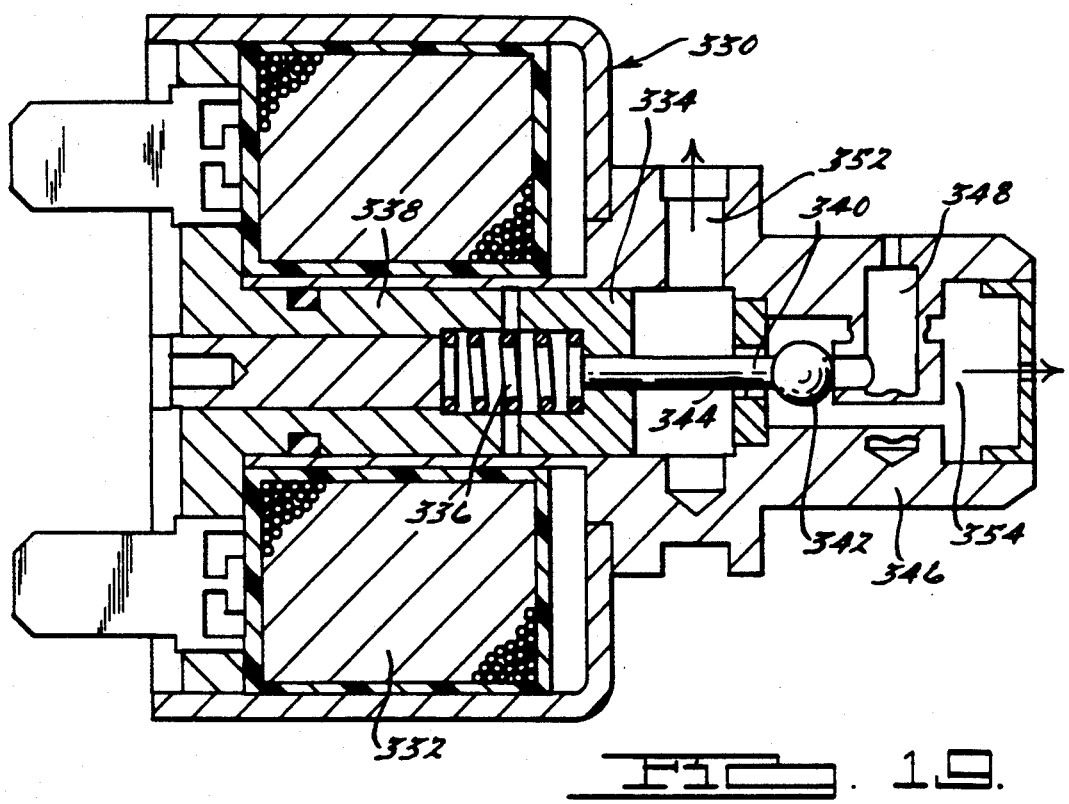
FIG. 19 is a cross-sectional view of a variable force throttle valve assembly for use in the valve system of FIGS. 13a through 13d.
FIG. 20 is a chart showing the engagement state of the three solenoid valves of FIG. 13c during each drive range and drive ratio.

The variable force solenoid 330 of FIG. 13a is shown in more particular detail in FIG. 19. It includes a solenoid assembly comprising solenoid windings 332 and an armature 334. A valve spring 336 acts between the stationary portion 338 of the solenoid assembly and the armature 334. A valve actuator pin 340 is carried by the armature 334 and is adapted to engage ball valve 342. Ball valve 342 registers with orifice 344 located in valve housing 346.

The variable force TV solenoid valve has a feed port 348 which communicates with converter regulator pressure line 350, as seen in FIG. 13a. Numeral 352 designates an exhaust port in the VFS TV solenoid valve body. It communicates with the orifice 344.

Ball valve 342 is located on the feed side of orifice 344. A signal passage 354 is located on the feed side of orifice 344.

Normally, plunger or armature 334 and the pin 340 will unseat valve 342 from the orifice 344 under the influence of the force of spring 336. If current is applied to the solenoid, the valve will become seated as the armature 334 is subjected to the electromagnetic force that opposes the spring force. This is accompanied by an increase in the pressure in the signal passage 354. The valve becomes unseated as voltage to the solenoid windings is decreased. As the current for the solenoid increases, the ball valve 342 will tend to seat against its orifice, thereby causing a pressure increase in the signal passage 354. Signal passage 354 communicates with variable force solenoid passage 356 which communicates with passage 328 in FIG. 13b.

Throttle valve pressure is distributed to passage 326 and to the main pressure regulator as explained previously. The same pressure is distributed through ball valve 358, as seen in FIG. 13c and to TV pressure passage 360, which acts on the right end of engagement valve 362 shown in FIG. 13c.

Figure 13D:
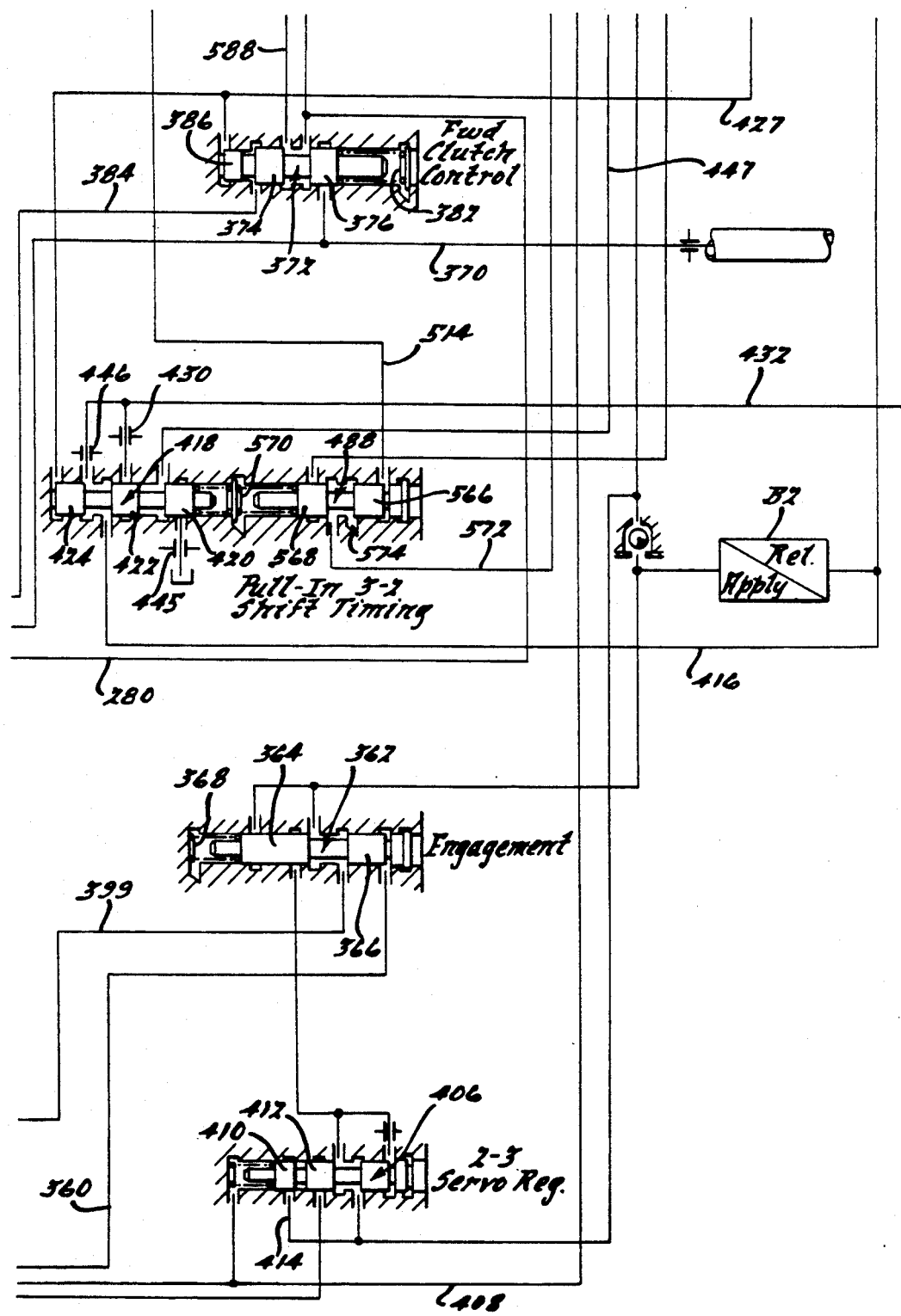

Control Valves (the Control Valve Circuit of FIG. 13d)

Engagement valve 362 comprises lands 364 and 366 which may be of equal diameter. It is urged in the right-hand direction by valve spring 368.

On a neutral-to-drive shift of the manual valve, pump pressure in passage 200 will be distributed to passage 370 to the forward clutch control valve 372. Forward clutch control valve 372 comprises a valve spool having lands 374 and 376. When the valve 372 moves to the right position against the opposing force of spring 382, line pressure from passage 370 will be delivered directly to passage 378 and through 3-4 shift valve 388 to the front clutch feed passage 390. Orifice 392 is located in feed passage 390 to cushion the engagement of the forward clutch CL1. The valve assumes the right-hand position, as seen in FIG. 13d, as pressure in passage 384 acts on the differential area of lands 374 and 386. Passage 384 receives its pressure from the three-position check valve 394 which communicates through the check valve with line pressure passage 396.

As the forward clutch becomes pressurized, pressure builds up in passage 378, which is transferred through line 280 to the orifice 398 in FIG. 13b, thus shifting the spring seat 382 of the accumulator-regulator valve. This shortens the accumulator valve spring, as explained previously. A coasting 2-1 downshift results in a pressure build-up in passage 399 which communicates with the neutral drive accumulator, as indicated in FIG. 13b.

This accumulator comprises a piston 400 with an accumulator chamber spring 402 and an accumulator volume 404. Line pressure for the low-and-intermediate servo B2 acts on the upper end of the piston 400 and cushions the engagement of the servo as pressure is delivered to the apply side of servo B2 through the engagement valve 362. During a coasting 3-2 downshift, it is necessary for the brake servo B2 to become applied. The 2-3 servo regulator 406 acts as a regulator valve in this instance as fluid is delivered to the apply side of the brake servo B2 through the engagement valve 362, which is moved to the left by pressure in passage 360.

There is no line pressure in passage 408 at the beginning of a coasting 3-2 downshift. Thus, the valve 406 may act as a regulator valve on a coasting 3-2 downshift. The feedback pressure for the differential area of lands 410 and 412 communicates with feedback passage 414. The relationship between time and servo pressure in this instance is illustrated by the chart of FIG. 1. After the downshift is completed, the control strategy for the solenoid 464 in FIG. 13c will delay turning on the solenoid. After the coasting downshift is done, the solenoid is turned on.

On a torque demand 3-2 downshift, line pressure is present in line 408. This line pressure from line 494 passes directly through the valve 406 and through the engagement valve to the apply side of servo B2.

Figure 15:
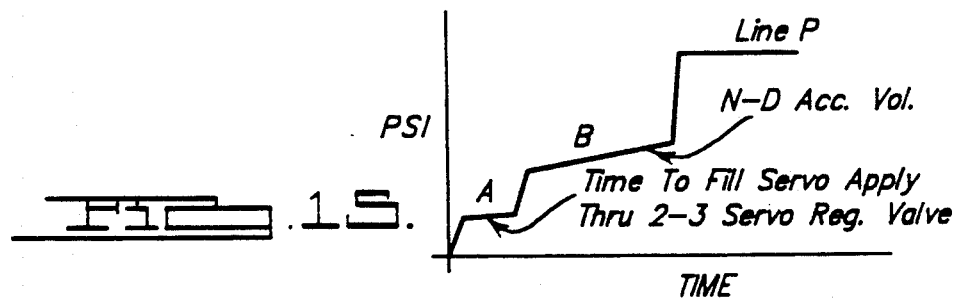
FIG. 15 shows the relationship between the low-and-intermediate servo pressure and time during a transition from neutral to the drive condition.
Figure 16:
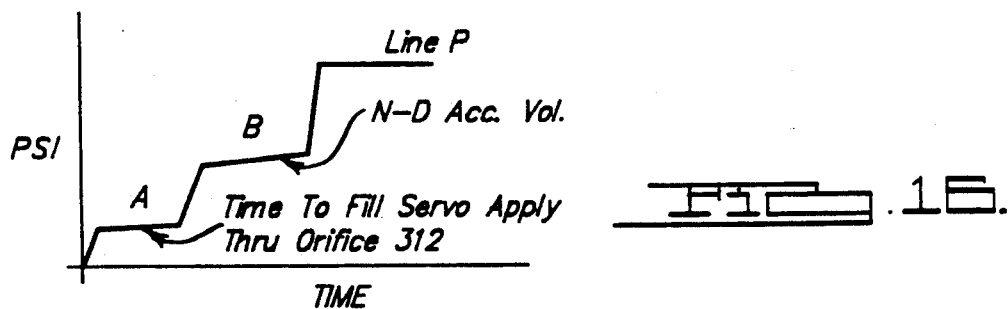
FIG. 16 is a chart showing the relationship between the low-and-intermediate servo apply pressure and time during a downshift from the direct drive ratio to the intermediate ratio.

In FIG. 15, the portion of the curve representing the low-and-intermediate servo engagement shown at A is the pressure build-up rate due to the cushion spring in the servo. The portion of the curve represented by the symbol B is that characteristic that is due to the neutral-drive accumulator volume. After the line 416 exhausted, the servo pressure will rise to a maximum pressure corresponding to line pressure. FIG. 16 shows the corresponding time versus servo pressure relationship when the servo is fed through orifice 312. In this instance, the fill time is less. Thus, the portion of the curve shown at B is shorter than the corresponding portion of the curve of FIG. 15.

On a 3-2 shift, as the servo B2 becomes applied, fluid is released from the release side of the servo. The release fluid passes through line 416 to the 3-2 shift timing valve shown at 418 in FIG. 13d. The valve 418 includes three spaced valve lands of equal diameter, as shown at 420, 422 and 424. When the valve is positioned as shown, line 416 communicates with passage 432 which has in it orifice 446. Passage 432 extends to the direct clutch exhaust line. On a 3-2 downshift at high speeds, the timing valve 418 will be moved to the right. This is accomplished by pressurizing passage 427 by solenoid valve 428. This also pressurizes the left end of the forward clutch valve 372 causing it to shift to the right and to connect pump pressure line 372 to the forward clutch feed line 390 through the 3-4 shift valve. The release side of brake B2 then is exhausted through passage 416 and through orifice 430 in the line 432. Fluid from the working chamber of the direct clutch CL3 then is discharged through orifice 455 as well as orifice 444 in the 1-2 shift valve, which communicates with orifice 445 through line 447. Line 432 extends through check valve 434 to line 436 and through check valve 438 to line 440. This line extends to the 1-2 shift valve 482 at land 442 which, under these conditions, assumes a left-hand position shown in FIG. 13c. Line 440 then is exhausted through orifice 444 to the reservoir.

Figure 16A:
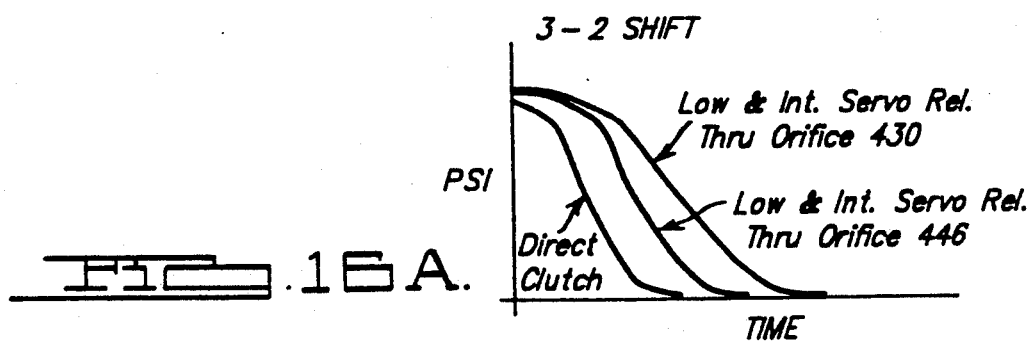
FIG. 16A is a chart showing the rate of decay of servo release pressure for the low and intermediate servo during a 3-2 downshift and the rate of decay of the direct clutch pressure.

Orifice 430 is larger than companion orifice 446. At low speeds, the shift timing valve 418 is in the position shown. Thus, the line 416 is exhausted through orifice 446 rather than orifice 430. Thus, the decay time is greater, as indicated in the chart of FIG. 16A. In the case of a 3-2 shift at high speeds, with the valve 418 in the right-hand position, a part of the direct clutch exhaust flow occurs through secondary orifice 446 in the 3-2 shift timing valve. This further reduces the shift timing. In the chart of FIG. 16A, there is shown also a decay curve for the pressure in the direct clutch as well as the corresponding curves illustrating the rate of decay of the pressure on the low-and-intermediate servo release.

Referring again to FIG. 13a, the solenoid regulator valve 448 includes three lands 450, 452 and 456, the latter registering with exhaust port 458. Valve 448 is biased in a right-hand direction by valve spring 459. Line pressure from passage 164, which is pressurized during second, third and fourth ratio is distributed to the valve 448. That pressure is regulated at a constant value by the valve 448 which distributes pressure to the intake side of the bypass clutch solenoid described with reference to FIG. 18. The output from the bypass clutch solenoid 236 is delivered to the bypass clutch control through passage 234, as previously explained.

Regulated converter pressure is delivered to passage 460 which feeds the TV solenoid 330, and each of the shift solenoids 462 and 464 in addition to the third solenoid 428 described previously. Each of the solenoids 462, 464 and 428 is normally open. When they are not energized, solenoid feed pressure is delivered directly from passage 460 to signal passages 466, 468 and 426, respectively. The solenoids are on-off solenoids. Flow from the feed passage 460 to each of the signal passages is interrupted when they are energized.

Figure 17:
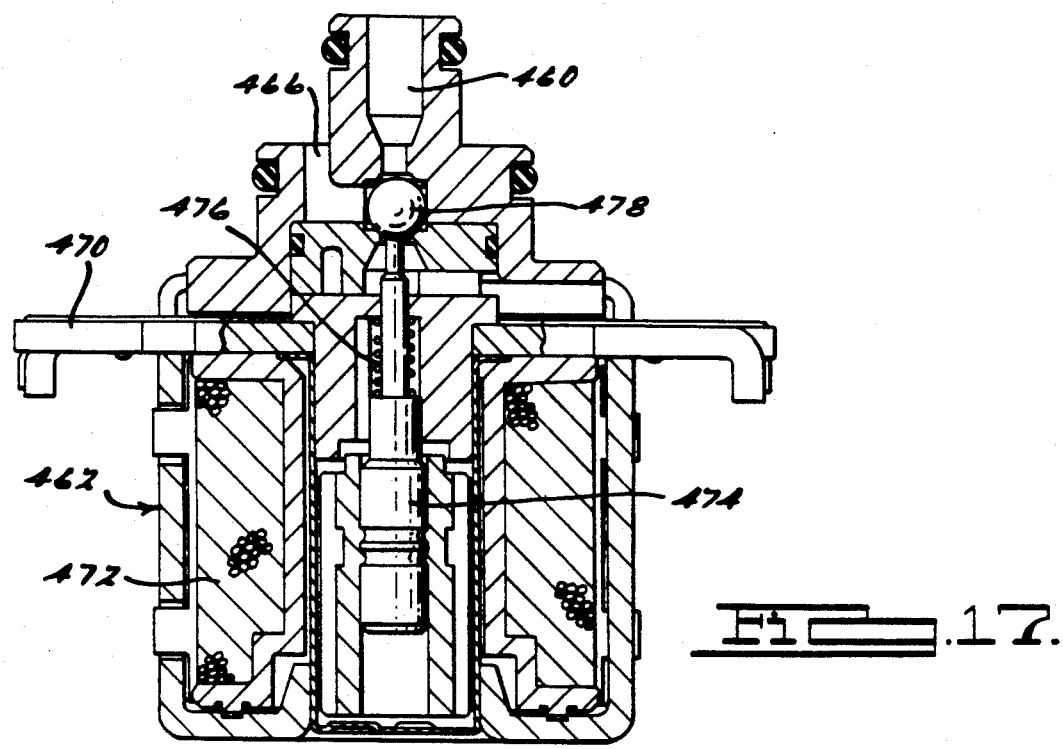
FIG. 17 is a cross-sectional view of a typical solenoid valve assembly for controlling ratio changes and for controlling engagement and release pressures.

FIG. 17 shows an enlarged cross-sectional view of the solenoid 462. Each of the other solenoids is similar.

Solenoid 462 comprises a mounting plate 470, solenoid coil 472, an armature 474 and a spring 476 surrounding the armature to normally bias the armature out of engagement with solenoid ball valve element 478, thus opening the flow passage from line 460 to 466. When the solenoid windings are energized, the armature closes the valve element 478 against the valve seat defining in part passage 460.

Solenoid valve 428 provides a signal in passage 426 which is distributed to the left end of land 427 of the 3-2 shift timing valve 418. The solenoid under the control of the microprocessor then will actuate the valve so that a selection may be made for the large orifice 432 or the smaller orifice 446. This distinguishes between the high speed 3-2 shift timing requirement and a low speed shift timing requirement as explained previously.

Solenoid 428 supplies also a signal to the left end of land 386 of the forward clutch control valve 372. This is done in order to provide engine braking in third gear which requires application of the forward clutch. The differential area of lands 374 and 386 is not pressurized, as explained previously, during operation in third gear and overdrive.

Control Valves (Control Valve Circuit of FIG. 13c)

The ratio changes in the transmission are under the control of the 2-3 shift valve, the 1-2 shift valve, the intermediate clutch shuttle valve, the 3-4 shift valve and the pull-in valve. These valves are respectively identified by reference numerals 480, 482, 484, 486 and 488. Each of these valves is a shuttle valve and can assume either one position or the other depending upon whether a solenoid pressure signal is available. These valves are under the control of only two solenoids, namely, solenoids 462 and 464. Thus, ratio changes between each of the four ratios can occur as each of the individual valves performs multiple functions. The 2-3 shift valve has a solenoid valve pressure land 490. That pressure is pressurized by solenoid valve pressure from solenoid 464 which is distributed to the 2-3 shift valve through passage 468. Valve 480 includes a valve spring 492 which moves it to the left when a solenoid valve signal in passage 468 is absent.

Line pressure exists in passage 494 when the manual valve is in the overdrive position, the D position, or the 1 position. Valve lands 496 and 498 on the 2-3 shift valve establish communication between passage 494 and passage 500 when valve 480 is shifted in a right-hand direction against the force of spring 492. When the valve 480 assumes the position shown in FIG. 13c, passage 500 communicates with exhaust port 502.

The solenoid valve 464 will develop a pressure in passage 468 that shifts the valve to the right to condition the transmission for operation in third and overdrive ratios. During operation in the first and intermediate ratios, spring 492 urges the valve 480 in a left-hand direction. When the valve 480 is in the left-hand position, passage 500 is exhausted through port 502 and the passage 494 communicates with passage 504, which is connected to passage 408 as seen in FIG. 13d.

The 1-2 shift valve 482 assumes the position shown in FIG. 13c during operation in the second and the fourth ratios. During operation in the first and third ratios, it is shifted to the right. The shifting movement is established as the valve 482 responds to a signal in passage 466 from the solenoid valve 462. The signal acts on the left side of land 506. Valve spring 508 normally shifts the valve 482 in a left-hand direction.

Valve 482, in addition to land 506, includes lands 510, 514 and previously described land 442. When the valve is positioned as shown in FIG. 4c, the direct clutch apply pressure in passage 518 is exhausted through exhaust port 520. When the valve 482 is shifted in a right-hand direction, line pressure passes directly from passage 522 to the direct clutch feed passage 518 whenever passage 522 is subjected to line pressure. That condition exists when the manual valve is shifted to a manual low range position.

When the valve 482 is positioned to the left, as shown in FIG. 13c, communication is established direction between line pressure supply passage 524 and passage 526, the latter extending to the shuttle valve 484. Passage 524 is connected to passage 148 shown in FIG. 13a whenever the manual valve is in the overdrive position, the drive position D or the manual low position. Passage 526 is exhausted through exhaust port 528 when the valve 482 is shifted in a right-hand direction during operation in the first and third ratios.

When the valve 482 is shifted in a left-hand direction, communication is established between feed passage 530 for the 3-4 shift valve and passage 532, which communicates with passage 500 described previously. Passage 532 serves as a feed passage for the intermediate clutch shuttle and the 3-4 shift valve. Passage 530, which is a signal passage for the 3-4 shift valve, communicates with exhaust orifice 444 through the 1-2 shift valve when the shift valve is shifted in a right-hand direction. When it is in that position, passage 532, which communicates with the line pressure passage 494 through the 2-3 shift valve, communicates with passage 440 which supplies line pressure to the direct clutch CL3 through one-way check valve 534 as shown in FIG. 13c.

When passage 526 is pressurized as the 1-2 shift valve moves to the left-hand position during operation in the second and fourth ratios, the intermediate clutch shuttle valve 484 will be shifted to the right as land 536 becomes pressurized. Intermediate clutch shuttle valve 484 includes, in addition to the land 536, lands 538 and 540 which establish communication between intermediate clutch exhaust passage 542 and line pressure feed passage 544. Passage 544 is connected to passage 164, which is pressurized during operation in the second, third and fourth ratio.

The release side of the low-and-intermediate servo B2 is exhausted through orifice 317 and one-way check valve 546 when the transmission is conditioned for operation in the second, third and fourth ratios. If the shuttle valve is shifted to the right, passage 544 is connected to line pressure feed passage 548. This feed passage is connected to passage 148 described with reference to the manual valve of FIG. 13a.

The intermediate clutch shuttle valve thus will interrupt the supply of line pressure to passage 544 and prevent application of the low-and-intermediate servo whenever the solenoid valve signal for solenoid valve 462 is exhausted from passage 466. That corresponds, as explained previously, to the position of the 1-2 shift valve shown in FIG. 13c.

The 3-4 shift valve 486, in addition to the land 388, includes valve lands 550, 552 and 554. The 3-4 shift valve 486 is urged in the left-hand direction by a valve spring 556. The corresponding valve spring for the intermediate clutch shuttle valve is shown at 558. The overdrive servo B1, which is supplied through passage 290 as explained previously, is exhausted through control orifice 558 when the 3-4 shift valve is positioned as shown. This releases the overdrive brake B1.

Passage 290 is connected to passage 532 when the 3-4 shift valve is shifted in a right-hand direction. Passage 532 is pressurized, as explained previously, during operation in the third and fourth ratios. This causes the overdrive brake servo to become applied. The 3-4 shift valve can be shifted in the right-hand direction only if passage 530 is pressurized, and that occurs only when the 1-2 shift valve is in the left-hand position, thereby permitting distribution of line pressure from passage 532 through the 1-2 shift valve.

During operation in reverse, the 3-4 shift valve 486 is shifted in a right-hand direction under the force of the reverse line pressure in passage 560, which acts on the differential area of lands 554 and 552. This allows reverse line pressure from passage 560 to pass directly through the 3-4 shift valve to the front clutch feed passage 390.

Pull-in valve 488 is available to supply a shift signal for the 1-2 shift valve and the 2-3 shift valve if the control system should lose power, thereby rendering solenoid valves 462 and 464 inoperable. These are normally open valves, so if a power failure occurs, converter regulator output pressure in passage 350 will pass directly into lines 466 and 468. This normally would shift the 2-3 shift valve in a right-hand direction and will shift the 1-2 shift valve 482 in a right-hand direction against the opposing force of their respective springs. As soon as the operator is aware of a power failure, he may move the manual valve to the "1" position whereby regulated pump pressure is delivered to line 562. This pressure is delivered to passage 564 and to the right side of land 566 of the pull-in valve.

The pull-in valve comprises, in addition to the land 566, a land 568. A valve spring 570 normally urges the pull-in valve to the right. Signal passage 468 communicates with the pull-in valve; and when the valve assumes the position shown, land 568 blocks passage 468. At the same time, signal passage 572 is exhausted through exhaust port 574. When the operator pulls the manual valve to the manual low range position, line pressure will be distributed to the right side of the land 466 and shift the valve 488 in a left-hand direction, thereby blocking exhaust port 574 and opening passage 468 to passage 572. Thus, a new signal passage is made effective. That signal passage, identified by numeral 572, distributes line pressure to a spring chamber for spring 508 of the 1-2 shift valve and to the spring chamber for spring 492 of the 2-3 shift valve. This returns each of the shift valves to their left-hand positions. Thus, the transmission will be conditioned for continuous operation in the intermediate speed ratio. In an emergency, therefore, the vehicle operator may drive the vehicle in intermediate ratio to a service center where the voltage failure can be repaired.

Control Valves (Summary of Operation of Valve System)

For the purpose of summarizing the valve functions during operation in each of the four forward driving ratios and the single reverse ratio, the following overview is provided.

If the manual valve is shifted to the overdrive position, pump pressure will be distributed to passage 148. Pump pressure also is applied to passage 150 which pressurizes passage 370. This supplies pump pressure to the forward clutch control 372.

The 2-3 shift valve is shifted to the left under the influence of its valve spring 492. Line pressure from pressurized passage 148 then is distributed through the 2-3 shift valve between the lands 490 and 496 to passage 504. Line pressure then passes through check valve 438 as passage 408, which communicates with passage 504, becomes pressurized.

Check valve 394 connects passage 396 with passage 384, thus causing the forward clutch control valve 372 to be shuttled to the right. Pump pressure in passage 370, which communicates with passage 150, then communicates with passage 380. This supplies the forward clutch through the 3-4 shift valve, which is in the left-hand position at this time.

Passage 396 feeds orifice 312, the downstream side of which communicates with the neutral-to-drive accumulator and passage 398 which feeds the engagement valve 362. Line pressure passes through the engagement valve to the apply side of the low-and-intermediate brake servo B2. With the low-and-intermediate brake servo and the forward clutch thus applied, the transmission is condition for operation in the first ratio.

A shift from the first ratio to the second ratio occurs as line pressure is distributed from passage 524 and through the 1-2 shift valve, which is in the left-hand position as explained previously. Line pressure then passes from the passage 524 through the 1-2 shift valve to passage 526, which triggers the intermediate clutch shuttle valve, pushing it to the right. This allows line pressure to be transferred from passage 548 to passage 544. The 1-2 capacity modulator valve communicates with passage 544 through passage 238. Line pressure passes through valve 236 and pressurizes passage 246, thus engaging the intermediate clutch CL2. The servo B2 remains applied as previously explained with reference to operation in the first ratio.

A ratio change from the second ratio to the third ratio when the manual valve is in the OD position occurs as the 2-3 shift valve is shifted in a right-hand direction as explained previously. Line pressure then is delivered from passage 494 to passage 500. The 1-2 shift valve is shifted in a right-hand direction, as explained previously. This causes pressurized passage 500 to deliver pressurized fluid to passage 440, which is connected through the check valve 438 to passage 582. That passage is in communication with the direct drive clutch CL3 through check valve 534. Direct clutch pressure is distributed also to line 432 and through check valve 584 to the release side of the low-and-intermediate brake servo B2. With the direct clutch applied and the low-and-intermediate servo released, and with the intermediate clutch remaining applied, the transmission is conditioned for direct-drive operation.

If it is desired to have coast braking in direct drive ratio, the manual lever may be shifted to the D position, thereby pressurizing passage 596. Line pressure is then delivered from line 596 to line 588, as shown in FIG. 13d. This pressure then passes through the forward clutch control valve to passage 380 which supplies the forward clutch feed passage 390. With all three clutches applied, the transmission is conditioned for coast braking with the transmission in the direct-drive condition.

Orifice 592 is provided in passage 588 in order to control manual 4-3 downshifts as the manual valve is moved from the OD position to the D position. When fluid is delivered in the opposite direction, one-way check valve 594 bypasses the orifice 592.

When a shift to the fourth ratio from the third ratio is desired, the 2-3 shift valve remains in the right-hand position, and the 3-4 shift valve is shifted in a right-hand direction. Thus, line pressure is transferred from passage 494 to passage 532 and then to the 3-4 shift valve. The 3-4 shift valve is shifted in a right-hand direction as explained previously during operation in the fourth ratio. Thus, line pressure is transferred from passage 532 to passage 290. It then passes through the check valve 438 to direct clutch feed passage 582. Fluid is transferred also to passage 432 by the check valve 534 and through check valve 584 to the release side of the low-and-intermediate servo B2.

Pressurized passage 290 communicates with the overdrive servo B1 through orifice 292 and to the pressure side of the 3-4 accumulator. With both the direct clutch applied and the overdrive servo applied, the transmission is conditioned for overdrive operation.

Reverse drive is obtained by moving the manual valve to the reverse position, which causes line pressure to be distributed to passage 560 to the check valve 394 and then to passage 384. This causes the forward clutch control valve to be shifted to the right. This results in a direct connection between pump pressure passage 370 and passage 380 which feeds the forward clutch CL1 through the 3-4 shift valve and the feed passage 390. The reverse clutch CL4 is applied because of the direct connection between passage 560 and the reverse clutch feed orifice 600.

On a neutral to manual low engagement, the manual valve is moved to the "1" position as in the case of a pull-in shift. Line pressure in passage 562 then is passed directly to the 2-3 servo regulator valve 406 in FIG. 13d. At that time, the 2-3 servo regulator valve spool is in a left position because of line pressure in line 504. Line pressure in passage 408 is not developed instantaneously upon movement of the manual valve because of the time lag due to the stroking of the servo piston. Thus, servo B becomes applied with a cushion action as apply pressure builds up in the low-and-intermediate servo gradually. Solenoid 3 is turned off in park and neutral, leaving forward clutch CL1 applied. Thus, it is necessary to apply the low-and-intermediate brake B2 with this softened engagement to expect a low gear engagement from neutral or park. Forward clutch CL1, which is pressurized as explained previously with respect to the low ratio operation with the manual valve in the OD position.

During operation in reverse, reverse line pressure is delivered to the reverse boost valve element for the main regulator as explained previously. If there is a failure in the variable force solenoid, the pressure failsafe valve 315 will move to the right under the influence of spring 322, thereby connecting booster passage 326 with converter regulator pressure passage 324. Regulated converter pressure then is substituted for throttle valve pressure on the boost valve element 196 of the main regulator valve, thereby preserving line pressure.

We have shown in FIG. 20 a chart that shows the conditions under which the three solenoids 462, 464 and 428 are energized. As explained previously, when one of these solenoids is energized, the valve is closed, thereby interrupting a signal to the signal passages 466, 468 and 427, respectively. The solenoid state for solenoid S1 is not relevant to PRNDL position "1", so the ON/OFF designation is not used. The same is true for solenoid S1 and S2 for the "2" position of PRNDL. The solenoid state will not affect the transmission operating mode for PRNDL positions "1" and "2".

Figure 11:
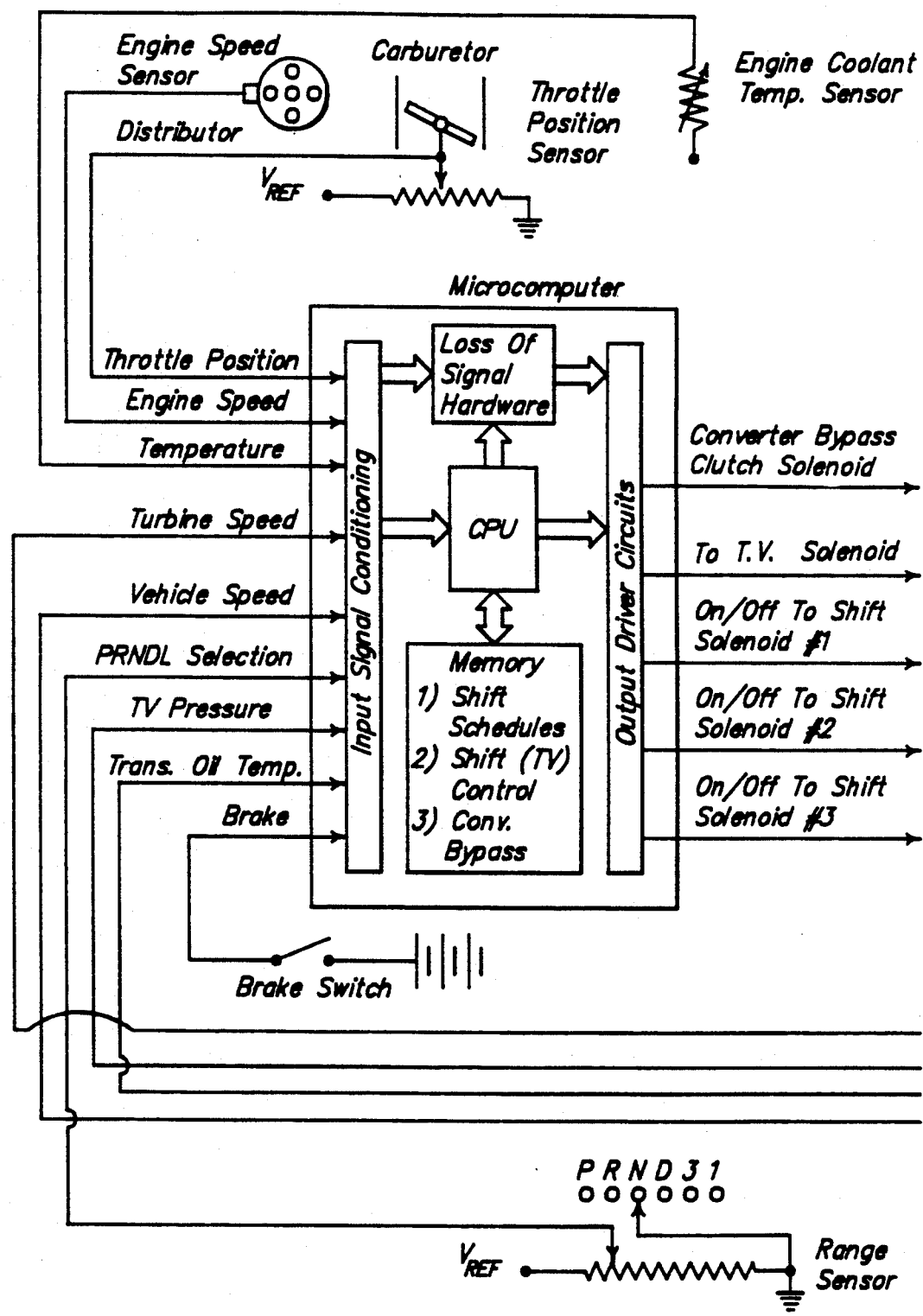
FIG. 11 is a schematic representation of a microprocessor including essential elements of the processor in the environment of the control system of our invention.
Figure 12:
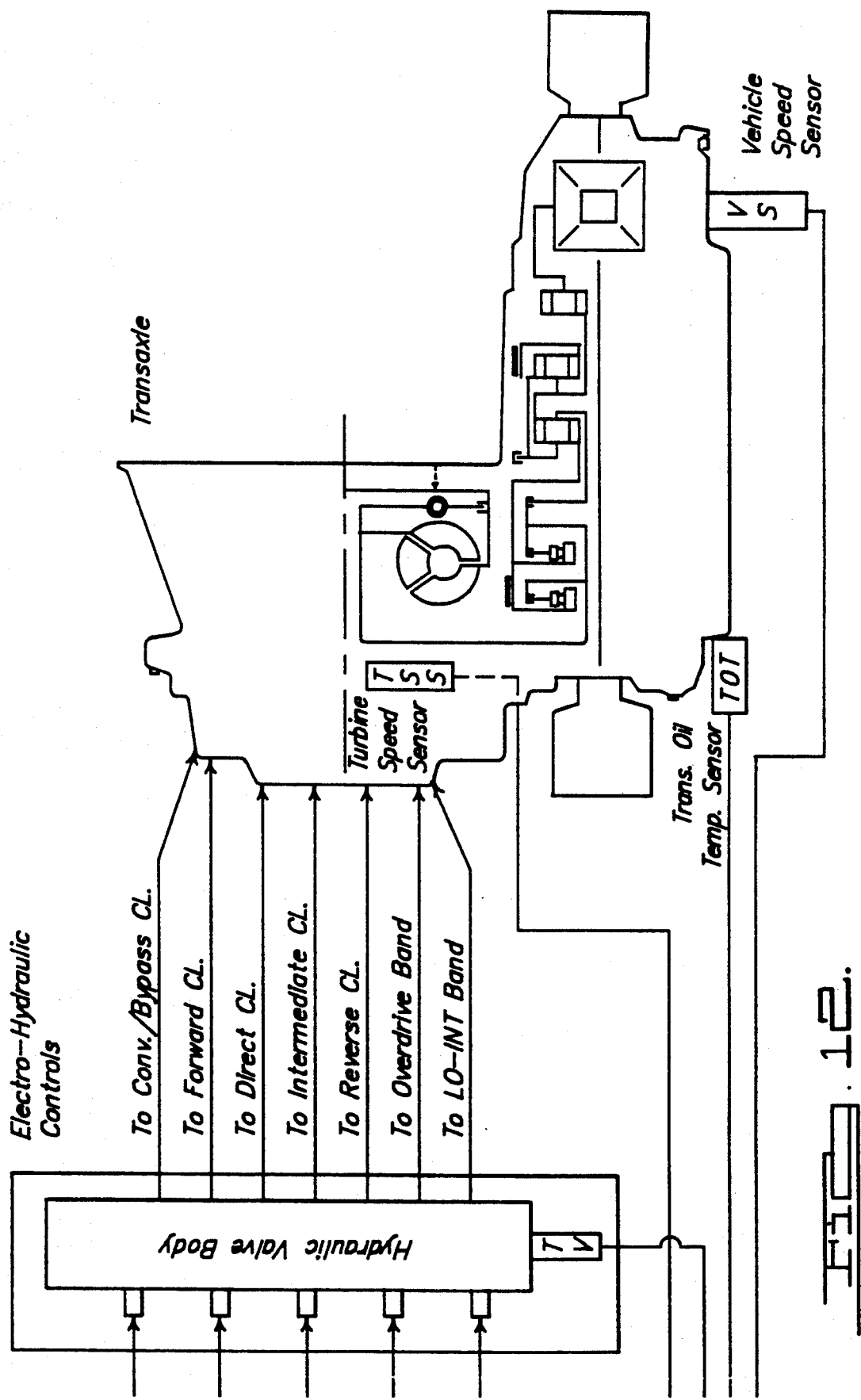
FIG. 12 is a continuation of the view of FIG. 11 showing the hydraulic valve body and its relationship to the clutches and brakes of the transaxle of FIG. 9.

Part C—Microprocessor of FIGS. 11 And 12

FIG. 11 shows a schematic diagram of the microcomputer circuit and valve system. The various sensors provide signals for the microcomputer which are received by the input signal conditioning portion of the microcomputer. The shift schedules and the pressure control schedules are stored in the memory portion. The memory registers are addressed by the control processing portions after computations are made using the input signals as variables. The output driver circuit receives the result of the computations and develops output signals for the electrohydraulic controls, as seen in FIG. 12, including the three solenoid valves, the VFS TV solenoid and the bypass clutch solenoid.

Part D—The Shift Control Modules

The main modules of the control strategy comprise sets of instructions that are distinct one from the other. The main modules, as explained previously, are addressed and executed in sequential order. The sub-routines are exerted when called out by the main modules.

Each of the modules will be described with reference to flow charts shown in FIGS. 21-28.

The Shift Control Modules (PRNDL Based Desired Gear Determination)

Figure 21:
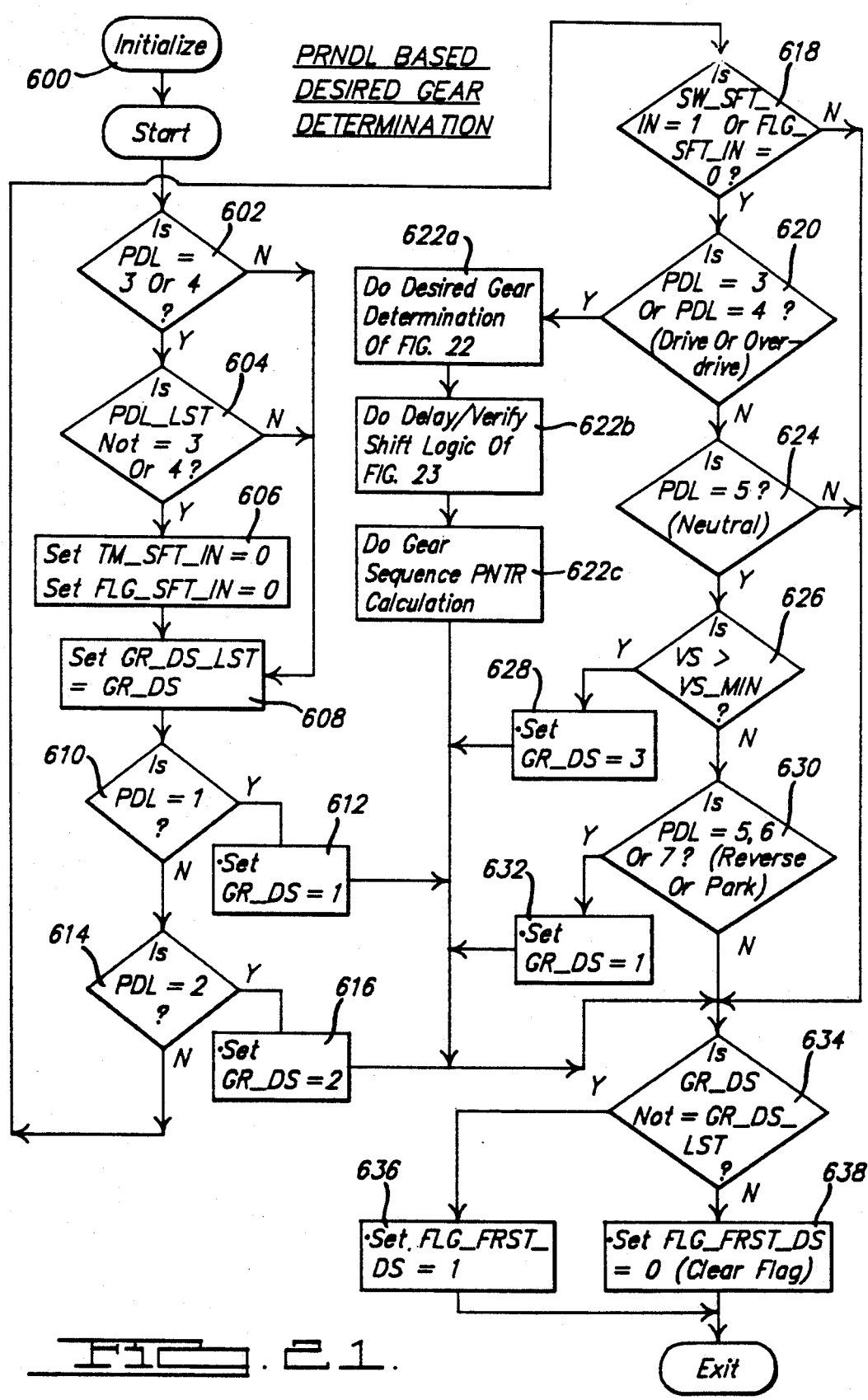
FIG. 21 is a flow chart of the control strategy for the PRNDL Based Desired Gear Determination module.

The first of the main modules is the PRNDL Based Desired Gear Determination module illustrated in the flow chart of FIG. 21. In executing the strategy of this module, the desired gear is calculated based on the PRNDL position. The gear may be any one of the four forward driving ratios. The desired gear is calculated using this strategy in accordance with a function of throttle position and vehicle speed.

In automatic drive range operation, all four values for desired gear are possible. That is, a shift from the first ratio to the overdrive ratio may be desired, or a shift from the overdrive ratio to the first ratio may be desired; or if the PRNDL position is in the third position, desired gear changes can be made between the first and the third ratio. The sequence of the ratio changes within the four described ranges of ratio is sequenced by gear commanded strategy during multiple-step shifts.

The processor will check sequentially, as explained previously, each register in the module. The first register, after the sequence is initialized at 600, is the PNDL=3 or 4, as shown at 602, and a second determination is made by addressing the PNDL_LST register to determine if the selector lever is not equal to 3 or 4, as shown at 604 in FIG. 21. Thus, the processor will check whether the PRNDL position is equal to either 3 or 4 and that the register PNDL last is not equal to 3 or 4. These inquiries are made at 602 and 604 to determine whether the PRNDL position has just changed from a non-automatic position to an automatic position. If both of these inquiries are affirmative, the shift in progress timer is cleared. This action is indicated at step 606. At the same time, the flag FLG_SFT_IN is cleared. Until that flag is cleared, the routine will not allow automatic shifts. When it is cleared, the processor has indicated that there is no shift in progress.

In the next action step at 608, the processor will set the desired gear equal to the desired gear that was in place and stored in temporary memory during the last background loop.

In the next step of the routine, the register PDL=1 is addressed to determine whether the PRNDL position is equal to 1, which is the manual low drive range position. If that is the case, the desired gear is set to 1 and no automatic shifting will occur. This register is indicated at 610, and the action that occurs if the inquiry is affirmative is indicated at step 612.

The next inquiry is made at step 614 to determine whether the PRNDL position is set equal to 2. If it is equal to 2, the desired gear then is equal to 2 as indicated by the action block 616. In the embodiment described in this specification, it is not possible to carry out the inquiry at 614 because there is no PRNDL position corresponding to PRNDL=2. Thus, in the particular embodiment described here, a negative answer to the inquiry at 610 will cause the processor to proceed directly to the next inquiry at 618 to determine whether the switch SHIFT-IN-PROGRESS is set to 1 or whether the flag FLG_FST_IN is cleared. In either case, there is no shift in progress and the routine may proceed to step 620.

Figure 22:
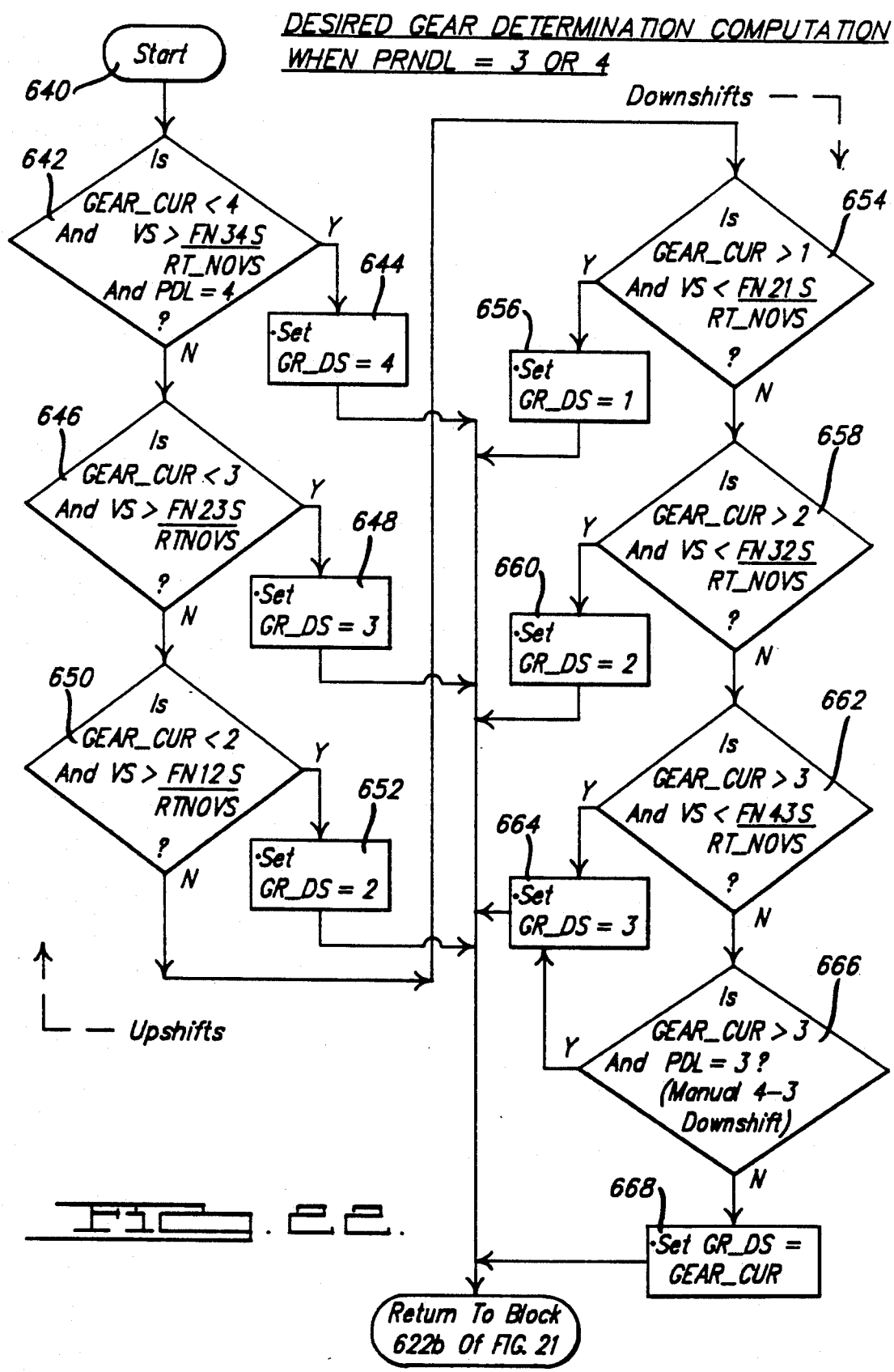
FIG. 22 is a flow chart showing the control strategy for the desired gear determination computation when PRNDL=3 or 4.
Figure 23:
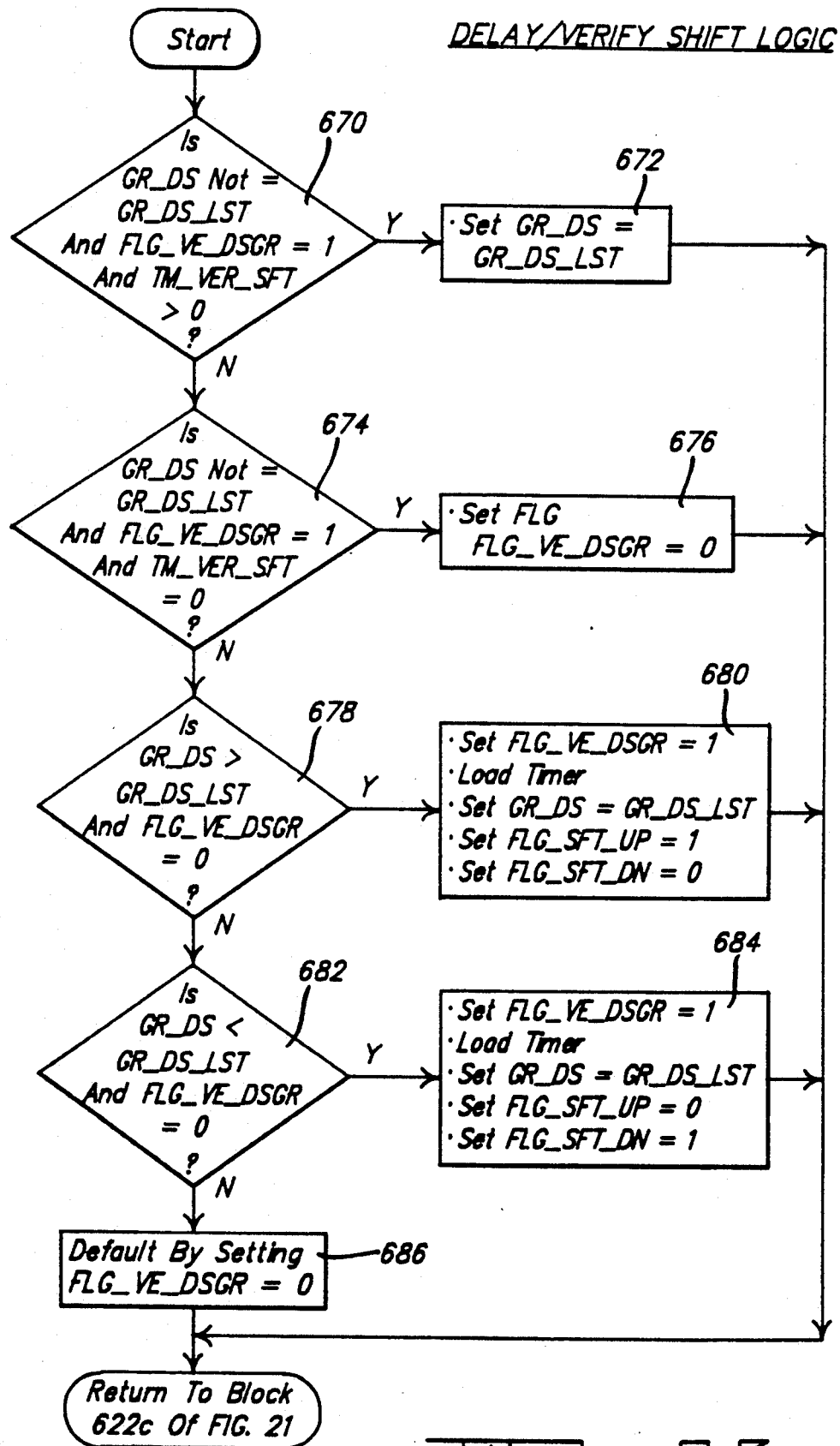
FIG. 23 is a flow chart showing the control strategy for the Delay/Verify Shift Logic module.

If the PRNDL position is 3 or 4, the automatic shift routine indicated in action block 622 is carried out. That is, the logic of FIGS. 22 and 23 is carried out. If the PRNDL position is not equal to 3 or 4, the routine proceeds to register 624 where an inquiry is made as to whether the PRNDL position is in neutral or 5. If that is true, an inquiry is made at 626 to determine whether the vehicle speed is greater than the calculated minimum value. For example, it is determined whether the vehicle is coasting with the manual lever in the neutral position at a speed greater than a minimum value. If that is true, the desired gear then is set equal to 3, as indicated in action block 628. If the vehicle speed is less than the minimum value VS_MIN, other conditions are checked, the first of which is an inquiry at 630 to determine whether the PRNDL position is in 5, 6 or 7. PRNDL position 6 corresponds to reverse position, and PRNDL position 7 corresponds to park position. If the answer to that inquiry is positive, the gear desired is set equal to 1 at action block 632.

After completion of all of the inquiries indicated at steps 618, 620, 624, 626 and 630 are completed, the routine returns to step 634. At the register corresponding to step 634, an inquiry is made to determine whether the desired gear is not equal to the desired gear that was present during the last background pass (GR_D-S_LST). Stated in a different way, if the desired gear has changed for the logic executed following the operation at action block 608, the routine proceeds to action block 636 where the flag for the new desired gear for the current background pass is set. In that case, a change to the desired gear ratio may occur. Otherwise, a negative response to an inquiry at 634 for the register at step 634 will result in a clearing of the flag FLG_SF-T_DS, as indicated in action block 638.

The routine of FIG. 22 will compute a gear regardless of whether the ratio change that is indicated is an upshift or a downshift from the current gear.

In the computation illustrated in the flow chart of FIG. 22, the routine begins at 640 and proceeds by addressing a register where an inquiry is made, as shown at 642, to determine whether the current gear is less than 4 and if the vehicle speed is greater than the 3-4 upshift function. The 3-4 upshift function of throttle position is represented by the 3-4 upshift speed from register FM34S divided by the contents of register RTNOVS. This is the 3-4 upshift speed divided by the ratio of actual N/V to the value for the base N/V that is stored in memory. Thus, the upshift speed is corrected for any variations in the actual N/V to the base calibration N/V. An inquiry is made also at step 642 to determine whether the PRNDL position is in 4. If all of the conditions indicated at the step 642 are positive, the desired gear GR_DS is set equal to 4. This action step is indicated in block 644 in FIG. 22.

If any of the conditions that are tested at step 642 is negative, the routine then proceeds to step 646 where an inquiry is made to determine whether the current gear is less than 3 and if the vehicle speed VS is greater than the 2-3 upshift speed FN23S corrected by the same factor described with reference to step 642 for variations in the actual N/V value with respect to the base N/V value that is stored in memory. The N in this computation is the output shaft speed, and the V in this computation is the vehicle speed. This ratio accounts for variations in the tire size or tire diameter and axle ratio changes.

If the inquiry at step 646 indicates that the vehicle speed is greater than the corrected 2-3 upshift point, the desired gear is set equal to 3 as indicated in the action block 648.

If the vehicle speed is less than the 2-3 upshift speed, the routine will proceed to an inquiry of the contents at register 650 to determine whether the current gear is less than 2 and if the vehicle speed is greater than the 1-2 upshift speed corrected for N/V variations as before. The 1-2 upshift point is designated by the symbol FN12S. If both of these conditions are true, the desired gear GR_DS is set equal to 2 at action block 652. Thus a 1-2 upshift may occur.

The value for the ratio of the actual N/V to the base N/V, which is used to correct each of the upshift points described in this routine, is a value stored in a keep-alive memory portion of the memory (KAM) so that the data is not lost when the ignition key is turned off. In this respect, the KAM portion of the memory acts in a fashion similar to the RAM portion and is addressable in the same way as the addressing procedure for RAM.

If the inquiry at step 650 results in either of the conditions being untrue, the procedure then will not result in an upshift. In that case, the processor will address the next register where an inquiry is made, as shown at 654, to determine whether the current gear is greater than 1 and if the vehicle speed is less than the 2-1 downshift function of throttle position (FN21S). If both of those conditions are true, the desired gear is set equal to 1, as indicated in action block 656. If either of the conditions at step 654 is not true, the routine will then proceed to step 658 where the current gear register is addressed and an inquiry is made as to whether the current gear is greater than 2. If it is greater than 2 and if the vehicle speed is less than the 3-2 downshift speed (FN32S) corrected for the ratio of actual N/V to the base N/V, then the desired gear is set equal to 2 at action block 660 and the transmission is conditioned then for a 3-2 downshift.

If either of the inquiries at step 658 is negative, the routine then proceeds to step 662 where an inquiry is made with respect to whether the current gear is greater than 3 and also whether the 4-3 downshift point is higher than the current vehicle speed corrected for N/V as explained above. If both of these conditions at step 662 are satisfied, the desired gear is set equal to 3 at action block 664. If either or both of the conditions considered at action block 662 is negative, the processor will cause an inquiry to be made at step 666 to determine whether the current gear is greater than 3 and if the PRNDL position is in 3. That is, an inquiry is made as to whether the PRNDL lever has been moved from the overdrive position to the 3 position corresponding to an overdrive cancel operation. If both of the inquiries at step 666 are positive, the desired gear will be set equal to 3 at action block 664. On the other hand, if either of the inquiries in step 666 is not true, the desired gear then is set equal to the current gear and no downshift is indicated. This action occurs at action block 668. The routine then is ended. It is ended also following completion of any of the actions indicated in the action blocks 644 through 664.

Shift Control Modules (Delay/Verify Shift Logic)

The sub-module shown at 622b now will be described. After a new desired gear has been determined at action block 622a, a delay should be introduced into the sequencing to effect a predetermined amount of delay time before the new desired gear is passed through to the commanded gear module. This delay is accomplished by the delay verify shift logic module which is the next main module executed. The delay will allow TV pressure to increase before the commanding of a shift following determination of the desired gear. The beginning of the TV pressure build-up should occur prior to the shift in order to overcome the delay times that are inherent in the operation of the TV solenoid.

The delay verify shift logic will induce the necessary delay to also allow the engine rpm to decrease before a tip-out upshift is commanded. If a shift is commanded after a tip-out occurs, the shift would be harsh since the engine will not have slowed down at that instant. By waiting for a calibratable time following the determination of the desired gear and before the commanding of the shift, the shift smoothness is improved. Also, the shift delay is necessary in order to avoid unnecessary commanding of gears or to avoid the commanding of a gear when that is not appropriate. For example, if there is a temporary transient signal developed that is not a true indicator of the desired gear, the shift commanding should be delayed in order to verify that a gear change really is appropriate.

The delay logic will cause a shift delay by setting the desired gear equal to its value during the previous background pass until the delay timer has run out. After the timer expires, the desired gear no longer assumes its previous value but is allowed to pass through to the commanded gear determination logic to effect a ratio change.

FIG. 23 shows the flow diagram that illustrates the logic for the delay verify shift logic module. Following the start of this logic, an inquiry is made at step 670 to determine whether the desired gear is not equal to the desired gear that was present during the last background pass. If the flag FLG_VE_DSGR has not been cleared, and if the timer has not been cleared, then the desired gear is set equal to the same desired gear during the last background pass. This is indicated in action block 672.

If any of the three conditions at step 670 is not met, the routine then proceeds to step 674 where it is determined whether the desired gear is not equal to the desired gear for the last background pass and where the gear is verified by determining that the flag FLG_VE_DSGR is set and that the timer has expired. If that is the case, the flag FLG_VE_DSGR is cleared, as shown in action block 676. Thus, it is possible in this instance to allow the new desired gear to pass through to the commanded gear module to be described subsequently. On the other hand, if any of the conditions at steps 674 are not true, an inquiry is made at step 678 to determine whether the desired gear is greater than the gear that was desired during the last background loop and if the flag FLG_VE_DSGR is cleared, indicating that there is no shift delay in progress during that background pass. If these conditions are met, then the action set out at action block 680 takes place where the desired gear flag FLG_VE_DSGR is set and the timer is loaded for an upshift. Desired gear is set equal to the desired gear for the last background pass until the desired gear delay is completed. Also, the flag FLG_SFT_UP is set and the flag FLG_SFT_DN is cleared, which is appropriate for an upshift.

If the conditions set out in inquiry 678 are not met, the routine proceeds to step 682 which describes a downshift. It is determined at that step whether the desired gear is less than the gear that was desired during the last background pass and whether the flag FLG_VE_DSGR has been cleared, which would indicate that there is no delay in progress. If these conditions are true, the timer is loaded at action block 684 and the timer flag FLG_VE_DSGR is set. The desired gear then is set equal to the desired gear that existed during the last background loop and the flags are set to indicate a downshift.

If none of the four conditions shown at 670-682 is satisfied, then the routine is not requesting that there be a change in gear desired. Thus, the flag FLG_VE_DSGR is cleared at step 686. This is a default condition. When it exists, no shift will occur.

At step 670, it is indicated that the desired gear is not the same as the gear last desired. The shift still is being verified since the timer setting is greater than zero, in which case the desired gear is set back to the gear last desired at step 672. At step 674, it is indicated that the desired gear is not equal to the last desired gear. The flag is set and the timer has expired, which means that a shift is desired and the routine has just finished verifying it. At that point, the flag is cleared at step 676.

Step 678 indicates that the shift that is desired is an upshift. The flag at that point is cleared and the routine has not yet verified the shift. Thus, the timer is loaded at action block 680, the timer's flag is set, and the gear then is set back to the desired gear during the last background pass and the upshift and downshift flags are set to indicate an upshift. If the gear change is a downshift, this occurs at step 682. Again, the flag indicates that the desired gear is not yet verified. Thus, the upshift and downshift timers at action block 684 are set for a downshift. If none of the four criteria described above is met, that means that either the desired gear did not stay changed or that a change in gear desired is not requested. In either case, the flag is cleared at step 686 and the logic will be forced to pass to a new verification procedure the next time the desired gear changes.

Shift Control Modules (GR_SEQ_PNTR Calculation)

The sub-module shown at 622c in FIG. 21 now will be described. If the desired gear is set at 4, for example, as indicated in action block 644, and if the current gear is 1 rather than 3, a multiple step upshift is indicated. A shift from 1 to overdrive can be accomplished in four different ways. The shift can be a direct 1-4 upshift, a 1-2-4 upshift, a 1-3-4 upshift or a 1-2-3-4 upshift.

The particular sequence that is followed in accomplishing such a shift is determined by a sub-module called the GR_SEQ_PNTR calculation. There is a separate calibration constant determining the interval between each shift in the shift sequence. If the desired gear is one greater than the current gear, the gear to be used in establishing an appropriate TV pressure during the shift interval is set equal to the desired gear. If the desired gear is more than one greater than the current gear, the gear that is used to set the dynamic TV pressure before the shift information is passed through to the shift command module is set to the first step of the gear shift. The gear sequence pointer GR_SEQ_PNTR is used by the commanded gear routine module to be described subsequently.

The GR_SEQ_PNTR register contains the address of a different calibration parameter for each step of a multiple-step shift. These addresses are indicated in FIG. 29 where the pointer address is listed in the left-hand column and the calibration parameter associated with that address is indicated in the middle column. Further, the possible choices available are indicated. During a 1-3 shift, the possible choices are a shift from 2 to 3 or a 3-3 shift which indicates that no shift should occur. If the desired shift is a 1-4 shift, the choices then would be a shift from 2 to 3 to 4, or a shift from 3 to 4 directly with no further change indicated, or a shift from 2 to 4, or a continuation of the fourth ratio. The fourth choice would be the 4-4-4 choice which indicates that no shift should occur during the third step of the shift.

The first three address blocks in FIG. 20 are upshift pointer addresses, and the last three pointer blocks are downshift pointer addresses, each address corresponding to a different calibration constant.

Shift Control Modules (PRNDL Based Commanded Gear Determination)

The commanded gear is calculated in this main module based on PRNDL position. The current gear and desired gear are addressed to determine if an upshift or a downshift is required, and then a command is made to effect the next appropriate gear in the shift sequence. With the PRNDL in the 3 or overdrive position, the sequence is controlled by the calibration parameters pointed to by the GR_SEQ_PNTR register as explained previously.

Figure 24:
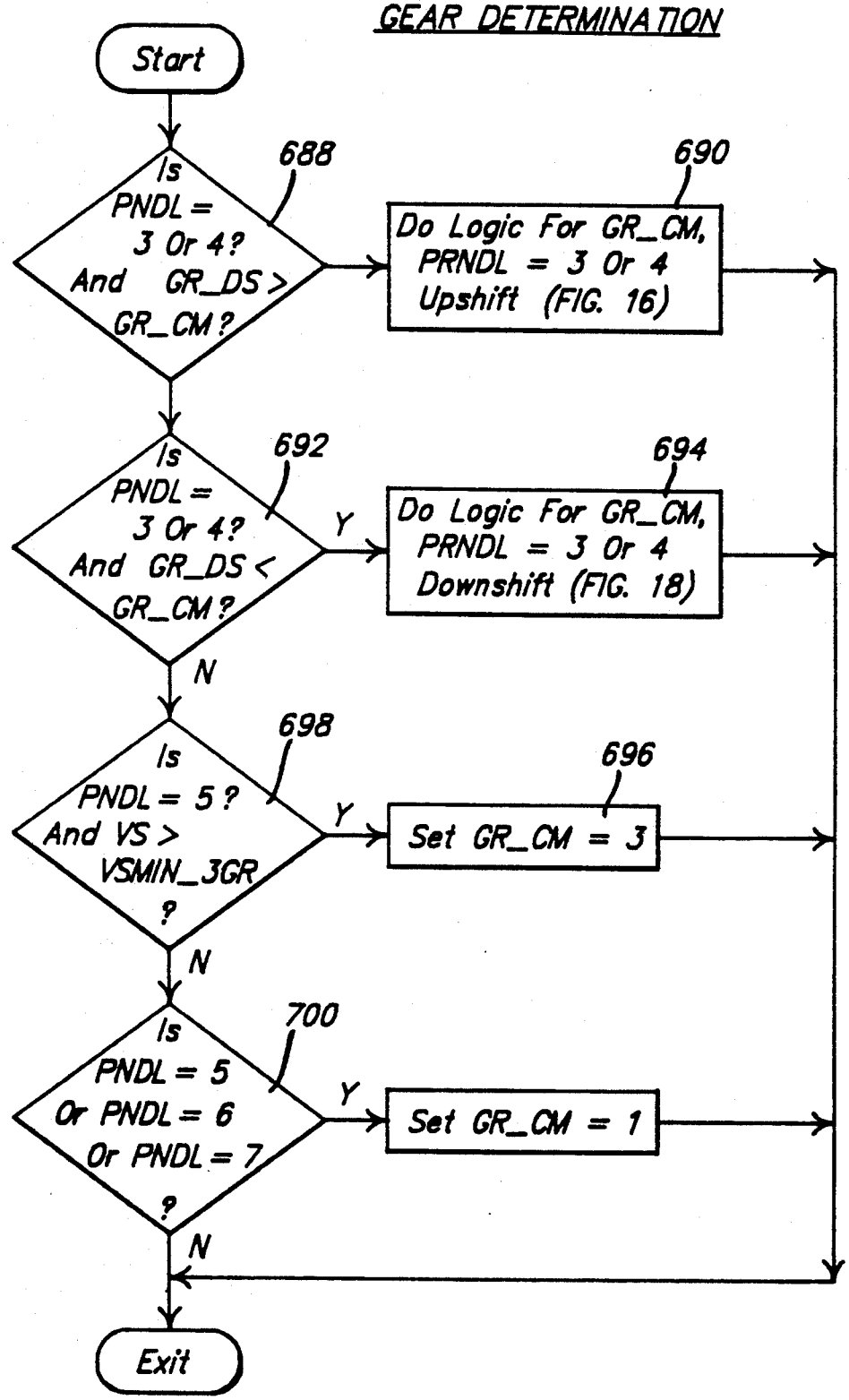
FIG. 24 is a flow chart showing the control strategy for the PRNDL Based Commanded Gear Determination module.

The flow chart of FIG. 24 illustrates the control logic for this module. Before the beginning of this logic, the gear commanded last is always set equal to the current gear being commanded. The last gear commanded was stored in temporary memory and fetched and compared to the current gear being commanded. At that point, the logic will determine whether action should be taken to carry out gear commanded logic if a change has been made from the gear commanded in the last background pass.

If the PRNDL position is 3 to 4 and the desired gear is greater than the gear commanded, an upshift is being requested. These two conditions are indicated in FIG. 15 at step 688. If the conditions at step 688 are true, the logic is performed for the gear commanded when the PRNDL position is 3 or 4, which will effect an upshift as will be explained subsequently. This occurs at action block 690. If the PRNDL position is 3 or 4 and the desired gear is less than the gear commanded, which are the conditions set forth in step 692 in FIG. 24, the logic is carried out for a commanded gear downshift with the PRNDL position in 3 or 4. This is indicated at action block 694.

If neither of the sets of conditions at 688 and 692 is true, and if the PRNDL position is 5, which is a neutral condition, and if the vehicle speed is greater than a calibratable minimum value for third gear, the commanded gear is set equal to 3, as indicated in action block 696. The conditions that lead to the action at 696 are shown at step 698.

If the PRNDL position is in reverse or park, which correspond respectively to numerals 6 and 7 at step 700, and if conditions set forth at step 698 are not true, the routine will then set the commanded gear equal to 1.

Shift Control Modules (GR_CM_PRNDL Equal 3 or 4 Upshift Module)

The commanded gear on an upshift is determined by this module when PRNDL=3 or 4. The sequence for multiple-step shifts is calibratable, as explained previously with respect to the description of the GR_SE-Q_PNTR module. The time spent in intermediate gears on a multiple-step shift is controlled by this module.

Figure 24A:
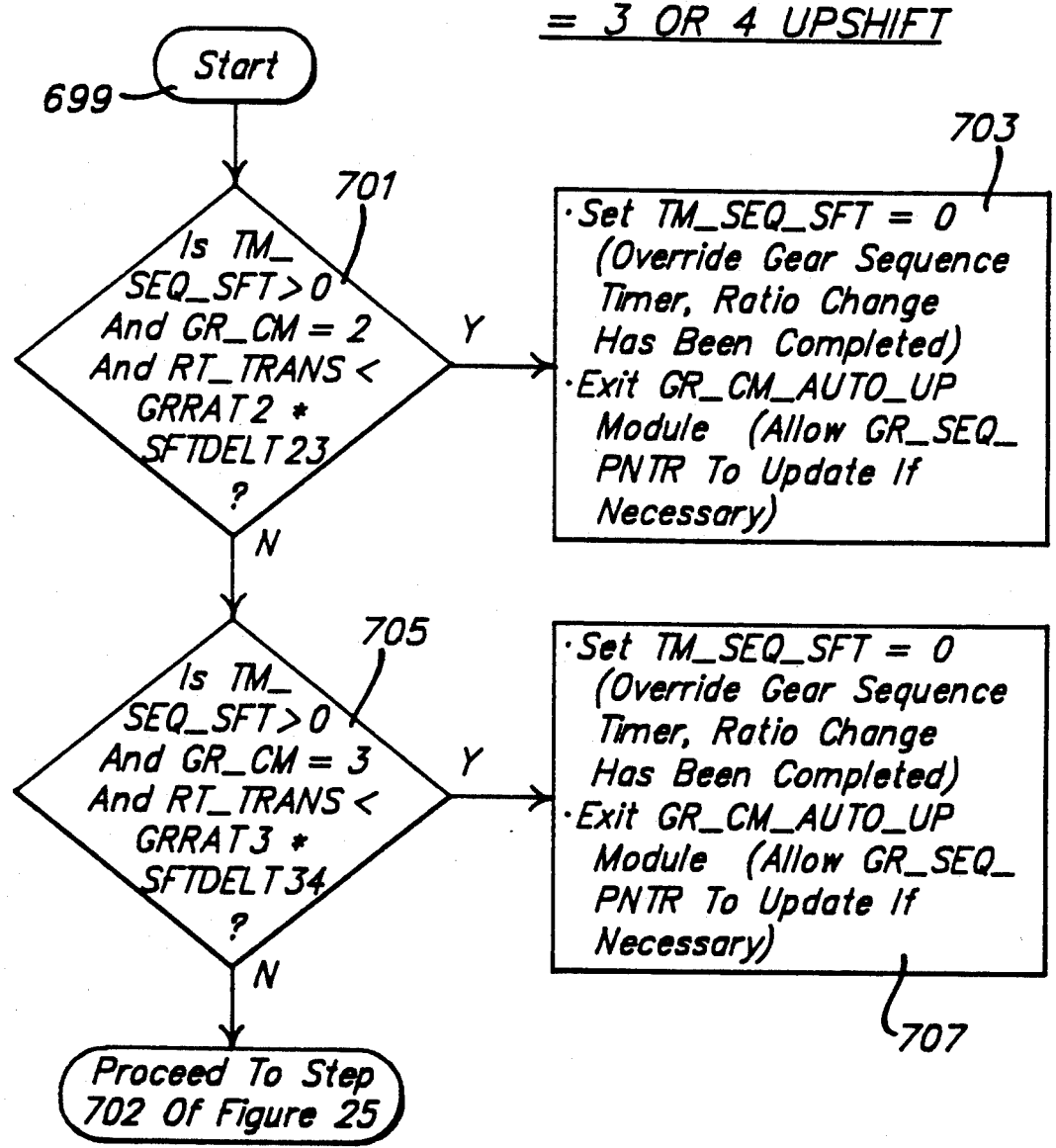

The flow charts of FIGS. 24A and 25 illustrate the sequence of steps for this module. In FIG. 24A, the routine begins at step 699 and proceeds to make an inquiry at step 701 to determine whether the sequence timer TM_SEQ_SFT is greater than zero. That is, a check is made to determine whether the timer still is running. It is determined also whether the gear commanded is 2 and whether the number in register RT_TRANS, which is a register containing the transmission gear ratio, is less than the second gear ratio GRRAT2 times the calibration constant SFTDELT23. This value for gear ratio is a calibrated ratio. It is compared to the value for second transmission ratio RT_TRANS, thus making possible determination if the 1-2 shift has been sufficiently complete so that a command of a 2-3 shift can be initiated before the 1-2 shift actually is fully completed.

If the conditions indicated at step 701 are true, the routine proceeds to action block 703 where the sequence timer TM_SEQ_SFT is cleared. The gear sequence timer count is thus overridden so that the routine will act as though the ratio change already has been completed. Thus, the sequence timer TM_SEQ_SFT acts as a default timer which allows the shift sequence to proceed if it has not previously been overridden by the effect of the data fetched from the register RT_TRANS.

After the sequence timer TM_SEQ_SFT has been cleared, the routine exits. If necessary, a special procedure may be used for allowing the module GR_SE-Q_PNTR to update the gear sequencing information.

If the inquiries at step 701 are not all true, the routine will proceed to make an inquiry at step 705 with respect to the next step of the multiple ratio shift. It is determined at 705 whether the gear commanded is 3 and whether the count of the sequence timer TM_SE-Q_SFT is greater than zero. As in the case of the previous routine at step 701, a check is made to determine whether the transmission ratio RT_TRANS is less than the gear ratio corresponding to the commanded gear (third gear) times the calibration constant for shift delay, SFTDELT34. This means that the routine at 705 will determine whether a 2-3 shift has been sufficiently complete in advance of expiration of the timer value in the default timer TM_SEQ_SFT for a shift command to take place indicating a 3-4 upshift. If the inquiries at step 705 are positive, again the sequence timer TEM_SEQ_SFT will be cleared, thus overriding the normal gear sequence timer function. Again, the timer TM_SEQ_SFT acts as a default timer which will allow a 3-4 upshift command when it is cleared if it has not previously been cleared by the preceding steps. The setting of the timer occurs at action block 707.

If the inquiries at step 705 are not true, the routine will proceed to step 702 of FIG. 25.

An inquiry is made at step 702 to determine whether the flag delay commanding a gear change is set. This flag will be cleared upon exiting this routine from the last shift. At the beginning of a new routine, therefore, the flag is set as shown at action block 706, following a check at step 704, and the delay shift timer is set to TMDELUP. Thus, at step 702, a check is made to determine whether the shift delay timer is run down and to determine whether the flag commanding an upshift has been set. If the timer is running, the routine exits as indicated. Similarly, if the sequence timer TM_SE-Q_SFT is still running, as indicated at step 708, the routine also will exit.

The value TMDELUP for the delay shift timer is a value that is incremental to the timer value for timer TM_SEQ_SFT for each ratio shift during a multiple step shift. That incremental timer value is added to the shift delay time as will be explained with reference to FIG. 27A. As explained earlier, the sequence timer can be cleared by being overridden at steps 703 or 707.

If the flag FLG_DE_CMGR is set, as shown at 710, and a time delay shift timer has expired, as indicated also at step 710, then the flag FLG_DE_CMGR is cleared and the commanded gear is set equal to the contents of the address pointed to by the gear sequence pointer and the pointer is incremented to point to the next gear in sequence. That is followed by the upshift delay sequence routine. This action is set forth in action block 712 of FIG. 25.

The upshift delay logic is set out at FIG. 26. If the commanded gear is equal to the gear desired as indicated at step 714, that means that either a single step shift has occurred or the last step of a shift sequence has occurred. If that is true, then the sequence timer is cleared, since no sequencing is required further, as indicated in action block 716. On the other hand, if the gear commanded is equal to 2, as indicated at step 718, this indicates that the routine is performing a 1-2 upshift as part of a multiple-step shift. The reason this is the first step of a multiple-step shift rather than a mere upshift into the second gear is because even though the commanded gear is 2, it is not equal to the gear desired. The gear desired is higher than 2 in this instance. Thus, the sequence timer must be set and this is done at action block 720. Then the routine exits as indicated in the diagram of FIG. 17.

If the gear commanded is 3, as indicated in the step 722, this indicates that the routine is sequencing a 3-4 upshift. In that case, since the inquiry that occurs at step 722 is positive, the sequence timer for a 3-4 upshift is set as indicated at action block 724. This timer controls the shift time during a shift sequence from 3 to 4 on a multiple-step upshift, just as the timer at action block 720 controls the time for a 2-3 upshift during a multiple-step upshift.

The behavior of the timers during the shift sequencing of a multiple step upshift is graphically illustrated in FIG. 27A. In the left column of FIG. 27A, the various timers are identified. These are the shift verify timer TM_VER_SFT, the shift sequence timer TM_SE-Q_SFT, the shift delay timer TM_DEL_SFT, and the shift in progress timer TM_SFT_IN. The ratio values for each step of a multiple step shift are indicated as gear desired GR_DS and gear commanded GR_CM. For each of the desired gears, there is a TV value represented by the register GR_DS_TV.

If the gear desired, the gear commanded and the gear desired TV all correspond to the first gear ratio as indicated on the left-hand column of FIG. 18a and a new desired gear is determined indicating a 1-4 upshift, the shift verify timer TM_VER_SFT is set as indicated at 719. The value for the timer is equal to TM_VE_UP. During the time represented by the sloping line 721, the timer permits the processor to verify that a shift to the fourth ratio is desired or appropriate. A TV adjustment appropriate for second gear is made at that instant in advance of the command of second gear. After the timer runs down at point 723, the first step of the shift is commanded; that is, a shift from the first ratio to the second ratio is commanded. The first step of the multiple ratio shift is commanded at 723 and timer TM—SEQ—SFT is set to a value TMSQ23P4, which indicates the time to be spent in second gear before a 2-3 shift begins. At the same time, the shift in progress flag is set to a value equal to TCUPON as shown in FIG. 27A at 725. When the shift sequence timer is run down, the delay shift timer TM—DEL—SFT is set to a value equal to TMDELUP as indicated at 727. This permits the processor to set the TV value that is appropriate for a 2-3 shift. This occurs in advance of the command of the shift to permit the TV pressure to assume its new value before the shift is complete as shown at 729. The 2-3 shift is commanded at 729 after the time TCUPON expires.

When the shift in progress timer runs down and a 2-3 shift is commanded, the sequence shift timer TM—SEQ—SFT is set at a new value equal to TMSQ3P4 as shown at 731. Further, shift in progress timer TM—SFT—IN is reset as shown at 733. This timer is set at a value that runs through to point 735 at which time the 3-4 gear shift delay is complete. Prior to that time, however, the time delay shift timer TM—DEL—SFT is reset as shown at 737, thus allowing the TV to assume its appropriate value for fourth gear. As in the case of the other shifts, the TV is adjusted in advance of the completion of the 3-4 shift.

After the 3-4 shift is commanded at 739, the shift in progress timer, which is set at 739, runs down to its ultimate zero value at 741. At that time, the 3-4 shift is complete.

Shift Control Modules (Commanded Gear PRNDL=3 or 4 Downshift Logic)

This module determines a commanded gear on a downshift when PRNDL=3 or 4. On multiple step shifts, the sequence for each shift of the multiple-step shift is calibratable using the GR—SEQ—PNTR calculation procedure, as explained previously.

This module determines the time that is spent in the intermediate gears of a multiple-step shift.

Figure 28:
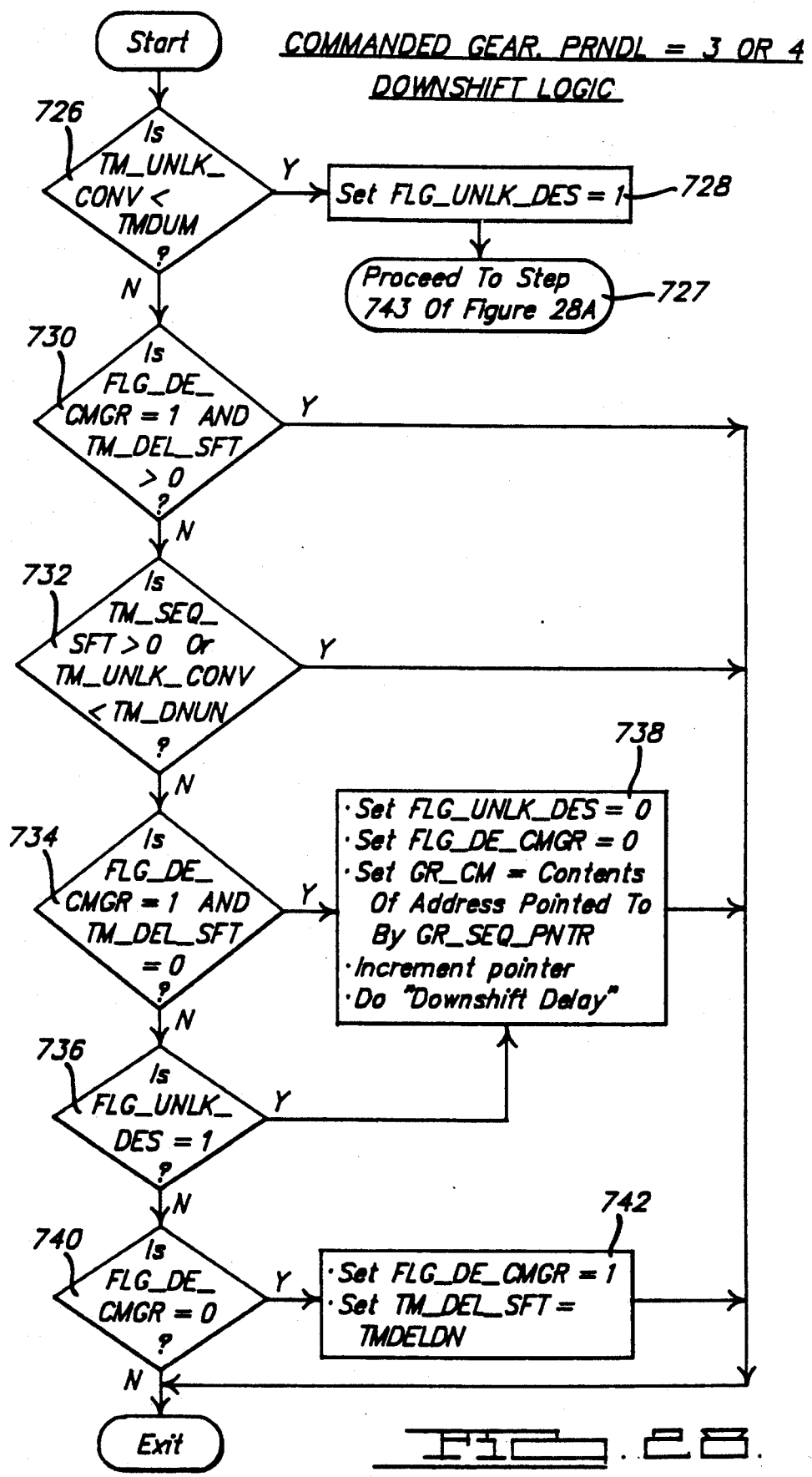
FIGS. 28 and 28A show a flow chart of the control strategy for the Commanded Gear, PRNDL=3 or 4 downshift logic.
Figure 28A:
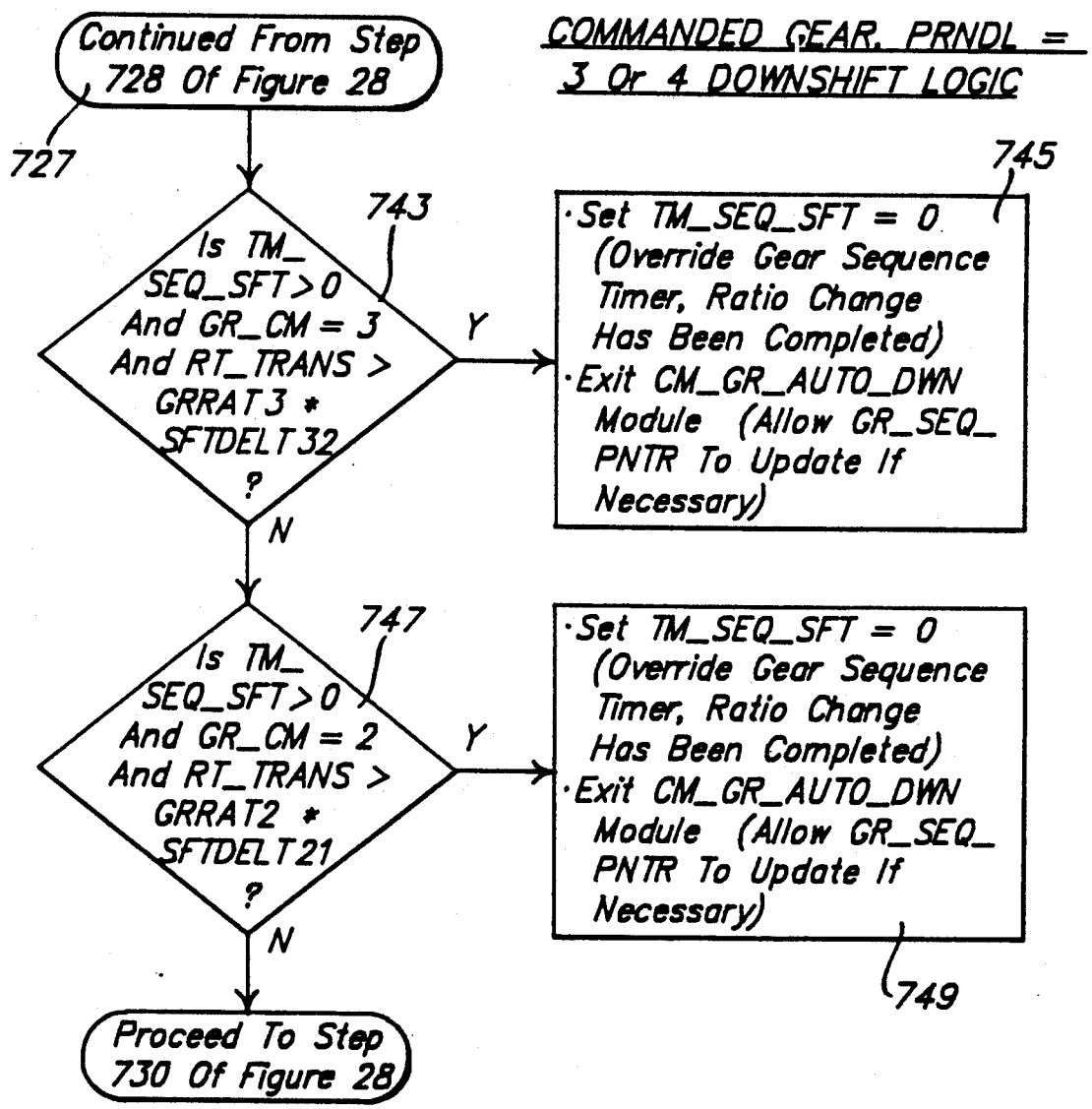

The routine of FIGS. 28 and 28A is comparable to the routine of FIGS. 24a and 15, but it is distinguished because provision must be made for unlocking the converter during downshifts. All downshifts are made with an open converter so the converter clutch must be disengaged. Thus, the first step of the routine of FIG. 28 shown at step 726 involves an inquiry to determine whether the timer that controls the unlocking of the converter will permit an unlock to occur. If it will, the flag calling for an unlocking of the converter is set in action block 728 where flag FLG—UNLK—DES is set.

As seen in FIG. 28A, following step 728 of FIG. 28, the routine proceeds as indicated at 727. An inquiry is made at step 743 to determine whether the shift sequence timer TM—SEQ—SFT is still running and whether the commanded gear for the shift solenoids is equal to 3. A check also is made to determine whether the transmission gear ratio is greater than the gear ratio for third gear times the calibration constant SFTDELT32 of the 4-3 downshift. If the gear ratio multiplied by that calibration constant is less than the transmission ratio, the shift sequence timer is forced to its zero state which overrides the gear sequence timer operation that normally would be in effect. This would indicate that the 4-3 downshift is sufficiently complete to enable the routine to continue. If the shift sequencing timer is zero, the routine exits as in the case of the 3-4 upshift routine described previously. This action is set out in action block 745 of FIG. 26A.

If any of the three conditions set out at step 743 is not true, the routine will proceed directly to step 747 where an inquiry is made in a manner similar to the inquiry at step 743. In the case of step 747, the inquiry is to determine whether the gear sequencing timer is still running and whether the commanded gear is two and, further, whether the gear ratio is greater than the gear ratio for second gear operation multiplied by a calibration constant SFTDELT21. If the conditions at step 747 are satisfied again, the gear sequencing timer TM—SEQ—SFT is set to zero, overriding the gear sequence timer function. This would indicate that the ratio change from 3 to 2 is sufficiently complete to enable the routine to continue. This action is set out in action block 749. After the gear sequencing timer is set to zero, the routine exits as indicated in action block 749.

If conditions set out at step 747 are not all true, the routine will proceed to step 730 of FIG. 28. At step 730 in FIG. 28, an inquiry is made to determine whether the delay timer flag on the first pass through the routine is set and whether the shift delay timer TM—DEL—SFT is running. If both of these conditions are true, the routine then exits. If either of these conditions is not true, a check is made at step 732 to determine whether the converter clutch unlock timer TM—UNLK—CONV is less than the calibrated timer value TMDNUN. If the converter clutch timer has not run down, the routine then exits. In that case, there is no change in gear commanded. Otherwise, if the delaying of the shift is finished and the shift command delay flag is set as indicated at step 734, or if flag unlock desired is set as indicated as step 736, then the flag unlock desired FLG—UNLK—DES is cleared as indicated at action block 738 and the shift command delay flag is cleared, indicating that the shift delay time is expired. Further, the commanded gear is set equal to the contents of the address pointed to by the gear sequence pointer GR—SEQ—PNTR and the pointer is then incremented to point to the next gear in the sequence. If action block 738 is reached during the routine, the downshift delay logic is performed. After that occurs, the routine exits, as indicated in FIG. 28.

If any of the conditions at steps 734 and 736 is not true, an inquiry is made at step 740 to determine whether the shift delay timer flag FLG—DE—CMGR is clear. If it is clear, it is set at action block 742, and the timer TM—DL—SFT for delaying the shift to permit a TV pressure build-up to occur is set equal to the calibrated value TM—DEL—DN. This is indicated at action block 742. The routine then exits, as indicated.

If the downshift delay logic indicated at action block 738 is to be carried out, the steps shown in the flow chart of FIG. 27 are executed.

As shown in FIG. 27, a check is made at step 744 to determine whether the gear commanded is equal to the gear desired, which would indicate that the controller is executing a single step downshift or is executing the last step of a sequenced downshift. If that is true, the sequence timer can be cleared as shown in action block 746. If the gear commanded is 3, as shown in step 748, that means that the controller is executing a 4-3 downshift as part of a sequenced downshift, and it is necessary to set the shift sequence value equal to TMSEQ32P4, as indicated at action block 750. This sets the maximum amount of delay during the portion of the shift sequence when the transmission changes ratio from 3 to 2. The ratio change actually will occur, however, when the shift sequence timer is overruled as the gear ratio RT_TRANS reaches the calibrated gear ratio value stored in memory as explained previously.

If the routine proceeds to a point where the gear commanded is 2, an inquiry is made to determine whether the gear commanded is 2. This occurs at step 752. If the inquiry is positive, then the transmission is performing a 3-2 downshift as part of a multiple-step downshift which requires the sequence delay timer to be set at action block 754 so that it will equal a value TMSQ21P4. After that occurs, the routine exits as indicated.

Shift Control Modules (Commanded Gear PRNDL=3 or 4 Downshift Logic—3-2 Downshift Control)

A special strategy is used to establish optimum shift quality during a 3-2 downshift. This will be an expansion of the general description dealing with the shift solenoid states at the beginning of this specification. The special control routine that is used involves calibratable times for release of the direct clutch and compilation of the low-and-intermediate servo. Separate calibratable times are provided for power-on 3-2 downshifts and for power-off 3-2 downshifts. This procedure requires control of the solenoid states of the two shift valve solenoids 462 and 464, hereinafter referred to as SS3. The timing requires the use of a high speed foreground microprocessor control loop to precisely time the synchronous action of the release of the direct drive clutch and the application of the low-and-intermediate servo during 3-2 downshifts. The downshift control is more effective if the high speed foreground control loop, also known as the millisecond repeater control loop, is used rather than the longer background control loop.

As explained previously with respect to the valve circuit diagrams of FIGS. 13a through 13d, the states of the solenoids will determine the positions of the two shift valves 482 and 480 as well as the position of the forward clutch control valve 372. When the transmission is conditioned for third gear operation and the transmission is operating in steady state with no shift occurring, solenoid SS1 is OFF, solenoid SS2 is OFF, and solenoid SS3 is ON provided the PRNDL lever is in the overdrive position. This condition is described, furthermore, in FIG. 20 where it is shown that, during operation with the PRNDL lever in the overdrive position, third gear operation with engine braking is available when solenoids SS1, SS2 and SS3 are OFF, OFF and ON, respectively.

In order to effect a power-on downshift to the second ratio, it is necessary, as explained previously, to apply the low-and-intermediate servo in synchronism with the release of the direct drive clutch. That requires solenoids SS1, SS2 and SS3 to be ON, ON and OFF, respectively, as indicated in FIG. 20. This solenoid state is the final state after the 3-2 downshift is completed.

Figures 30, 30A:
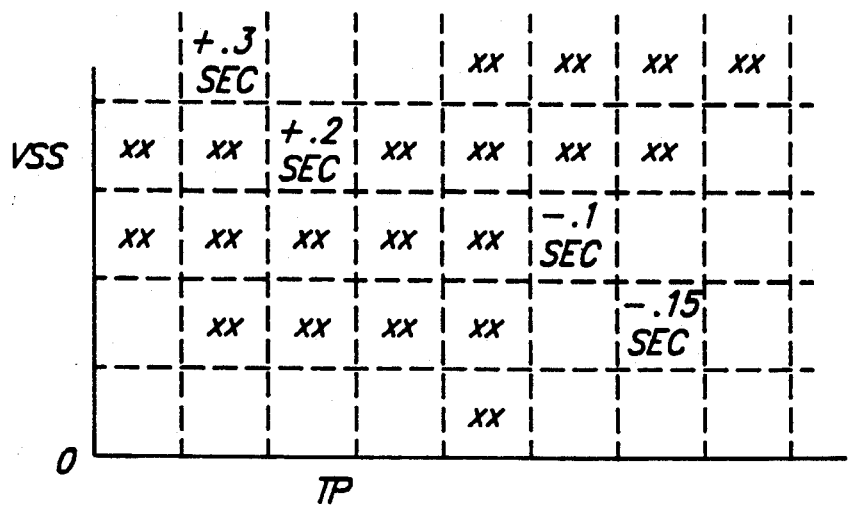
FIG. 30 is a chart showing the various solenoid states for various downshift indications on a 3-2 downshift.
FIG. 30A is a table in memory showing timing calibration constants as a function of vehicle speed and throtle position during a 3-2 downshift.

In FIG. 30, I have illustrated the initial state that will effect third gear operation as well as the final state that will effect second gear operation. Intermediate the initial state in which the solenoids are conditioned for third gear operation and the final state in which the solenoids are conditioned for second gear operation, there are two intermediate states. These are identified in FIG. 21 as the first state and the second state. The shift duration is divided into these segments so that the two intermediate states occur, one after the other, during the shift to modify the shift timing, thus effecting maximum smoothness in the 3-2 downshift.

During normal operation in the second ratio as explained with reference to the valve circuit diagrams of FIGS. 13a through 13d, the application of the low-and-intermediate servo and the release of the direct drive clutch will result in second gear operation. In the first state identified in FIG. 30, the low-and-intermediate servo apply pressure is present, but it is a regulated pressure. It is maintained at a value intermediate the value for the initial state and the value required to fully engage the low-and-intermediate brake. Also, as explained previously with respect to FIG. 13d, the engagement valve 362 is shifted to the left against the force of the valve spring, thereby permitting regulated line pressure from the 3-2 servo regulator valve 406 to pass through the engagement valve whereby regulated pressure is distributed to the apply side of the low-and-intermediate brake B2. Furthermore, as explained earlier with reference to FIG. 13d, the engagement valve is moved to the left under the influence of line pressure in passage 360. Thus, following the initial state indicated in FIG. 30, the first state indicated in FIG. 30 is characterized by partial engagement of the low-and-intermediate brake B.

The next state, identified in FIG. 30 as the second state, results from the transition of the solenoids SS2 and SS3 from the OFF condition to the ON condition. This will cause the 2-3 shift valve to shift in a left-hand direction, thus causing the forward clutch control valve to shift in a left-hand direction. This will cause the forward clutch to become exhausted as well as the release side of the low-and-intermediate servo, as explained previously. Also as explained previously, this introduces orifice 446 and orifice 444 into the exhaust flow path for the fluid for the direct clutch and the release side of the intermediate servo. The calibration of the orifices will control the timing of the release of the direct clutch and the application of the low-and-intermediate brake B2.

When the final third state is reached during the shift, solenoid SS3 is turned OFF while the other two solenoids remain ON. This will cause orifices 445, 444 and 430 to control the exhaust of fluid from the direct clutch and the exhaust of fluid from the low-and-intermediate servo release pressure chamber, thereby effecting a different rate of completion of the 3-2 shift.

The relationship of the condition of the solenoids to the functions of the orifices during the control of the release of the direct drive clutch and the application of the low-and-intermediate brake are illustrated at FIG. 22.

Figure 31:
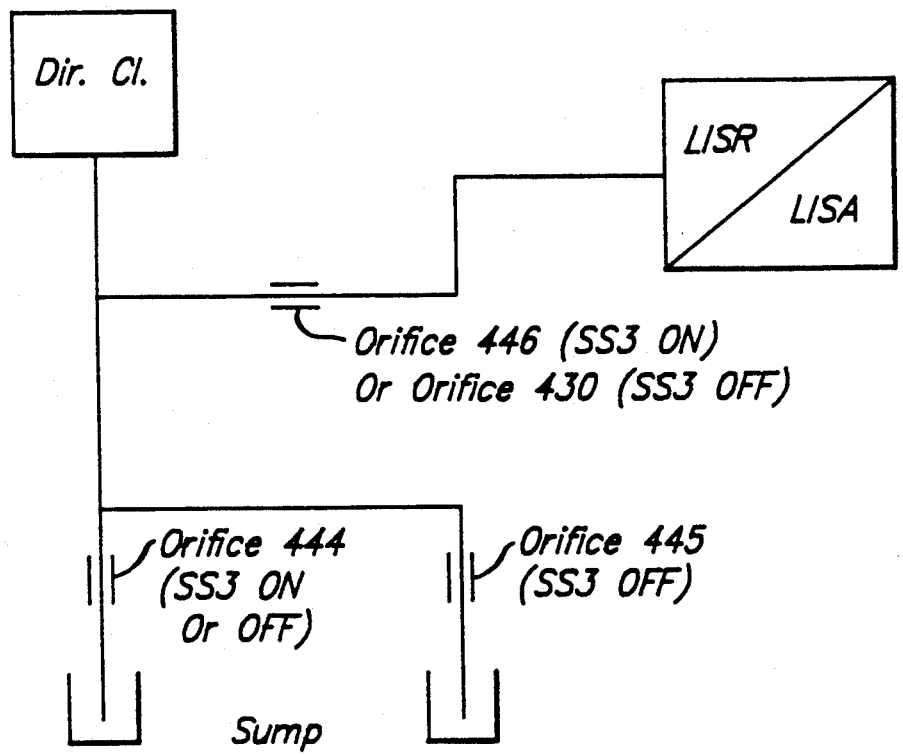
FIG. 31 is a diagram showing the orifices that are functional during various 3-2 downshift conditions as fluid flow from the direct clutch and the release side of the intermediate servo is controlled.

It is seen in FIG. 31 that the orifice that controls the rate of release of fluid from the release side of the low-and-intermediate brake servo may be orifice 446 or orifice 430 depending upon whether SS3 is ON or OFF. Likewise, orifice 445 is introduced into the exhaust flow path for the direct clutch and the low-and-intermediate servo release pressure chamber whenever SS3 is OF, but that flow path is not available when SS3 is ON. ON the other hand, orifice 444 is available to control the exhaust of fluid from the direct drive clutch and the low-and-intermediate servo release chamber when SS3 is either ON or OFF. It is apparent, therefore, that the state of the solenoids can be controlled to divide the 3-2 shift interval into three segments. By controlling the timing of the solenoids, the timing of the three downshift states thus can be controlled.

Because of the short duration of each of the states of the 3-2 downshift solenoids, a faster foreground microprocessor control loop is required. In the first step of the strategy for controlling the three solenoids, a check is made to determine whether the gear commanded during the last background pass is equal to three. A clock time at the instant the 3-2 downshift is commanded is captured and stored in temporary memory, which records the time that the sequencing through the various downshift states begins. In the next step of the strategy, the processor will point to a table in a memory register to select and assign a time for the shift to be completed. This information is obtained from a table such as that shown in FIG. 30A where throttle position is plotted against vehicle speed. The processor then will check to determine whether the value fetched from the table in FIG. 30A is positive or negative. If it is negative, the flag is set. This will initiate a solenoid state control routine that will be described later. If the value stored in the table and fetched is positive, that flag is cleared and the routine then will exit to the next control routine. The 3-2 downshift control then is finished.

In the next step of the routine, the absolute value that is fetched from the table of FIG. 30A is stored in temporary memory after it is converted from seconds to clock ticks by the use of an appropriate conversion factor. The value thus computed is a target time for the control of the solenoids SS1 and SS2. A similar procedure is used for establishing a target time for the control of solenoid SS3.

The target times thus established are stored in memory for addressing during the high speed foreground control loop. If the target time for a power-on 3-2 downshift control measured in clock ticks equals the stored value, and the previously described flag indicates a negative reading in the table of FIG. 30A, the flags are conditioned to turn SS1 ON and to turn OFF SS2. After the clock value becomes greater than the target values, the flags for controlling SS1 and SS2 are both set, thus causing SS1 and SS2 to be turned ON. This causes a change to the second state for the downshift as indicated in FIG. 30.

The control of the solenoid SS3 is done in the same fashion. As explained previously, a separate time value is computed using the information fetched from the table 30A in memory. If the clock value for SS3 is greater than its target value, the flag controlling SS3 is cleared and that results in SS3 being turned OFF. That causes the downshift state to change from the second state to the third state as indicated in FIG. 30.

If the 3-2 downshift is a power-off 3-2 downshift, rather than a power-on 3-2 downshift, separate calibration constants are used. If the downshift is a power-off downshift, a power-off mode flag is cleared. In that case, a power-off 3-2 downshift control logic will be carried out in a manner similar to the previously described 3-2 control shift logic except that different target times will be computed based upon the information that is fetched from the table of FIG. 30A in memory.

Part E—the Electronic Pressure Control Modules

The throttle pressure (TV) is regulated by the previously described TV solenoid valve, and the processor controls the TV solenoid valve in accordance with a strategy that will be described with reference to FIGS. 1 through 8E.

Electronic Pressure Control (Throttle Valve Pressure Guide)

As explained previously, the electronic pressure control strategy involves a table look-up to determine engine torque and the calculation of TV pressure to satisfy the static torque capacity requirements of the transmission as well as the inertia torque that is developed during a shift because of the change in rotary speeds of the torque transmitting elements including the engine. Also as explained previously, the throttle pressure is developed by a variable force solenoid which modulates the solenoid valve supply pressure to produce a TV pressure that is sufficient to hold the clutches and brakes. The static torque capacity has a corresponding TV component which is adequate to hold the weakest friction element as combustion torque is delivered through the transmission. The combustion torque is referred to in this description as torque-net (TQ_NET). The inertia torque component that is developed during a shift due to the change in speeds of the rotary elements is referred to in this description as TQ_IALPHA. Inertia torque is zero when a shift is not occurring. The total torque is equal to the sum of the combustion torque and the inertia torque values multiplied by the torque converter's torque ratio. This value determines the static TV capacity requirement, which is referred to as TV_STAT.

One of the other components of the total TV pressure (TV_PRES) as explained previously is the dynamic TV, which is the TV that is required to obtain an acceptable shift feel. The other component of the total TV pressure is the additional TV required during light throttle tip-in shifts and the additional TV that is required to compensate for hydraulic lag time in the hydraulic TV solenoid circuit.

The module in the processor that establishes the appropriate total TV pressure is the TV-GUIDE module. The TV-GUIDE module is executed once for each background loop except when either a spark retard or TV pressure modulation is called for, in which case the TV-GUIDE module logic is executed out of sequence.

As will be explained subsequently, the engine torque is modified by retarding the spark during a shift. When the spark retard is triggered, the normal background sequence for determining the TV pressure in the TV-GUIDE module is interrupted so that the proper TV pressure and the spark retard will be developed and delivered at the same instant. The spark retard is determined during a foreground processor control loop on demand every predetermined position of the crankshaft, regardless of the instant in the longer background processor control loop that occurs when the spark retard is triggered. This is achieved by means of a faster foreground loop of perhaps 100 microseconds in duration, which contrasts with the background loop duration which may be as long as 100 milliseconds. This eliminates an undesirable delay between the triggering of a spark retard and the next execution of the torque calculation in the TV-GUIDE module, thereby preventing inertia torque increase during a shift to be felt by the vehicle operator.

The input shaft speed or the turbine speed is monitored every foreground loop to determine the proper instant for the beginning of the inertia phase of the shift, which follows the torque phase, as will be explained subsequently. When the input shaft speed drops, as indicated by a turbine speed signal, and the amount of the drop is sufficient to carry the signal value below a predetermined value. A flag is set for determining the beginning of the spark retard. The flag is monitored during the foreground loop; and if it is set, the next execution of the normally scheduled module in the series of control modules is interrupted. After the flag is cleared, the TV-GUIDE module sequence is executed immediately as the next module in the background control loop. This results in a lower value for the engine torque calculation and a lower TV pressure that accompanies this retarded value. The lower TV pressure will be output during the next foreground pass of the processor in a time substantially less than the normal sequence time of about 100 milliseconds.

Electronic Pressure Control (Torque Calculation)

The first step in the sequence of the TV-GUIDE module is the calculation of net torque (TQ_NET) which, as explained previously, is the net torque that is delivered to the impeller of the torque converter by the engine.

In the first step in the routine, the flag FLG_TQ-M_BGS is cleared. That flag is the torque modulation TV pressure flag that was set when the background manager in the processor called for an interruption in the background loop to determine throttle pressure following the triggering of the spark delay.

The net torque is equal to the torque output under ideal conditions times a multiplier minus the friction torque, the accessory torque load on the engine and the air conditioning load on the engine, if appropriate. The torque output under ideal conditions equals the stored torque value for the engine for a given speed and load, which is obtained from a table in memory. That value is multiplied by a function stored in memory, which is the relationship between a multiplier value less than one and spark retard. For example, if there is no spark retard, the multiplier could be 1; but if the spark retard should be as much as 30 degrees, the multiplier would be zero. During a shift, the spark retard would be somewhere in the midpoint range between zero degrees and 30 degrees, so that the multiplier would be some appropriate value between zero and 1.

The value for friction torque is computed in the same fashion. The calibration constant appropriate for determining engine friction torque is determined by a predetermined relationship between engine speed and load. The values for the torque correction for accessory load and air conditioning load are determined in the same way.

Electronic Pressure Control (TV-GUIDE Continued)

Following the calculation of net torque, the TV-GUIDE module will continue in its sequence as follows, in accordance with the routine illustrated in FIG. 2. The sequence of FIG. 2 begins at 800 and proceeds to stage 802. At stage 802, an inquiry is made to determine whether the flag for engagement TV pressure is set. That flag is identified as FLG_ENG_TV. If it is set, that indicates that this is the first engagement for this background loop as the manual lever is shifted from the neutral or park position to the direct drive position 3. If this is an engagement corresponding to movement of the PRNDL lever to drive from neutral or park, the routine will then proceed to action block 804 which calls for the execution of the engagement stall TV logic. This will be described very briefly later. If this is not a neutral or park to drive shift, the routine then will proceed to step 806 where it is determined whether the vehicle is accelerating from a standing start, and if the speed ratio across the torque converter (SPD_RATIO) is at a low value; that is, a value equal to or less than the maximum speed ratio needed to do the stall TV routine (RTSTALL). If the answer to that inquiry is negative, the routine proceeds to step 808 where an inquiry is made to determine whether the filtered vehicle speed (VSBART) is equal to or less than a low vehicle speed (VSSTAL), which is the maximum vehicle speed necessary to do the stall TV routine.

If the answer to the inquiry at step 808 is positive, the routine then returns to step 810 to determine whether the shift in progress flag has been cleared, which would indicate that there is no shift in progress. If the answer to the inquiry at 810 is positive, then the routine at 804 may be carried out. If there is no shift in progress, which would cause a negative response to the inquiry at step 810, the logic will proceed by advancing to step 812 to determine whether the power-off shift logic should be executed. This is determined by making an inquiry at step 812 with respect to whether the flag indicating a power-off condition has been cleared. If the flag has not been cleared, the routine then will proceed to the power-off automatic shift mode from the power-off manual shift mode.

The routine appearing above reference line 814 in FIG. 2 corresponds to power-off manual shift operation, whereas the portion of the routine below reference line 814 indicates a power-off automatic shift operation.

If the inquiry at stage 812 is positive, a check is made of the flags at steps 816 and 818 to determine, respectively, whether the manual downshift flag has been set and whether the PRNDL position has been moved to manual "1" position. The first flag, namely FLG_SFT_MDN, indicates whether the power-off manual downshift is in progress. If this flag is set, the downshift is in progress. If it is cleared, the power-off manual downshift is not in progress. If both of the inquiries at steps 816 and 818 are positive, the routine will perform the coast-boost logic, as indicated at action block 820. This logic will be described very briefly later.

If the inquiries at steps 816 and 818 are both negative, the routine will proceed to step 822 to determine whether the timer for verifying the shift has expired. If the timer value is greater than zero, the shift still is being verified. If the inquiry at step 822 is negative (i.e., the timer is run down), the routine then proceeds to the power-off automatic shift mode, as indicated. If it is positive, the routine will proceed to step 824 where it is determined whether the PRNDL position is in 3. If it is not in 3, the routine will proceed to the automatic shift mode, as indicated. If it is 3, an inquiry then is made at 826 to determine whether the commanded gear is equal to 4. If both of the inquiries at steps 824 and 826 are positive, the coast-boost logic then will be performed, as shown at action block 820. As indicated previously, the PRNDL position 3 corresponds to a drive mode with coast braking capability as the clutch CL1 becomes applied.

If the routine is advanced to the power-off automatic shift mode, a check is made at step 828 to determine whether the power-off automatic shift mode flag FLG_PWR has been cleared. If it has not been cleared, the routine will then advance to action block 830 where the normal TV calculation sequence is carried out. On the other hand, if the flag is cleared, a power-off automatic shift routine will take place as the routine advances to step 832, where a check is made to determine whether the automatic shift in progress flag has been set. That flag is designated as FLG_SFT_IN. If that flag is set (i.e., it equals 1), the routine will then do the power-off automatic shift EPC logic, as shown by action block 834. That routine will be described subsequently with reference to FIG. 3. If flag FLG_SFT_IN is cleared, the sequence then will proceed to step 836 to determine whether the timer TM_VER_SFT has been cleared. That timer sets the delay time necessary to verify that the automatic shift being called out is the desired shift. If that timer is not cleared, that indicates that a new desired gear has been determined, but it has not yet been verified. This will permit the TV pressure to build up prior to the time that the shift has been verified in order to allow the TV pressure build-up to have a head start as the routine anticipates what the next gear will be during the power-off shift sequence.

The engagement stall TV logic routine is carried out in order to provide a greater TV value during drive engagement from neutral or reverse. This routine will not be described in particular further, however, since it does not form part of this invention.

The coast-boost logic routine supplies an increased throttle valve pressure which is delivered to the main regulator valve during manual downshifts and during operation in manual-low in the power-off mode as the vehicle is coasting. As in the case of the engagement stall TV logic, the coast-boost logic will not be described in particular further since it does not form a part of this invention.

Electronic Pressure Control (Power Off, Automatic Shift Pressure Control)

Figure 3:
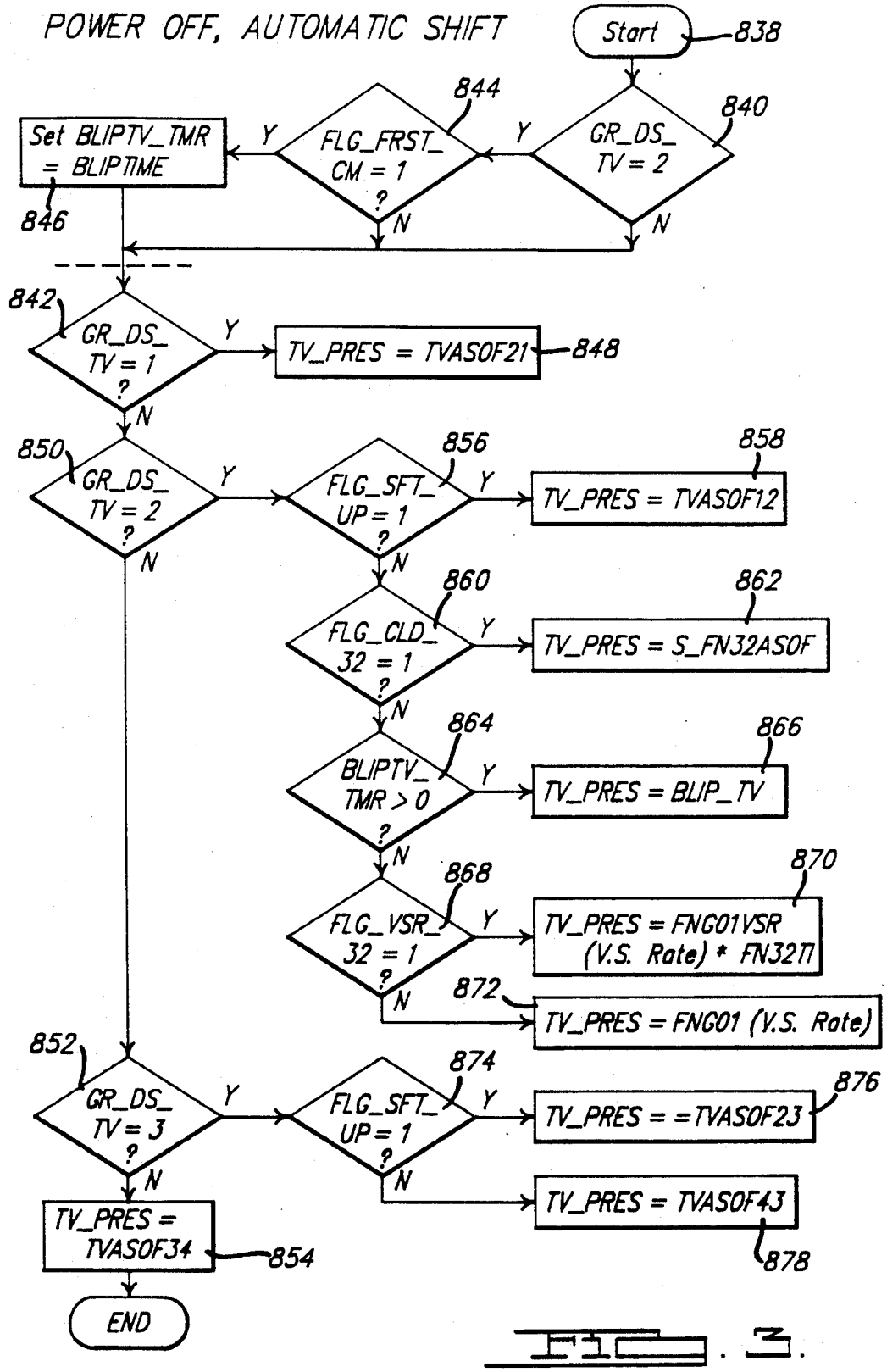
FIG. 3 is a flow chart showing the software strategy for the control module during the electronic pressure control for a power-off shift when the transmission is conditioned for the automatic drive mode.

The power-off automatic shift EPC logic will be described with reference to FIG. 3. This logic calculates the electronic control pressure during automatic power-off shifts, including 3-2 coasting downshifts. Included in the routine of FIG. 3 is a check of a flag that determines whether the vehicle is undergoing hard deceleration. If it is, a special routine is carried out, as will be described with reference to FIGS. 7 and 8.

The electronic power-off shift routine of FIG. 3 begins at 838. A register then is checked, as indicated at 840, to determine whether the gear desired in memory for the electronic pressure control (EPC) calculation is equal to 2. If it is not, the routine will proceed to step 842 where an inquiry is made to determine whether the gear desired for the EPC calculation is 1. If the answer to the inquiry at step 840 is positive, a check is made at step 844 to determine whether the flag FLG_FRST_CM is set. This is the flag that indicates whether this is the first time the shift is commanded during the existing background pass. If the flag at step 844 is set, the timer BLIPTV_TMR is set to a value equal to BLIPTIME, which is a calibrated value to which the timer counts down. It controls the duration that is allowed for the 3-2 downshift to occur. Any throttle pressure boost that is determined for a 3-2 downshift will terminate after the timer BLIPTV$_{13}$TMR runs down; for example, after about 0.5 seconds. Thus, it is possible during a 3-2 downshift for the TV pressure to be different during the beginning of the shift than it is during the latter stages of the shift. Thus, the magnitude of the pressure made available to the friction elements of the clutches and brakes during a 3-2 downshift can be tailored so that the most desirable TV pressure as the direct clutch is becoming unloaded will be different than the correct pressure that should exist during the time the intermediate brake band is being loaded. The action block corresponding to the setting of this timer is shown at 846. After the timer is set at action block 846, the routine proceeds to the previously described step 842. Thus, the step 842 is reached if there is a negative response at either step 840 or 844, or if the timer at action block 846 is set following a positive response to the inquiries at steps 840 and 844.

If the gear for the TV calculation is "1" as indicated at step 842, a TV pressure that is proper for a 2-1 power-off shift is set at action block 848. The TV pressure is shown at action block 848 as TVASOF21. On the other hand, if the inquiry at step 842 is negative, the routine proceeds to inquire at step 850 whether the gear to be used in the TV calculation is 2. If it is not 2, that negative response indicates that there is no 3-2 downshift or a 1-2 upshift occurring, and the routine then proceeds to inquire at step 852 whether the correct gear to be used in the TV calculation is 3. If it is not 3, that negative response indicates, as shown in action block 854, that the correct TV pressure that should exist at this point in the routine is a TV pressure for a 3-4 power-off upshift. That is indicated at action block 854 as TVASOF34. The routine then ends after that determination.

If the inquiry at step 850 is positive, that indicates that the routine is conditioned for a 1-2 power-off upshift or a 3-2 downshift. If that is true, then a check is made at step 856 to determine whether the power-off upshift flag FLG_SFT_UP has been set, indicating that the shift point for the 1-2 upshift is satisfied. If that is the case, the proper TV pressure for the 1-2 upshift is set at action block 858. That value for TV pressure is TVASOF12.

If the flag at step 856 is not set but the routine has proceeded to step 856, that indicates that the routine is conditioned for a power-off 3-2 downshift. A check then is made at step 860 to determine whether the flag corresponding to a 3-2 coasting downshift with cold transmission oil has been set. This flag is a calibration tool to cause a different (higher) TV pressure for operation with cold oil. At this point in the routine, if the oil temperature is cold and if the flag is set at 860, a proper TV pressure is determined at action block 862 by referring to the memory to obtain a calibration constant equal to S_FN32ASOF, which is the calibration constant for the electronic pressure control for 3-2 downshifts with cold transmission oil.

If the transmission oil is not cold, the flag at step 860 is not set, in which case the routine proceeds to inquire at step 864 whether the timer BLIPTV_TMR has run down. That timer, as explained earlier, was set at action block 846. If the timer has not yet run down, the TV pressure is set at action block 866 at a value equal to BLIP_TV, which is the appropriate value for coasting downshift on a 3-2 coastdown during the initial stages of the 3-2 coastdown shift.

If the inquiry at step 864 is negative, which indicates that the timer set at action block 846 has not yet run down, the routine proceeds to inquire at step 868 whether flag FLG_VSR_32 has been set. This is the flag that is set when the vehicle is decelerating rapidly. This is called a hard deceleration mode, which might occur when the vehicle is coasting down while the vehicle brakes are applied. If the flag is set, an appropriate TV pressure is set at action block 870 so that it equals the functional value FNG01VSR (VS RATE) multiplied by the calibration constant FN32T1, which would indicate a hard deceleration. This is a functional value that is fetched from memory if the flag at step 868 is set.

On the other hand, if the vehicle is decelerating but it is not decelerating rapidly in the hard deceleration mode, the inquiry at step 868 would be negative. In that instance, the routine would proceed at action block 872 where a throttle pressure is calculated using a different calibration constant fetched from memory. That constant is a function of vehicle deceleration as is the constant at action block 870, but it is different than the constant at action block 870. The TV pressure determined at action block 872 for such soft deceleration is equal to FNG01 (VS_RATE).

Returning now to the inquiry at step 852, a positive response to the inquiry at step 852 would indicate that the transmission is in a 2-3 upshift mode, provided the flag at step 874 has been set. Thus, a positive response to the inquiry at step 874 would result in calculation of a TV pressure at action block 876 which would be appropriate for a 2-3 upshift. The TV pressure, as shown in action block 876, is TVASOF23 for a 2-3 upshift. On the other hand, if the flag at step 874 is not set, that indicates that the routine is conditioned for a 4-3 downshift. Thus, a negative response at step 874 will result in a calculation of TV pressure at action block 878 that would be appropriate for a 4-3 downshift. The TV pressure calculated for a 4-3 downshift is TVASOF43.

Electronic Pressure Control (Vehicle Deceleration Input)

Figure 7:
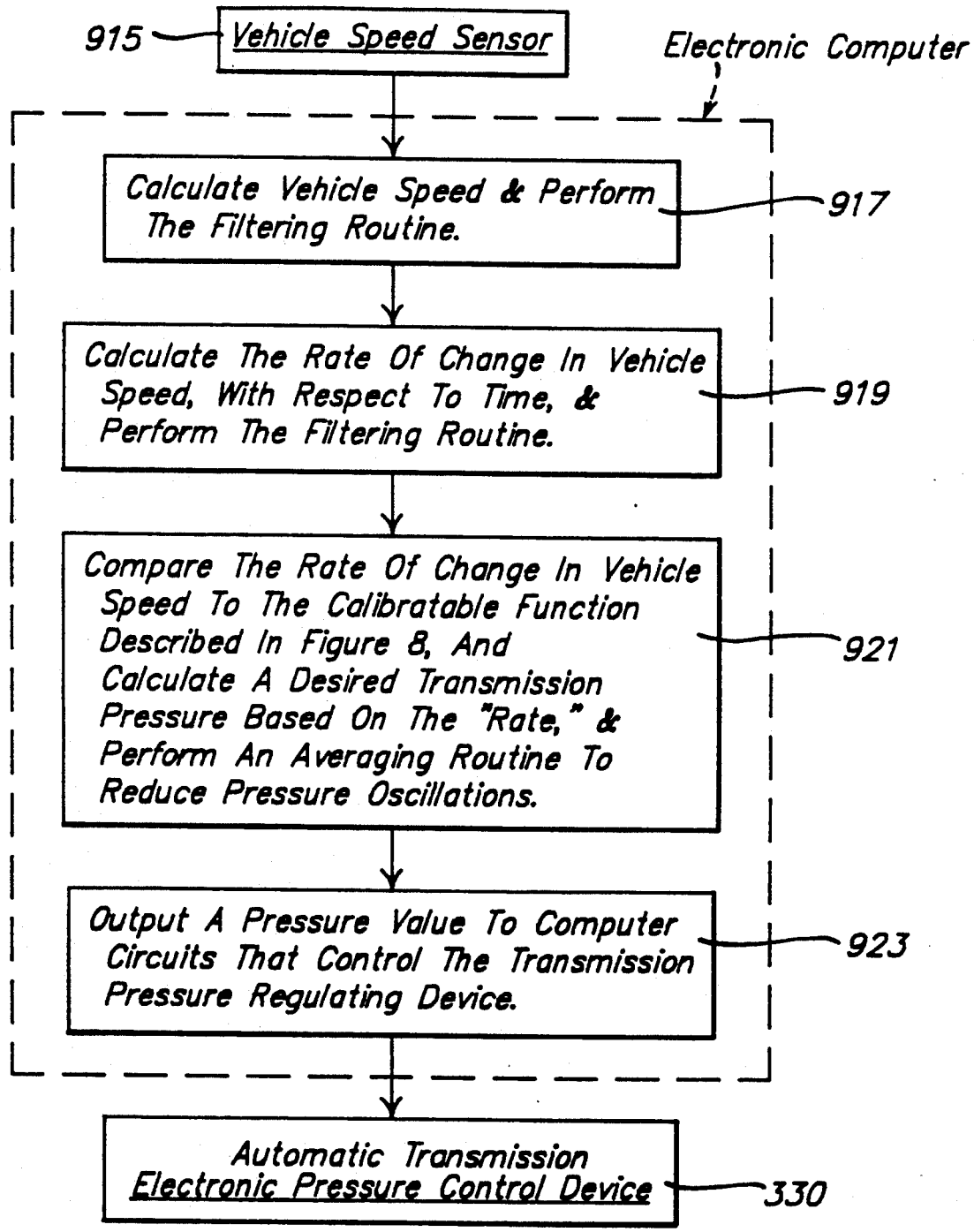
FIG. 7 is a chart that summarizes the actions that are required of the electronic processor while a ratio change is made with the engine throttle in a closed or coasting mode.
Figure 8:
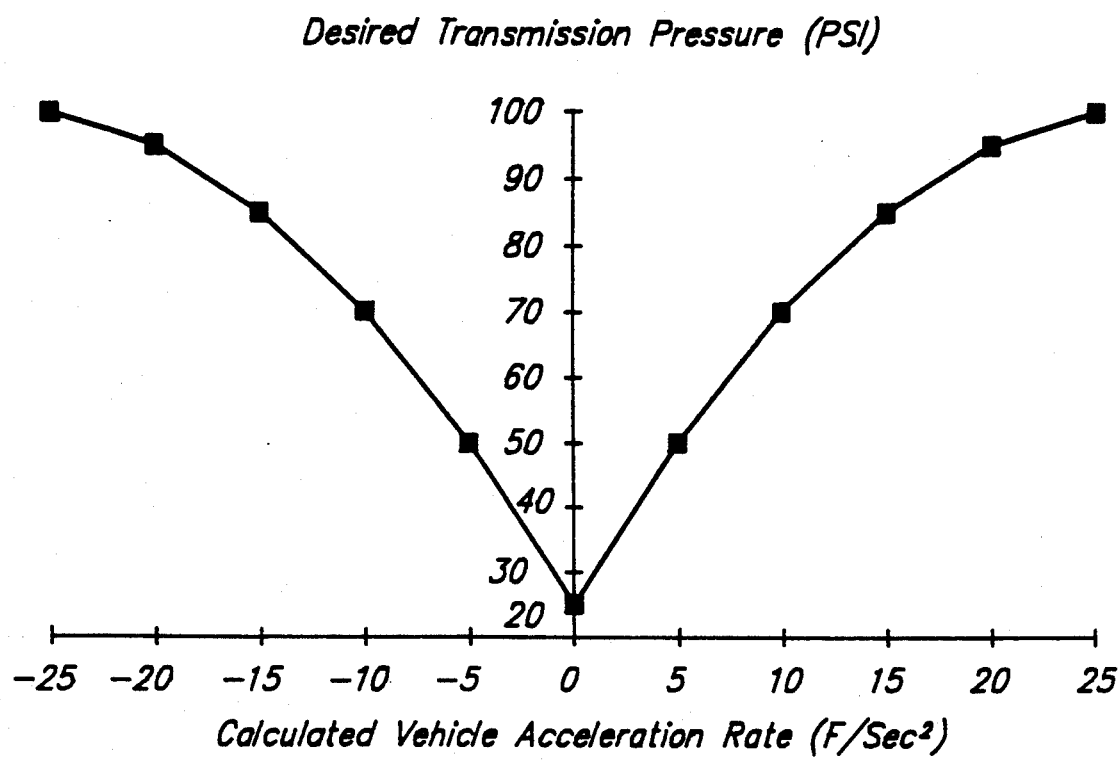

FIG. 7 shows the control routine that is followed in determining the TV pressure as a function of vehicle deceleration at either action block 870 or 872, depending upon whether the deceleration is hard or soft. The routine for calculating a pressure value involves first receiving a vehicle speed sensor signal as shown at action block 915. That signal, after conditioning, is received by the microprocessor arithmetic logic unit. After the vehicle speed is calculated using the speed sensor input and a filtering routine takes place at 917, the vehicle speed is differentiated to determine the rate of change in speed with respect to time. This occurs at action block 919. The result of that computation is transferred to action block 921 where the rate of change in speed determined at action block 919 is compared to the calibratable function for vehicle acceleration and an appropriate desired transmission pressure based on the stored value for that function is calculated. To eliminate pressure oscillations in this routine, the calculation at action block 921 involves averaging a given number of transmission pressures including the pressures determined in previous control loops. That average pressure then is output to the next action block 923 which calls for the outputting of the pressure value to the computer circuit that determines the output TV pressure.

Figure 8:
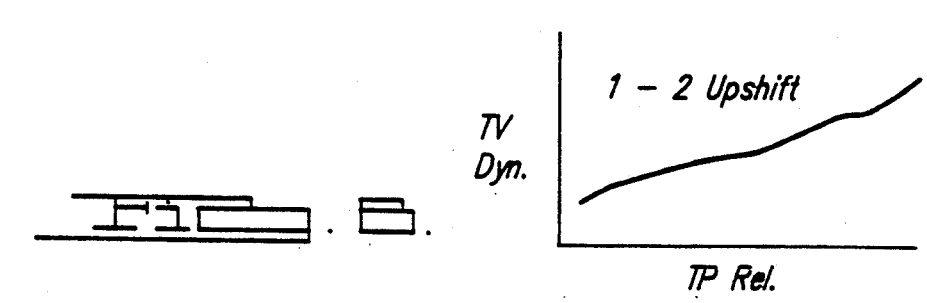
FIG. 8 is a chart showing the functional relationship stored in the memory of the processor indicating the variation of the desired transmission clutch or brake pressure for various values for vehicle deceleration during a ratio change in the closed throttle or coasting mode.

The functional relationship between vehicle acceleration and the desired transmission pressure, which is stored in memory, is illustrated in FIG. 8.

The output of action block 923 is received by the automatic transmission throttle valve assembly 330, which controls the main pressure regulator to produce an appropriate circuit pressure based upon the computed TV pressure. This was explained previously with reference to FIGS. 13a-13d.

Electronic Pressure Control (Effect of Deceleration on Shift Points)

FIG. 20A, as explained earlier, is a chart that shows the shift points for each of the ratio changes. The plot of FIG. 20A shows functions of vehicle speed and engine throttle opening. The 3-2 downshift has control considerations that are not present in the other ratio changes since the ratio change involves the release of a direct drive clutch and the application of a friction brake. Upon release of the friction clutch, the torque transmitting path to the brake drum for the intermediate brake B2 is interrupted. Prior to the 3-2 downshift, the brake drum rotates in the forward driving direction as it is locked for rotation in unison with the other gearing elements. As the direct drive clutch is released, a brake drum for brake B2 slows and tends to come to a stop. Unless it is anchored by the brake B2, the brake drum normally will tend to rotate in the opposite direction after the direct drive clutch capacity is reduced sufficiently. It is desirable to apply the brake B2 at the instant the drum rotation stops, or slightly before that moment is reached, in order to reduce the harshness due to the inertia torque developed during the shift. If the vehicle is being braked while such a coasting downshift is taking place, it is necessary to apply the brake band for brake B2 earlier in order to improve the shift smoothness. During such a coasting downshift, the electronic pressure control valve responds, as explained in a preceding section of the specification to increase the TV pressure causing the brake servo apply pressure to be increased, thereby accelerating the rate of application of the brake band.

In addition to this modification to the 3-2 shift control logic, it is possible to further improve the quality of the 3-2 coasting downshift during vehicle braking by tailoring the shift schedule of FIG. 20a so that if the vehicle is accelerating at a high rate, the 3-2 downshift event will be triggered earlier than otherwise would be the case in order to give the hydraulic control valve system more time to apply the brake band. Thus, the controller will ask for a 3-2 downshift earlier than normally would be the case.

Figure 32:
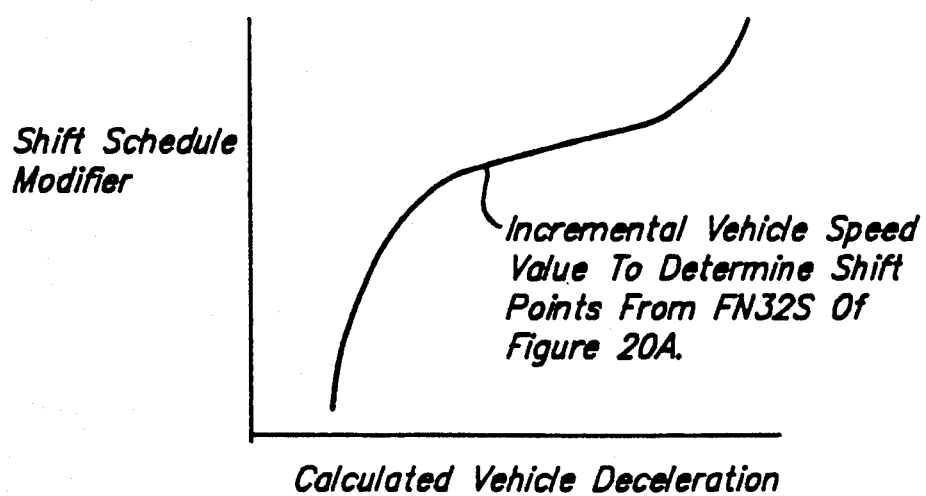
FIG. 32 is a plot of a function in memory showing the relationship of vehicle deceleration to a shift schedule modifier during a coasting 3-2 downshift.

The processor includes a shift logic module which is addressed and sequenced together with the other modules described in this specification. For each commanded gear, the processor will fetch from the information in memory, as represented by FIG. 20a, a suitable vehicle speed and engine throttle setting in accordance with this logic. Appropriate corrections can be made for changes in altitude and for changes in oil temperature. If the vehicle is decelerating, however, the shift points can be amended further as the shift logic causes a table cell in memory, such as the plot in FIG. 32, to be addressed. If the vehicle is decelerating, an appropriate value for a shift point adder value is fetched from the memory cell and is transferred to the arithmetic logic unit of the processor where the shift point speed is changed by the correction factor for deceleration. This in effect moves the 3-2 downshift schedule line of FIG. 20A to the right. This causes the shift point for any given throttle setting to occur earlier on a 3-2 downshift than otherwise would be the case, thus giving the hydraulics lead time to effect engagement of the intermediate brake. The effective vehicle speed at which a 3-2 downshift will occur then is equal to the normal downshift function FN32S plus the deceleration function fetched from memory; namely, FN32SADR, which is the vehicle speed adder for 3-2 downshifts.

Electronic Pressure Control (Normal TV Calculation)

Figure 2:
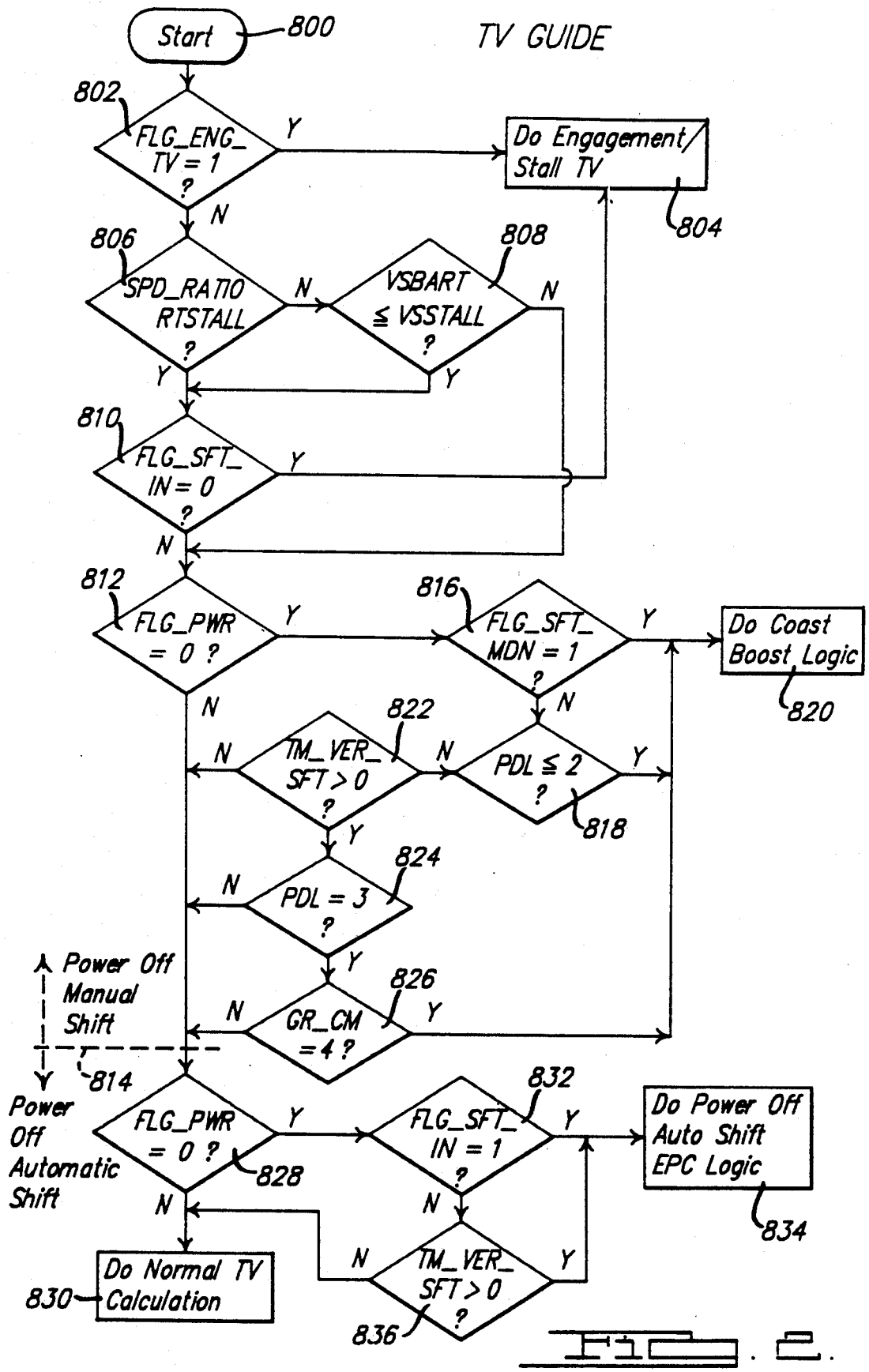
FIG. 2 is a flow chart showing the software strategy during execution of the TV-GUIDE module.

Referring again to the TV-GUIDE routine of FIG. 2, it is seen that the preceding description of the power-off 3-2 downshift occurs only if the conditions are correct for such a downshift to occur. If they are not correct for that downshift, the routine proceeds to action block 830, as explained previously, where a normal TV calculation takes place. The normal TV is computed in order to maintain the throttle pressure at a value that would maintain the designed torque capacity during normal operation of the transmission. That means that the torque capacity is maintained at its correct value during both driving and shifting for accommodating both inertia torque and static torque, which were described previously. In this routine, a flag indicating a shift in progress is called for is set and a check is made to determine whether in fact that flag is set. If it is, a further check is made to determine whether the gear desired TV is not the same as or equal to the commanded gear. If that is the case, then both a shifting static TV calculation occurs as well as a dynamic TV calculation. Both of these components of the normal TV calculation must be made if a shift is occurring.

If the flag indicating a shift in progress is cleared, that indicates that there is no shift taking place and that the desired gear TV pressure is equal to the TV pressure for the commanded gear. Thus, the TV pressure is merely equal to the static TV pressure.

If the operator is causing a so-called tip-in shift where the accelerator pedal is advanced rapidly, an additional component for TV pressure is added to adjust the TV pressure in order to compensate for system delays. This occurs before the shift in progress flag FLG_SFT_IN is cleared because a tip-in condition will anticipate that a downshift will occur. Thus, a calibration constant AETV, which is an anticipatory increment for heavy tip-in operation, is fetched from memory for use in calculating TV pressure. The filtered throttle position is calculated using a different constant in the TV routine to add extra TV pressure as a tip-in condition is detected.

During the normal TV calculation as explained previously, the static torque capacity is equal to the net torque plus the torque that is due to the change in ratio (TQ_IALPHA) multiplied by the torque ratio at the start of the shift. The static torque capacity is required by this calculation. It is required during shifting as well as when the transmission is not shifting. If the transmission is not shifting, the static torque capacity merely equals the net torque (TQ_NET) times the converter speed ratio under steady state conditions. We will describe next, therefore, the non-shifting static TV calculation, the shifting static TV calculation, and the inertia torque (TQ_IALPHA) calculation. All of these calculations are required in the proper selection of the value for TV pressure (TV_PRES) since the TV pressure equals the sum of the static TV pressure, either during non-shifting or shifting conditions, and the dynamic TV. A description of the dynamic TV calculation will occur following a description of the inertia torque calculation.

Figure 5:
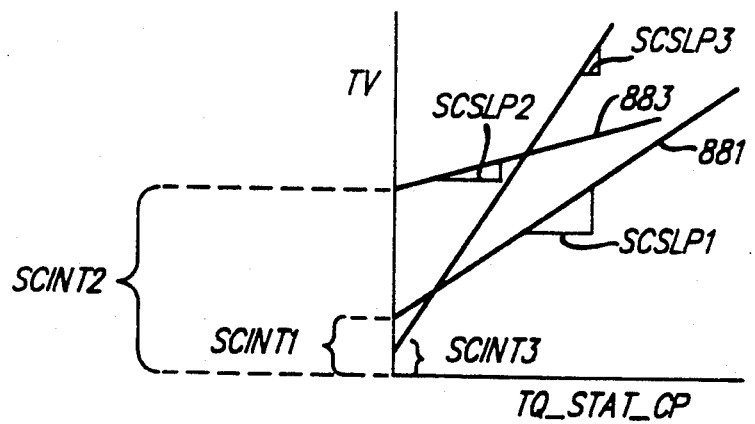
FIG. 5 is a graph showing the relationship between TV pressure and static torque capacity during shifts and the slopes and intercepts used in the TV calculation.

In the non-shifting static TV calculation, when the commanded gear is 1, the static TV (TV_STAT) required for determining static capacity is equal to static torque capacity, described previously, times a calibration constant SCSLP1 plus another calibration constant (SCINT1) which is a measure of the intercept in the plot of FIG. 5.

Referring next to FIG. 5, we have shown a plot of TV pressure versus static torque capacity under various operating conditions. This information is stored in memory and is addressable as the normal TV calculation routine is carried out. As seen in FIG. 5, the TV pressure rises as indicated at 881 when gear commanded equals 1. The line 881 will intercept the TV axis at a value equal to SCINT1, which is the intercept constant discussed earlier. The slope of the line 881 is indicated in FIG. 5 by the symbol SCSLP1. That is the constant that is used in the static TV calculation described earlier. Thus, the static TV calculation involves both a calibration constant equal to the slope of the relationship between TV and static torque capacity and the intercept value.

If the commanded gear is 2 during the non-shifting static TV calculation, the static TV (TV_STAT) equals static torque capacity times a different slope value appropriate for the second ratio. That value is identified in FIG. 5 as calibration constant SCSLP2, which is the slope of the line 883. The intercept value SCINT2 shown in FIG. 5 is the second calibration constant that is used in the calculation of static TV pressure when commanded gear equals 2. It is added to the first static TV component.

Similarly, when the commanded gear is 3, the static TV is computed as the sum of the intercept value SCINT3 in FIG. 5 and the slope value, which is equal to the static torque capacity times the slope SCSLP3.

If the commanded gear is not 1, 2 or 3, and the transmission is not shifting, the static TV then equals the static torque capacity times the slope value for the fourth ratio plus an intercept value for the fourth ratio. That is not illustrated in FIG. 5, but its plot would be similar to the plots that are shown in FIG. 5.

A shifting static TV calculation is carried out in a manner similar to the non-shifting static TV calculation, except that different data would be used rather than the data illustrated in FIG. 5. This means that the slope constants would be different, for example, during a 2-1 downshift when the gear desired TV equals 1 (GR_D-S_TV=1). The static capacity during the shift (TV_S-T_SFT) equals static torque capacity times the slope calibration constant plus the intercept calibration constant that is fetched from memory and that is appropriate for gear desired TV equals 1.

If the transmission is undergoing a 1-2 upshift, and the gear desired TV equals 2 and the 1-2 upshift flag (FLG_SFT_UP) is set, then the static TV pressure during that 1-2 upshift equals the static torque capacity times a new slope calibration constant (SCSLP2SU) plus the intercept constant.

The static TV calculation for a 3-2 downshift when gear desired TV (GR_DS_TV)=2 is computed in the same fashion except that different slope calibration constant is used. The same is true for a 2-3 upshift and a 3-4 upshift, as well as a 4-3 downshift.

The I_ALPHA torque calculation determines the torque that results from a transmission upshift or downshift that is required during the calculation of the static torque capacity, as explained earlier. This I_ALPHA calculation is added to the net torque during the static torque capacity calculation. In determining the I_AL-PHA torque on a 1-2 upshift, the inertia torque (TQ_IALPHA) equals the engine speed at the start of a shift times the calibration constant (TQIA12), which is appropriate for a 1-2 upshift. The same technique is used for each of the other shifts, except different calibrations constants are used. For example, on a downshift to the first gear, the inertia torque TQ_IALPHA equals the engine speed at the start of that shift times a different calibration constant (TQIA21). On a 2-3 shift where the commanded gear is 3 and the last commanded gear is 2, the inertia torque equals the engine speed at the start of the 2-3 shift times calibration constant TQIA32.

The dynamic TV calculation, as explained earlier, determines the TV pressure that is required to obtain good shift feel. The dynamic TV is one of the elements used in the total TV pressure calculation that is added to the static TV pressure during a shift.

In the case of a tip-out upshift, the dynamic TV equals zero. In the case of a 2-1 downshift, when the gear desired TV is 1, the dynamic TV (TV_DYN) equals a calibration constant obtained from a function stored in memory, as indicated in FIG. 6. That function is a plot of dynamic TV versus relative throttle position. For each relative throttle position, the dynamic TV calibration constant will be read. In the case of a 1-2 upshift, when GR_DS_TV equals 2 and the flag FLG_SFT_UP has been set, which calls for an upshift to the second ratio, the dynamic TV is obtained from a plot similar to the plot of FIG. 6 for the 1-2 upshift where dynamic TV is plotted against relative throttle position. Upshifts to third and downshifts to third, as well as upshifts to fourth, result in a dynamic TV calculation similar to the calculation for 1-2 upshifts and 2-1 downshifts. In the case of 3-2 downshifts, the procedure is modified, as will now be explained.

When gear desired TV calculation corresponds to second gear ratio data (GR DS TV=2), the dynamic TV (TV_DYN) equals a table value that takes into account filtered vehicle speed as well as a throttle position calibration constant which is fetched from a table stored in memory. That table value is equal to FN32DCT (VSBART, TP_REL). If the 3-2 shift occurs at altitudes where barometric pressure has an effect, the dynamic TV is modified further by adding to it a value also obtained from a table times an appropriate interpolation function for barometric pressure.

In the case of 1-2 upshifts, 2-3 upshifts and 3-4 upshifts, the dynamic TV (TV_DYN) is modified further by adding to it a "ramp TV". This additional element of the dynamic TV is not added for downshifts. It is added only for upshifts. The ramp TV pressure is a separate value that is read from memory and is added to the dynamic TV discussed previously. In the case of a 1-2 upshift, when the gear desired TV equals 2, and the upshift flag (FLG SFT UP) has been set, a TV ramp timer (TVRMPTMR) is set to a value equal to a calibration constant, obtained also from memory, which is appropriate for a 1-2 upshift. A TV ramp pressure will be added during the time that the TV ramp timer runs down.

If the shift is a 2-3 shift, the gear desired TV equals 3, and the flag FLG_FRST_CM has been set, indicating that this is the first time that a 2-3 shift is commanded in this background loop. The TV ramp timer then is set to a different value and the ramp TV pressure has a different value because it is read from a different plot stored in memory. Likewise, a 3-4 shift has a unique ramp TV timer value and a unique TV ramp pressure which are read from still another plot located at a different register in memory.

Electronic Pressure Control (TV Modification for Temperature)

After the normal TV calculation occurs at action block 830 of FIG. 2, the routine then will return to the portion of the TV calculation steps in the throttle valve pressure guide module (TV-GUIDE). This routine to which the processor returns is shown in the flow chart of FIG. 4.

Figure 4:
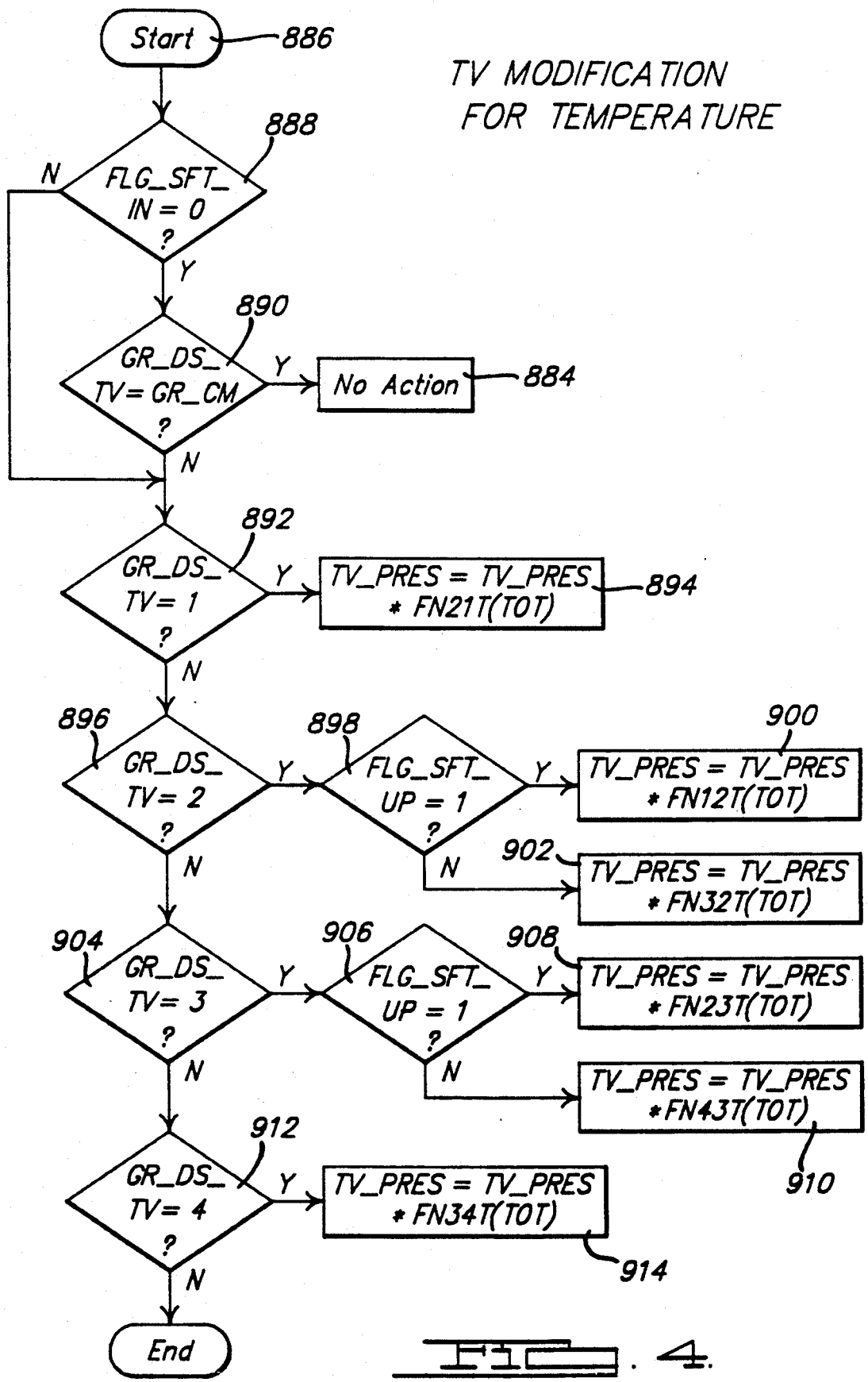
FIG. 4 is a flow chart showing the TV pressure adjustments that are made for transmission temperature during upshifts and downshifts.

In the routine of FIG. 4, the TV pressure will be modified to take into account adjustments that are necessary because of changes in oil temperature. This occurs only if a shift is occurring.

The routine shown in FIG. 4 starts at 886, and a check is made at step 888 to determine whether the shift in progress flag is cleared. If it is not cleared, the routine then jumps directly to portions of the flow chart where TV pressure is adjusted during shifts. If the inquiry at step 888 is positive, a test is carried out at step 890 to determine whether the gear desired TV is equal to the TV used during the gear commanded before. A positive response to both inquires at 888 and 890 indicates no action, as shown at 884.

If the inquiry at step 890 is negative, a test is made at step 892 to determine whether the gear desired TV is equal to 1 (i.e., the gear used in the TV calculation=1). If it is, that indicates that the transmission is downshifting from 2 to 1, in which case the TV pressure is equal to the TV pressure computed earlier in the throttle valve pressure guide routine times a TV pressure multiplier, which is a calibration constant FN21T (TOT). That constant is obtained from a plot stored in memory in which the relationship between the constant and the temperature is plotted, the constant being a function of temperature. This TV pressure calculation is carried out at action block 894.

A corresponding TV pressure calculation occurs for each of the other shifts to compensate for oil temperature changes. For example, if the gear desired TV is not equal to 1 but rather is equal to 2, as shown at action block 896, and if the upshift flag is set, as indicated at step 898, the TV pressure will be calculated as shown at action block 900. The TV pressure computed at action block 900 equals the TV pressure (TV_PRES) calculated earlier in the TV-GUIDE routine multiplied by a calibration constant which is a function of temperature and which is unique for a 1-2 upshift. This functional relationship is stored in memory. It is designated in FIG. 4 as FN12T (TOT).

If the upshift flag is not set, that means that the shift that is in progress is not a 1-2 shift but rather a 3-2 downshift. Thus, the routine will advance to action block 902 where a TV calculation is made that is appropriate for a 3-2 downshift. In action block 902, the TV pressure is equal to the TV pressure calculated earlier in the TV-GUIDE routine times a calibration constant which is a function of temperature. That function is shown in FIG. 4 as FN32T (TOT). If the transmission is in a power-on mode as determined by the state of flag FLG_PWR, then a different calibration function is used for 3-2 downshifts, although this is not shown at block 908 of FIG. 4.

If the gear desired TV is not equal to 2 in the inquiry that occurred at step 896, then an inquiry is made at step 904 to determine whether the gear desired TV is equal to 3. If it is equal to 3, and if the upshift flag is set as shown at step 906, a TV pressure will be calculated at action block 908 by multiplying the TV pressure determined previously in the TV-GUIDE routine by a calibration constant which is a function of temperature and which is appropriate for a 2-3 upshift. That constant is shown in FIG. 4 as FN23T (TOT).

If the upshift flag is cleared (i.e., the response at step 90b is negative), indicating that no upshift is occurring, then the transmission is engaged in a 4-3 downshift. In this instance, the TV pressure appropriate for a 4-3 downshift equals the TV pressure calculated earlier in the TV-GUIDE routine times the calibration constant FN43T (TOT), which is the appropriate value for the multiplier during a 4-3 downshift. This action is shown at block 910.

A negative response to the inquiry at 904 requires a test at step 912 to determine whether the transmission is doing an upshift to 4. If it is not, the routine is ended. If the response to the inquiry at step 912 is positive, a TV pressure calculation takes place at action block 914. In action block 914, the TV pressure calculated earlier in the TV-GUIDE routine is multiplied by still another multiplier, which is the calibration constant appropriate for a 3-4 upshift. As in the case of the other multipliers, this multiplier FN34T (TOT) is a function of temperature stored in memory.

Electronic Pressure Control (Events Generally Characteristic of Upshifts)

Figure 1B:
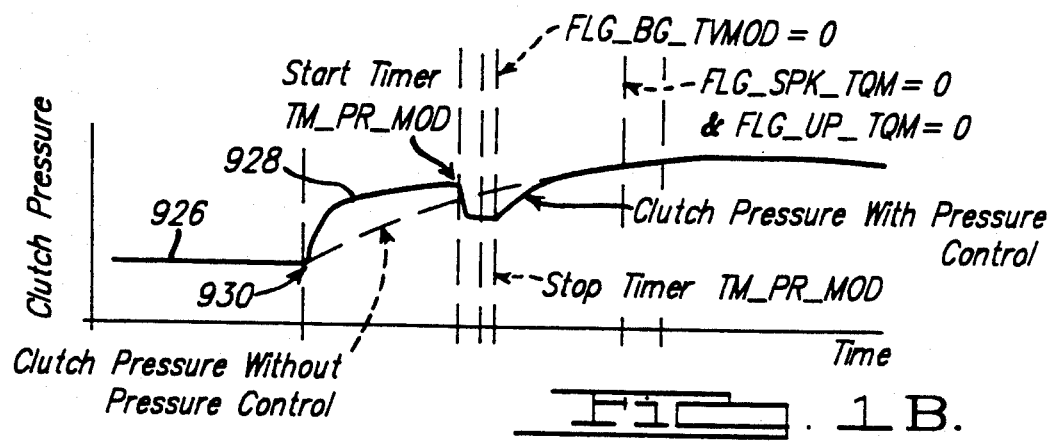
FIG. 1B is a chart showing the relationship between clutch pressure during an upshift and the time during a shift interval as torque is transferred from one friction element to another.
Figure 1C:
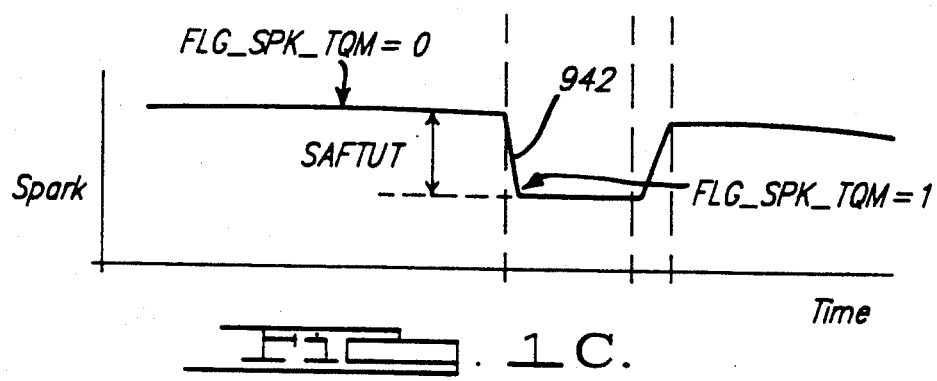
FIG. 1C is a chart showing the timing of the spark delay during a shift interval whereby engine torque is reduced following the commanding of the gear ratio change.

We have shown in FIGS. 1-1C four diagrams that show the events that are characteristic of an upshift as torque is transferred from one friction member to another (e.g., from the low-and-intermediate brake to the direct drive clutch). In FIG. 1, as well as in FIGS. 1A, 1B and 1C, the horizontal axis represents the elapsed time following the commanding of an upshift. The vertical axis in the case of FIG. 1 is the output halfshaft torque. The vertical axis in the case of FIG. 1A is the first derivative of turbine speed. The vertical axis in the case of FIG. 1B is the clutch pressure, and the vertical axis in the case of FIG. 1C is the spark retard for the engine measured in degrees (before top-dead center).

In FIG. 1, the halfshaft torque is shown by the line 916. An upshift is commanded in FIG. 1, as shown at point 918. This results in a reduction in the halfshaft torque, and the line 916 begins to fall as torque is transferred from the off-going friction element to the on-coming friction element. This corresponds to the initiation of the torque phase, as shown at point 920.

There are two phases during an upshift; namely, the torque phase and the inertia phase. Before the upshift is commanded, the torque input to the transmission clutches consists only of engine combustion torque multiplied by the torque converter torque ratio. When the torque phase begins, torque begins to develop in the on-coming friction element and to fall in the off-going friction element. Thus, during the torque phase, the input torque is split between the off-going friction element and the on-coming friction element (clutch).

The torque phase continues until point 922 is reached, as shown in FIG. 1. That point indicates the end of the torque phase and all the torque then is carried by the on-coming friction element (clutch). The output torque at the output shaft is at its lowest value at this time because of the lower gear ratio.

After the torque phase is completed, the inertia phase begins. During this phase, as the pressure of the on-coming clutch increases further, the engine speed is reduced rapidly, which is characteristic of an upshift, and the speed reduces to the level that is required by the new gear ratio. This tends to create a large inertia torque which must be absorbed by the on-coming clutch element in addition to the combustion torque of the engine. The presence of this inertia torque normally tends to produce a sharp rise in the output shaft torque, as shown at 924. The magnitude of that torque peak is dependent on the clutch pressure at the start of the inertia phase.

In order to reduce the magnitude of the increased output shaft inertia torque developed because of the reduction in engine speed, the pressure delivered to the on-coming clutch can be reduced. This will tend to lengthen the shift time, which is the sum of the inertia phase time and the torque phase time. That would tend, however, to unduly increase the time of the shift and create an undesirable amount of heat during the shift, which would have to be absorbed by the clutches.

In order to smooth the shift and to reduce the shift time, the clutch pressure is increased from a value represented by straight line 926 to a higher value as indicated by the curve 928 in FIG. 1B. The transition from the lower value to the higher value occurs at point 930. At the time that transition occurs, the processor will check to determine whether a flag called FLG_BG_TVMOD is clear. Also, a check is made to determine whether flag FLG_UP_TQM is set. If it is, upshift torque modulation may occur and clutch pressure boost will begin. This action is indicated in FIG. 1A.

The increase in clutch pressure continues at the beginning of the shift and through part of the torque phase, as indicated in FIG. 1B. The pressure then is dropped just before the inertia phase begins.

FIG. 1A shows a plot of the turbine speed. During the torque phase, the turbine speed continues to increase, but the rate of increase is less after the torque phase begins. Thus, the turbine speed derivative shown by the plot 932 decreases rapidly until the beginning of the inertia phase.

A turbine speed derivative trigger point is shown at 934. As soon as the turbine speed derivative falls below that value at 934, a flag is set, indicating that the trigger point is reached. That flag is designated in FIG. 1A as FLG_BG_TVMOD. When the turbine speed derivative drops below the threshold value at which the flag FLG_BG_TVMOD is set, a desired time should elapse before the start of the inertia phase. This may be about 100 milliseconds. When the signal to upshift is given, flag FLG_UP_TQM is set and the clutch pressure, which is proportional to the input torque to the transmission, is multiplied by a factor greater than 1 to reduce the time of the torque phase. When the turbine speed derivative falls below the threshold value, the calculated clutch pressure is multiplied by a factor less than 1.

The multipliers are obtained from an adaptive table which will be described with reference to FIG. 8E, where a chart of multiplier values is indicated to be part of the calculation at action block 1008. At that time, a timer is started to measure the time to the end of the torque phase. The end of the torque phase is determined by a drop in turbine speed which triggers a spark retard. If the time required for the clutch modulation as measured by the timer TM_PR_MOD is between about 70 milliseconds and 150 milliseconds, no change in the modifiers is called for. (That time is measured from the setting of the timer TM_PR_MOD to the instant it is cleared.) If the time is less than the desired value, the multiplier is decreased. If it is greater than the desired value, the multiplier is increased.

Following a decrease in the turbine speed below a threshold value, the pressure is ramped up to complete the shift quickly; and at that time, the spark is reduced in the inertia phase.

As a result of the pressure modification, the output shaft torque will follow a line indicated at 936 in FIG. 1, which is substantially below the peak value that would occur if there were no pressure modifications in the routine. That peak value, as indicated earlier, is shown at 924.

After completion of the inertia phase, the turbine speed increases, as shown at 938 in FIG. 1A, to a value commensurate with the new gear ratio.

Electronic Pressure Control (Clutch Pressure Modification)

The flow chart corresponding to the routine just described is illustrated in FIG. 8D. After the start of the routine at 940, a check is made to determine whether the flag FLG_UP_TQM has been set, which is the upshift torque modulation flag. This flag is set at 933, as shown in FIG. 1A. If this flag is not set, the routine will exit. If it is set, an inquiry will be made at step 944 to determine whether flag FLG_SPK_TQM is cleared. This is done in order to make certain that the routine illustrated graphically in FIG. 1A is at the left side of the line 946, which indicates the end of the torque phase. If that flag is not cleared, the routine will not proceed further. If it is cleared, a check is made at step 966 to determine whether the flag FLG_BG_TV-MOD has been cleared. This determination is made at point 933 of FIG. 1A, as explained previously. If the answer to the inquiry is positive, then the clutch pressure is boosted at action block 968, where clutch pressure is multiplied by multiplication factor TVMULT1, which is a multiplication factor greater than 1. This will cause the torque phase to end faster because of the boosted clutch pressure, thus eliminating the peak shown in FIG. 1. On the other hand, if the inquiry at step 966 is negative, that indicates that the turbine speed derivative threshold point has been crossed at point 934 in FIG. 1A. Thus, the clutch pressure should be modified by multiplying the clutch pressure by a multiplier less than 1. That multiplier is shown in action block 970 as TVMULT2.

The strategy of FIG. 8D is carried out with each background loop. The phase determination logic, however, is carried out in the foreground loop once every turbine speed interrupt. This logic is described in the following section of this description. This occurs, as explained previously, in a much faster time than the time required to complete a background loop.

Electronic Pressure Control (Phase Determination)

Figure 8A:
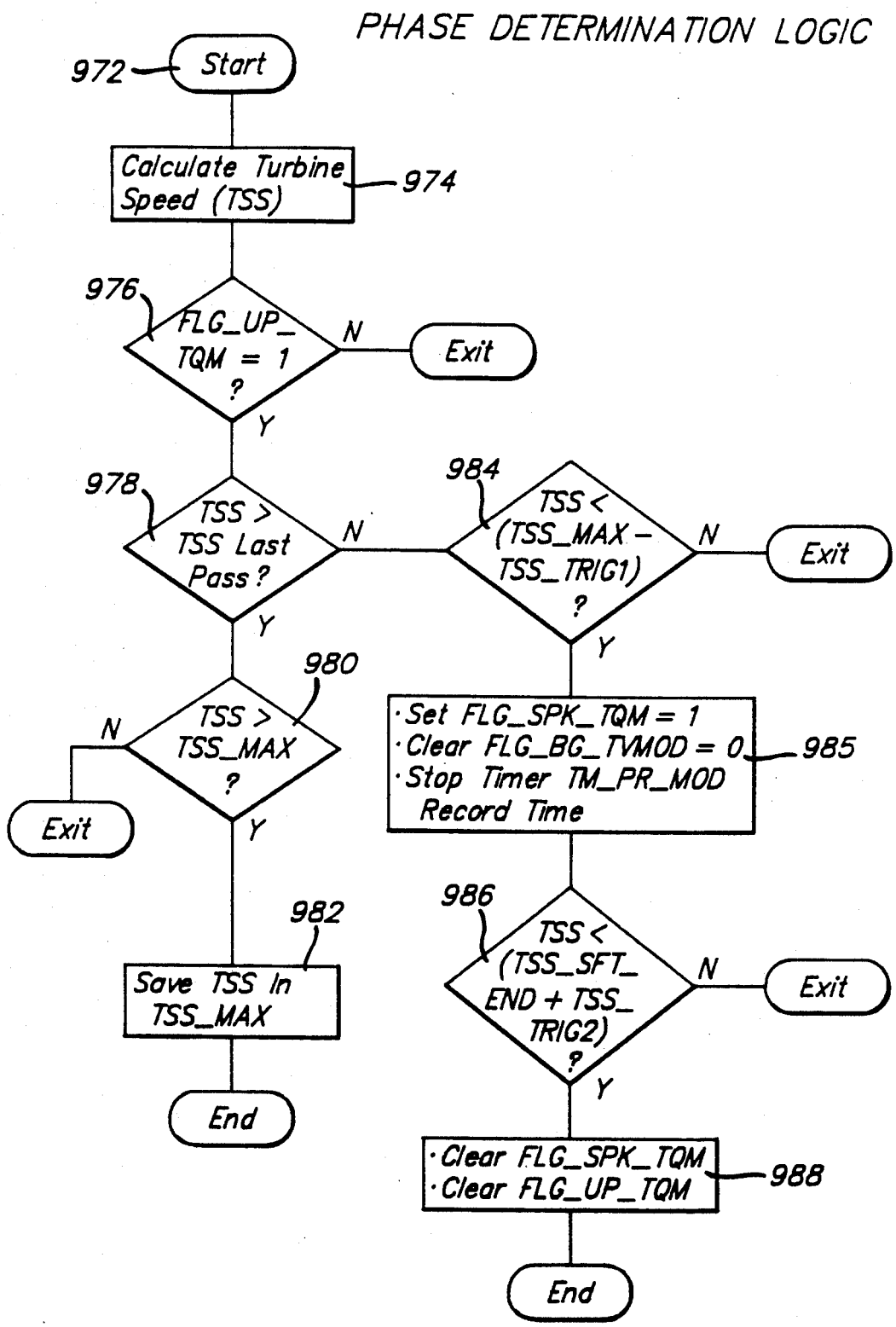
FIG. 8A is a flow chart showing the foreground logic for determining the beginning and the end of the spark retard phase.

The phase determination logic is shown in FIG. 8A. That logic begins at 972 and proceeds to action block 974 where the turbine speed is calculated using input sensor data from the turbine speed sensor. A check then is made at step 976 to determine whether the flag FLG_UP_TQM is set, which would indicate that the upshift torque modulation and the pressure boost should begin. This flag, as explained previously, is shown in FIG. 1A. If it is not set, the routine then will exit; but if it is set, a determination is made at step 978 to determine whether the turbine speed is greater than the turbine speed that existed during the last pass in this foreground control loop. If the answer is positive, that indicates that the turbine speed still is rising, as indicated in FIG. 1A. A check then is made in the next step 980 to determine whether the turbine speed has reached the maximum value TSS_MAX, which is indicated as the peak of the turbine speed curve of FIG. 1A. If it has not reached the peak value, the routine then will end. If the answer to the inquiry at step 980 is positive, the turbine speed then is saved in memory for reference in the next loop. This occurs at action block 982.

Maximum turbine speed TSS_MAX, shown in FIG. 1, occurs when the derivative of the turbine speed is zero. This is indicated at point TSD=0 in FIG. 1A. The value for the turbine speed derivative may fall to a negative value as seen in FIG. 1A before it begins to rise at the completion of the inertia phase.

If the turbine speed is less than the turbine speed that existed during the last foreground pass, then the answer to the inquiry at step 978 is negative, and the routine will proceed to make an inquiry at step 984 to determine whether the turbine speed is less than the maximum value TSS_MAX less a value equal to TSS_TRIG1. That value is also shown in FIG. 1A. If the turbine speed is greater than that value, the routine will exit; but if it is less than that value, the routine proceeds to action step 985 where the flag FLG_SPK_TQM is set, indicating that a retarding of the timing of the engine ignition spark should begin. Also, the flag FLG_BG_TV-MOD is cleared and the timer TM_PR_MOD is stopped. That timer, as explained earlier, began to run when the point 920 in FIG. 1 was reached. Thus, when it is stopped, a measure of time has been made recording the length of the time for modifying clutch pressure. If it is too long (for example, if it is longer than about 100 milliseconds), then the multiplier TVMULT2 is increased, thereby reducing the time for modifying clutch pressure. If it is less than the desired value, the multiplier is decreased, thus decreasing the time for modifying clutch pressure. These new values for the multipliers are fetched from memory in response to the information obtained from the calculation of that delay time.

After the action in action block 984 is completed, the routine then will make an inquiry at 986 to determine whether the turbine speed has proceeded to a value indicated in FIG. 1A as TSS_TRG2. The turbine speed TSS_SFT_END is indicated in FIG. 1A as the lowest turbine speed value during a shift. The inertia phase is triggered to end, however, at a value that is slightly greater than that value. That slightly greater value is indicated in FIG. 1A as TSS_TRG2.

When the value TSS_TRG2 is reached, the action at 988 occurs. That clears the flag FLQ_SPK_TQM, which signals the end of the spark retard, as indicated in FIG. 1C.

Electronic Pressure Control (Turbine Speed Derivative Trigger Logic)

The routine of FIG. 8D, which was described previously, occurs once each background loop. As explained previously with respect to FIG. 8D, the clutch pressure is modified by multiplying the clutch pressure by the multiplier TV_MULT2, which occurs if the flag FLG_BG_TV_MOD is cleared. The clutch pressure will be modified once each turbine speed interrupt if that is triggered by flag FLG_BG_TVMOD. The modification of the pressure triggered by flag FLG_BG_TVMOD is set occurs very quickly because of the relatively short length of the foreground control loop.

Figure 8B:
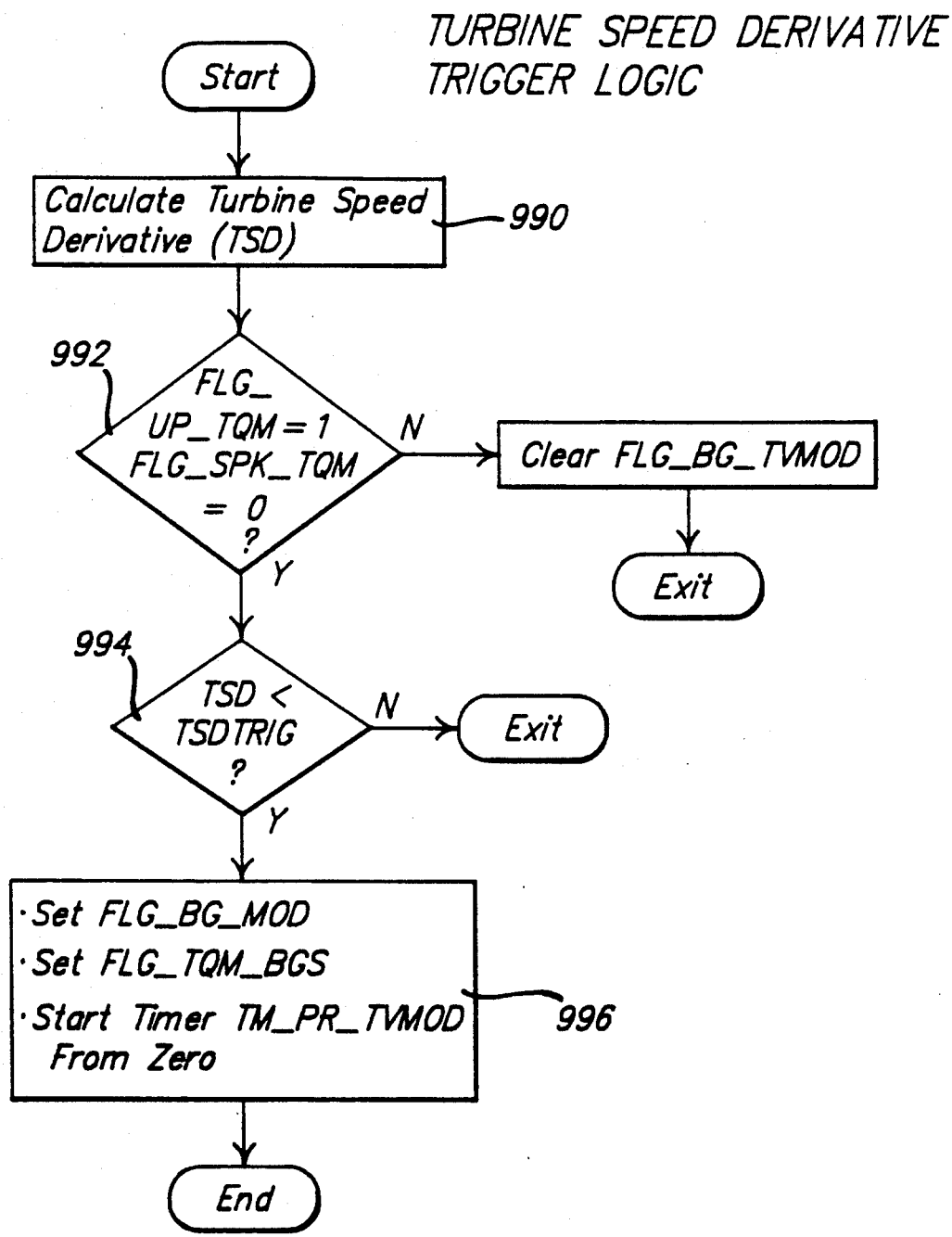
FIG. 8B is a flow chart showing the foreground logic for determining the turbine speed derivative trigger point to modulate clutch pressure.

The setting of this flag is illustrated in graphic form in the flow chart of FIG. 8B where, after calculating the turbine speed derivative at 990, a check is made at step 992 to determine whether the flags FLG_UP_TQM is set and whether the spark delay flag FLG_SPK_TQM remains clear. If this is the case, it is determined at step 994 whether the turbine speed derivative is less than the threshold value TSD_TRIG. If it is, the routine will proceed to action block 996 where FLG_BG_TV-MOD is set and timer TM_PR_MOD is set. When the flag FLG_BG_MOD later is cleared, that signals the end of the torque phase and the start of the inertia phase as the clutch pressure is increased by multiplying it by a multiplier (TVMULT1) greater than unity.

Electronic Pressure Control (Upshift Smoothness Strategy)

Figure 8C:
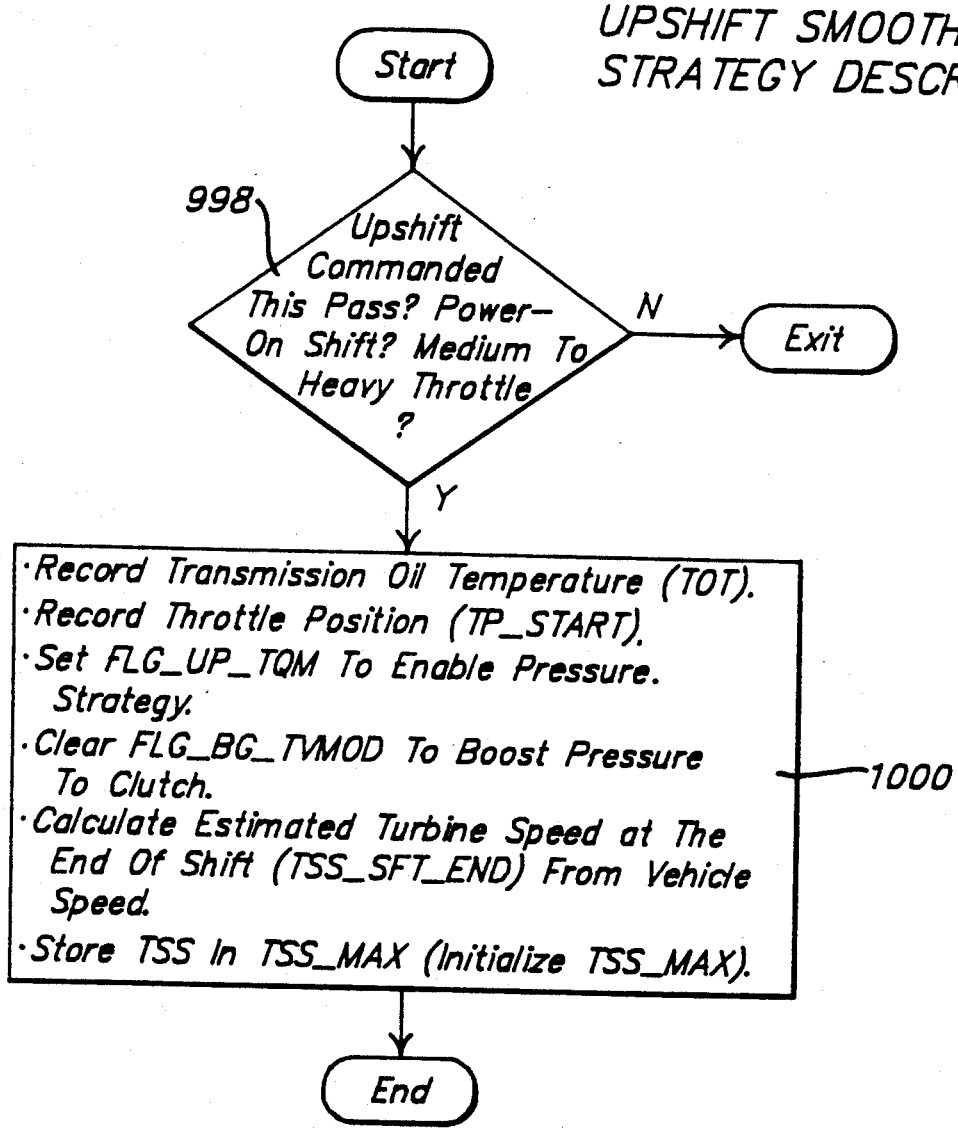
FIG. 8C is a flow chart of the background logic for calculating the estimated turbine speed at the end of the inertia phase during a shift.

The chart of FIG. 8C illustrates the previously described logic when a shift is commanded. This occurs once each background loop. After the start of this routine a check is made at step 998 to determine whether the upshift has been commanded as indicated at 918 in FIG. 1. If the upshift command accompanies a power-on shift or a medium to heavy throttle shift, a negative response is indicated for the inquiry at step 998 and the routine will exit. The routine otherwise proceeds to action block 1000 which calls for the recording of the oil temperature (TOT) and for recording the throttle position at the start of the shift (TP_START). Also the flag FLG_UP_TQM is set at this action block as indicated in FIG. 1A to enable the pressure strategy. Also the turbine speed TSS_SFT_END at the end of the shift is calculated, which is an estimated value. That estimated turbine speed can be updated at the end of the shift, and the updated value then can be stored. It is updated by measuring the number of turbine speed sensor pulses per revolution and multiplying it by the filtered output shaft speed and multiplying it also by the current transmission gear ratio, and then dividing that product into a conversion factor for converting seconds to clock ticks.

Electronic Pressure Control (Clutch Pressure Modification Update)

Figure 8E:
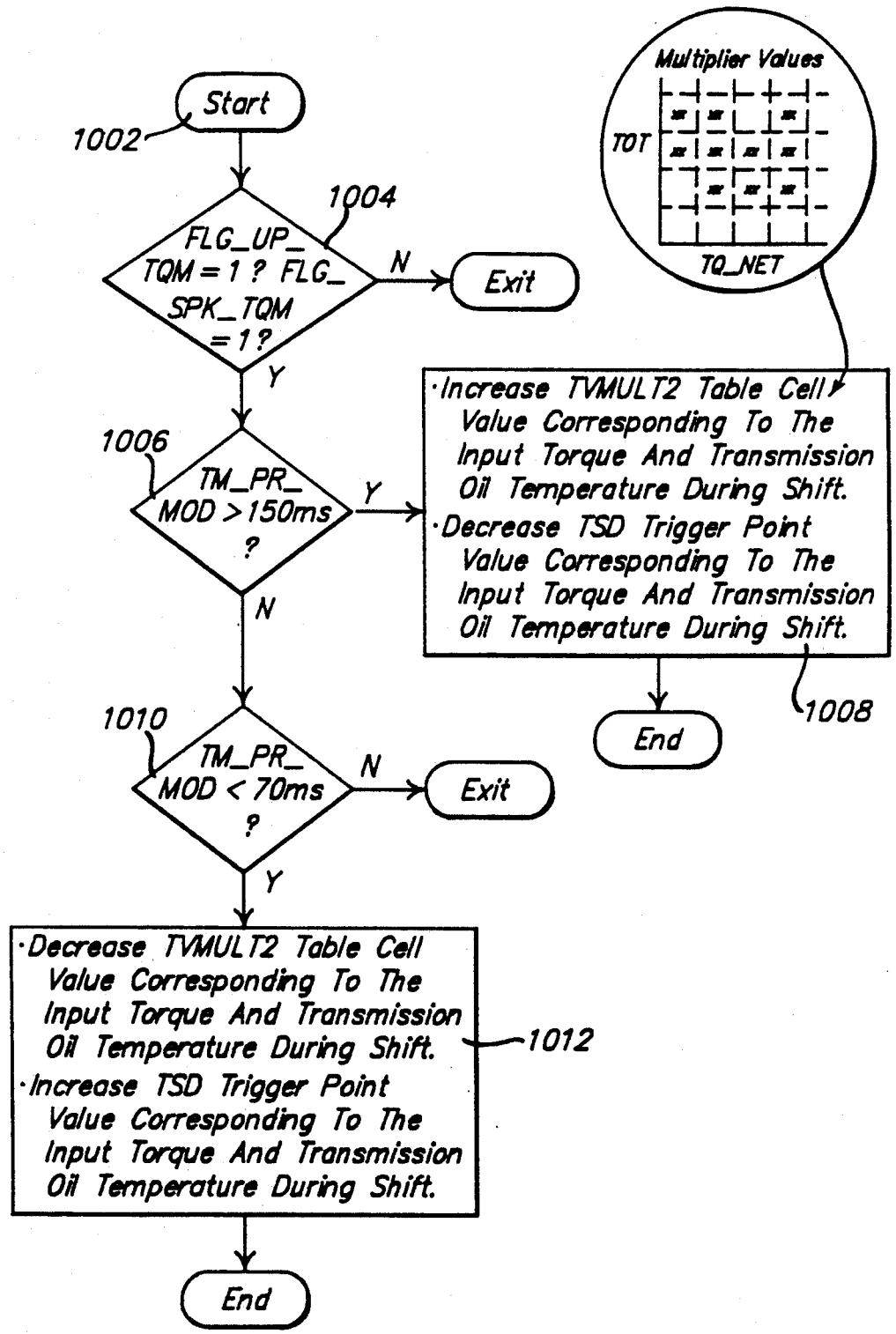
FIG. 8E is a flow chart of the background logic for updating in an adaptive manner the calibration multipliers for the clutch pressure determination of the procedure of FIG. 8d.

In FIG. 8E, we have illustrated a flow chart that shows the logic to be used for changing the magnitudes of the multipliers TVMULT1 and TVMULT2. The concept of changing the values for the multipliers was briefly described with reference to the flow chart of FIG. 8D.

The need for changing the multipliers depends upon the time recorded by the timer TM_PR_MOD, which was described with reference to action block 970 of FIG. 8D.

In the routine of FIG. 8E, following the start at 1002, an inquiry is made at 1004 to confirm that the flag FLG_UP_TQM has been set, indicating that torque modulation is occurring following the commanding of the shift. Also, flag FLG_SPK_TQM is checked to determine whether it is set. If it is, that indicates that the engine torque modulation due to spark retard is taking place. If neither flag is set, the routine will exit; but if they both are set, an inquiry then is made at step 1006 to determine whether the elapsed time measured by the timer TM PR MOD is greater than about 150 milliseconds. The timer was started when the turbine speed derivative fell below the threshold value, as shown in FIG. 1A at 934.

If the elapsed time is greater than about 150 milliseconds, the throttle valve pressure multiplier TVMULT2 is increased in action block 1008. That value is obtained from a table indicated schematically in FIG. 8E. That table, which is stored in memory, records in each of multiple table cells the multiplier values corresponding to input torque and transmission oil temperature.

For any given transmission oil temperature and input torque, there is a multiplier value that is fetched from the table in memory and substituted for the value previously used in the routine of FIG. 8E. Also in action block 1008, the trigger point for the turbine speed derivative value corresponding to the measured values of input torque and transmission oil temperature is decreased. That value also is obtained from a table in memory that would correspond generally to the table illustrated schematically in FIG. 8E. After those adjustments are made, the routine will end.

If the inquiry at step 1006 is negative, the action block at 1008 is skipped, and the routine proceeds directly to step 1010 where an inquiry is made to determine whether the elapsed time measured by the timer TM_PR_MOD is less than about 70 milliseconds. If it is not less than about 70 milliseconds, the routine ends. If it is less than about 70 milliseconds, a decrease in the multiplier is called for. This decrease occurs at action block 1012. A new decreased value for TVMULT2 is obtained at action block 1012 by fetching from a memory cell a new value for the multiplier that depends upon the input torque and transmission oil temperature in a manner described with respect to action block 1008. Similarly, the trigger point for the turbine speed derivative value that corresponds to that same input torque and transmission oil temperature is increased. This is done in the same way that is described with reference to the decrease in the trigger point mentioned with respect to action block 1008.

Following the completion of the actions at block 1012, the routine ends. In the next background loop, the clutch pressure during the routine of FIG. 8d will be different because of the presence of a different multiplier.

Having described a preferred embodiment of the invention, what is claimed is:

1. An electronic control system for an automatic transmission for a road vehicle having multiple gear ratios adapted to establish multiple torque flow paths from a throttle controlled engine to a driven member;

clutch means and brake means for selectively enabling said torque flow paths to obtain ratio changes for optimum engine and transmission performance, each clutch means and brake means including a pressure operated actuator servo;

a hydraulic valve circuit including a pressure source and a main pressure regulator means for maintaining a desired pressure in said servos;

a solenoid operated throttle valve means for developing a throttle valve (TV) pressure output that is representative of the torque delivered through said torque flow paths;

a solenoid operated shift valve means for establishing and disestablishing multiple pressure distribution paths to said servos;

an electronic pressure control means comprising an electronic computer with a memory portion for storing shift strategy software logic and TV pressure control software logic and a processor for controlling actuation of said shift valve means and for controlling the magnitude of said TV pressure in accordance with said software logic, said TV pressure being distributed to said main pressure regulator whereby the torque capacity of said clutch means and said brake means is effectively controlled;

said processor including means for determining deceleration of said vehicle and determining said TV pressure in response to changes in deceleration of said vehicle.

2. The combination as set forth in claim 1 wherein said processor includes a timer means for measuring in each control loop a duration of an increase in TV pressure in accordance with said shift strategy software logic and means for adjusting said duration if during the next preceding one of said control loops the timer means measurement is different than a predetermined value.

3. The combination as set forth in claim 1 wherein said clutch means and brake means include a friction clutch adapted to condition said transmission for direct drive torque delivery and a friction brake adapted to condition said transmission for an underdrive torque delivery, said friction brake providing a reaction point for said underdrive ratio;

said TV pressure determining means responding to vehicle deceleration during a ratio change from said direct drive to said underdrive ratio with a light throttle setting.

4. An automatic transmission control system in a vehicle driveline that includes a throttle controlled engine and multiple ratio gearing adapted to establish multiple torque delivery paths between said engine and vehicle traction wheels;

said gearing having a direct drive gear and two underdrive gears;

clutch means and brake means for selectively enabling said torque flow paths to obtain ratio changes for optimum engine and transmission performance, each clutch means and each brake means including a pressure operated actuator servo;

a hydraulic valve circuit including a pressure source and a main pressure regulator means for maintaining a desired pressure in said servos;

a solenoid operated throttle valve means for developing a throttle valve (TV) pressure output that is representative of torque delivered through said torque flow paths;

a solenoid operated shift valve means for establishing and disestablishing multiple pressure distribution paths to said servos;

an electronic pressure control means comprising an electronic computer with a memory portion for storing shift strategy software logic and TV pressure control software logic executed in sequential control loops and a processor for controlling actuation of said shift valve means and for controlling the magnitude of said TV pressure in accordance with said software logic, said TV pressure being distributed to said main pressure regulator whereby the torque capacity of said clutch means and said brake means is effectively controlled;

a vehicle speed sensor and an engine torque sensor, said sensor communicating with said processor whereby said processor responds by establishing gearing ratio shifts in accordance with stored torque and speed functions;

said shift valve means responding to vehicle speed and engine torque sensor values under both closed and partially open engine throttle conditions to effect a downshift from direct ratio to the next underdrive ratio;

and means for determining deceleration of said vehicle and determining said TV pressure in response to changes in deceleration of said vehicle during said downshift whereby the inertia torque that is inherent in said downshift is accommodated to effect smoothness in the downshift.

5. The combination as set forth in claim 4 wherein said processor includes a timer means for measuring in each control loop a duration of an increase in TV pressure in accordance with said shift strategy software logic and means for adjusting said duration if during the next preceding one of said control loops the timer means measurement is different than a predetermined value.

6. The combination as set forth in claim 4 wherein said clutch means and brake means include a friction clutch adapted to condition said transmission for direct drive torque delivery and a friction brake adapted to condition said transmission for an underdrive torque delivery, said friction brake providing a reaction point for an underdrive ratio;

said TV pressure determining means responding to vehicle deceleration during a ratio change from said direct drive to said underdrive ratio with a light throttle setting.

7. An automatic transmission pressure control system for a geared, multiple ratio transmission for an initial combustion engine powered vehicle comprising a hydrokinetic torque converter with an impeller driven by said engine and a turbine adapted to be connected to geared torque input elements of said transmission;

a fluid pressure source in said system driven by said engine;

clutch and brake means including multiple pressure operated clutch and brake servos for establishing and disestablishing multiple ratio torque delivery paths;

means for sensing turbine speed during a ratio change time interval and producing a turbine speed signal;

means for determining turbine speed derivative based upon said turbine speed signal; and means for decreasing the pressure in said servos in response to a reduction in the turbine speed derivative value at the beginning of said ratio change time interval; and means for increasing the pressure in said servos during said ratio change time interval whereby inertia torque in said transmission is modified as engine speed is reduced at the inception of said ratio change time interval and whereby a total shift change time interval is reduced by a subsequent increase in servo pressure following said servo pressure modification.

8. The combination as set forth in claim 7 wherein said control system includes means for reducing engine torque when said turbine speed is determined to be less than a calibrated value during a ratio change.

9. The combination as set forth in claim 7 wherein said control system includes means for reducing engine torque when said turbine speed is determined to be less than a calibrated value during a ratio change and means for ending said engine torque reduction when sensed turbine speed decreases to a calculated value.

10. An automatic transmission pressure control system for a geared, multiple ratio transmission for an internal combustion engine powered vehicle comprising a hydrokinetic torque converter with an impeller driven by said engine and a turbine adapted to be connected to geared torque input elements of said transmission;

a fluid pressure source in said system driven by said engine;

clutch and brake means including multiple pressure operated clutch and brake servos in said system for establishing and disestablishing multiple ratio torque delivery paths;

means for sensing turbine speed during a ratio change time interval and producing a turbine speed signal;

means for determining a turbine speed derivative based upon said turbine speed signal; and means for modifying the pressure in said servos in response to changes in said turbine speed derivative value, servo pressure modifying means decreasing the pressure in said servos in response to a reduction in the turbine speed derivative value at the beginning of said ratio change time interval;

said servo pressure modifying means increasing the pressure in said servos during said ratio change time interval whereby inertia torque in said transmission is modified as engine speed is reduced at the inception of said ratio change time interval and whereby a total shift change time interval is reduced by a subsequent increase in servo pressure following said servo pressure modification;

said means for modifying servo pressure including means for multiplying said servo pressure by a factor that is less than unity when said turbine speed derivative is less than a calibrated value.

11. The combination as set forth in claim 10 wherein said control system includes a means for timing a portion of said ratio change time interval initiated by the reduction of said turbine speed derivative below a calibrated value and ending at the instant in a ratio shift when said servo pressure is measured following said servo pressure modification, and means for adjusting said increase in servo pressure when the ratio change time interval measured by said timing means is different from a calibrated range of shift times.

12. An automatic transmission pressure control system for a geared, multiple ratio transmission for an internal combustion engine powered vehicle comprising a hydrokinetic torque converter with an impeller driven by said engine and a turbine adapted to be connected to geared torque input elements of said transmission;

a fluid pressure source in said system driven by said engine;

clutch and brake means including multiple pressure operated clutch and brake servos in said system for establishing and disestablishing multiple ratio torque delivery paths;

means for sensing turbine speed during a ratio change time interval and for producing a turbine speed signal;

means for determining a turbine speed derivative value based upon said turbine speed signal; and means for modifying the pressure in said servos in response to changes in said turbine speed derivative value, said servo pressure modifying means decreasing the pressure in said servos in response to a reduction in said turbine speed derivative value at the beginning of said ratio change time interval;

said servo pressure modifying means increasing the pressure in said servos during said ratio change time interval whereby inertia torque in said transmission is modified as engine speed is reduced at the inception of said ratio change time interval and whereby a total shift change time interval is reduced by a subsequent increase in servo pressure following said servo pressure modification;

said means for modifying servo pressure including a means for multiplying said servo pressure by a factor that is greater than unity when said turbine speed derivative is greater than a calibrated value;

and means for multiplying said servo pressure by a factor that is less than unity when said turbine speed derivative is less than a calibrated value.

13. The combination as set forth in claim 12 wherein said control system includes a means for timing a portion of said ratio change time interval initiated by the reduction of said turbine speed derivative below a calibrated value and ending at the instant in a ratio shift when said servo pressure is measured following said servo pressure modification, and means for adjusting said increase in servo pressure when the ratio change time interval measured by said timing means is different from a calibrated range of shift times.

14. A pressure control system for an automatic transmission control fluid circuit in an automotive vehicle having a throttle controlled internal combustion engine, said circuit having a pressure source and a main pressure regulator valve;

multiple ratio gearing adapted to establish torque flow paths between said engine and a driven shaft;

clutch means and brake means in said circuit for establishing and disestablishing said torque flow paths and fluid pressure operated clutch and brake servo means in said fluid circuit for actuating selectively said clutch means and said brake means;

a vehicle speed sensor means for establishing a vehicle speed signal;

a solenoid operated throttle valve means for establishing a torque signal that is a measure of engine torque, said throttle valve means communicating with said main pressure regulator valve whereby the latter responds to changes in said torque signal to alter the pressure of said servo means;

a shift control valve means including shift solenoid valves for controlling selectively actuation of said servo means whereby ratio changes may be effected in a range of ratios between a low ratio and a high ratio including at least one underdrive ratio in response to changes in said signal;

means for calculating a signal value for the static torque transferred through said transmission for each torque flow path, said static torque being equal to the combustion torque of said engine, and means for calculating a signal value for the inertia torque caused by a change in the engine speed during a shift;

a microprocessor means communicating with said throttle valve means for actuating said throttle valve means including means for storing in addressable data registers the functional relationships between the static torque capacity and said engine combustion torque signal values, said means for calculating said static torque signal value including said addressable data registers;

each ratio shift corresponding to a separate one of said functional relationships and having a discrete slope value and a discrete constant intercept value;

said means for calculating an inertia torque signal value during the ratio shifts including other addressable data registers in said microprocessor containing functional relationship between the engine throttle position and an inertia torque signal value; and means for adding said inertia torque signal value and said static torque signal value to obtain an effective torque signal output received by said solenoid operated valve means to establish optimum pressure control for said servo means.

15. The combination as set forth in claim 14 wherein said microprocessor includes data registers adapted to store temperature values representative of fluid temperature in said fluid circuit, and means for modifying the effective torque signal value during ratio shifts to account for the effects of changes in fluid temperature on shift timing and shift smoothness.

16. The combination as set forth in claim 14 wherein said microprocessor executes said static and inertia torque calculations during sequential background control loops, said torque flow paths being defined in part by a hydrokinetic torque converter with an impeller driven by said engine and a turbine connected to torque input elements of said gearing;

said microprocessor including means for establishing foreground control loop with less execution time than the time required to execute said background control loops, means for monitoring turbine speed following initiation of an upshift each foreground loop, and means for modulating engine torque in response to a decrease in turbine speed as measured by said processor in said foreground control loop as the execution sequence of said background control loop is interrupted.

17. The combination as set forth in claim 16 wherein said inertia torque signal value calculating means includes means for adding to said inertia torque signal value an incremental torque signal value for upshifts whereby an effective inertia torque signal is greater for upshifts than for downshifts.

18. The combination as set forth in claim 17 wherein said microprocessor includes means for determining a desired gear ratio as part of sequentially executed control loops in response to vehicle speed and torque signals;

means for delaying a command of a change in gear ratio following determination of said desired gear whereby the gear ratio change is verified; and means for timing the actuation of said throttle valve means by said microprocessor means so that a change in said engine torque signal value in response to the actuation by said microprocessor occurs following a determination of a desired gear but before command of a ratio change by said microprocessor is effected.

19. The combination as set forth in claim 16 wherein said microprocessor includes means for determining a desired gear ratio as part of sequentially executed control loops in response to vehicle speed and torque signals;

means for delaying a command of a change in gear ratio following determination of said desired gear whereby the gear ratio change is verified; and means for timing the actuation of said throttle valve means by said microprocessor means so that a change in said engine torque signal value in response to the actuation by said microprocessor occurs following a determination of a desired gear but before command of a ratio change by said microprocessor is effected.

20. A pressure control system for an automatic transmission control fluid circuit in an automotive vehicle having a throttle controlled internal combustion engine, said circuit having a pressure source and a main pressure regulator valve;

multiple ratio gearing adapted to establish torque flow paths with separate ratios between said engine and a driven shaft;

clutch means and brake means for establishing and disestablishing said torque flow paths and fluid pressure operated clutch and brake servo means in said fluid circuit for actuating selectively said clutch means and said brake means;

a solenoid operated throttle valve means for establishing a torque signal that is a measure of engine torque, said throttle valve means communicating with said main pressure regulator valve whereby the latter responds to changes in said torque signal to alter the pressure of said servo means;

shift control valve means including shift solenoid valves for controlling selectively actuation of said servo means whereby ratio changes may be effected in a range of ratios between low ratio and a high ratio including at least one underdrive ratio;

means for calculating a signal value for static torque transferred through said transmission for each torque flow path, said static torque being equal to combustion torque of said engine, and means for calculating a signal value for inertia torque resulting from a change in engine speed during a shift;

a microprocessor means communicating with said throttle valve means for actuating said throttle valve means including means for storing in addressable data registers functional relationships between static torque capacity and said engine combustion torque signal values, said means for calculating said static signal value including said addressable data registers;

each ratio shift corresponding to a separate one of said functional relationships and having a discrete slope value and a discrete constant intercept value;

said means for calculating an inertia torque signal value during ratio shifts including other addressable data registers in said microprocessor containing functional relationship between engine throttle position and an inertia torque signal values;

means for adding said inertia torque signal value and said static torque signal value to obtain an effective torque signal output received by said solenoid operated valve means to establish optimum pressure control for said servo means;

a timer means for establishing a calibrated time for a ratio change to occur following initiation of a ratio change to said one underdrive ratio from a higher ratio; and means initiated by actuation of said timer for augmenting the effective torque signal value at the beginning of said ratio change relative to the effective torque signal value calculated during a final stage of said ratio change.

21. The combination as set forth in claim 20 wherein said microprocessor includes data registers adapted to store temperature values representative of fluid temperature in said fluid circuit, and means for modifying the effective torque signal value during ratio shifts to account for the effects of changes in fluid temperature on shift timing and shift smoothness.

22. The combination as set forth in claim 20 wherein said microprocessor executes said static and inertia torque calculations during sequential background control loops, said torque flow paths being defined in part by a hydrokinetic torque converter with an impeller driven by said engine and a turbine connected to torque input elements of said gearing;

said microprocessor including means for establishing foreground control loops with less execution time than the time required to execute said background control loops, means for monitoring turbine speed following initiation of an upshift each foreground loop, and means for modulating engine torque in response to a decrease in turbine speed as measured by said processor in said foreground control loop as the execution sequence of said background control loop is interrupted.

23. The combination as set forth in claim 22 wherein said inertia torque signal value calculating means includes means for adding to said dynamic torque signal value an incremental torque signal value for upshifts whereby an effective inertia torque signal is greater for upshifts than for downshifts.

24. The combination as set forth in claim 23 wherein said microprocessor includes means for determining a desired gear ratio as part of sequentially executed control loops in response to vehicle speed and torque signals;

means for delaying a command of a change in gear ratio following determination of said desired gear whereby the gear ratio change is verified; and means for timing the actuation of said throttle valve means by said microprocessor means so that a change in said engine torque signal value in response to the actuation by said microprocessor occurs following a determination of a desired gear but before command of a ratio change by said microprocessor is effected.

25. A pressure control system for an automatic transmission control fluid circuit in an automative vehicle having a throttle controlled internal combustion engine, said circuit having a pressure source and a main pressure regulator valve;

multiple ratio gearing adapted to establish torque flow paths with separate ratios between said engine and a driven shaft;

clutch means and brake means for establishing and disestablishing said torque flow paths and fluid pressure operated clutch and brake servo means in said fluid circuit for actuating selectively said clutch means and said brake means;

a solenoid operated throttle valve means for establishing a torque signal that is a measure of engine torque, said throttle valve means communicating with said main pressure regulator valve whereby the latter responds to changes in said torque signal to alter the pressure of said servo means;

a shift control valve means including shift solenoid valves for controlling selectively actuation of said servo means whereby ratio changes may be effected in a range of ratios between low ratio and a high ratio including at least one underdrive ratio;

means for calculating a signal value for static torque transferred through said transmission for each torque flow path, said static torque being equal to combustion torque of said engine and, means for calculating a signal value for inertia torque resulting from a change in engine speed during a shift;

a microprocessor means communicating with said throttle value means for actuating said throttle valve means including means for storing in addressable data registers functional relationships between static torque capacity and said engine combustion torque signal values, said means for calculating said static torque signal value including said addressable data registers;

each ratio shift corresponding to a separate one of said functional relationships and having a discrete slope value and a discrete constant intercept value;

said means for calculating an inertia torque signal value during ratio shifts including other addressable data registers in said microprocessor containing functional relationship between engine throttle position and inertia torque signal values;

means for adding said inertia torque signal value and said static torque signal value to obtain an effective torque signal output received by said solenoid operated valve means to establish optimum pressure control for said servo means; and means for adding to said inertia torque signal value an incremental torque signal value for upshifts whereby the effective inertia torque signal value is greater for upshifts than for downshifts.

26. The combination as set forth in claim 25 wherein said microprocessor includes data registers adapted to store temperature values representative of fluid temperature in said fluid circuit, and means for modifying the effective torque signal value during ratio shifts to account for the effects of changes in fluid temperature on shift timing and shift smoothness.

27. The combination as set forth in claim 25 wherein said microprocessor executes said calculation of said static and inertia torque calculations during sequential background control loops, said torque flow paths being defined in part by a hydrokinetic torque converter with an impeller driven by said engine and a turbine connected to torque input elements of said gearing;

said microprocessor including means for establishing foreground control loops with less execution time than the time required to execute said background control loops, means for monitoring turbine speed following initiation of an upshift each foreground loop, and means for modulating engine torque in response to a decrease in turbine speed as measured by said processor in said foreground control loop as the execution sequence of said background control loop is interrupted.

28. The combination as set forth in claim 27 wherein said microprocessor includes means for determining a desired gear ratio as part of sequentially executed control loops in response to vehicle speed and torque signals;

means for delaying a command of a change in gear ratio following determination of said desired gear whereby the gear ratio change is verified; and means for timing the actuation of said throttle valve means by said microprocessor means so that a change in said engine torque signal value in response to the actuation by said microprocessor occurs following a determination of a desired gear but before command of a ratio change by said microprocessor is effected.

29. A pressure control system for an automatic transmission control fluid circuit in an automotive vehicle having a throttle controlled internal combustion engine, said circuit having a pressure source and a main pressure regulator valve;

multiple ratio gearing adapted to establish torque flow paths with separate ratios between said engine and a driven shaft;

clutch means and brake means for establishing and disestablishing said torque flow paths and fluid pressure operated clutch and brake servo means in said fluid circuit for actuating selectively said clutch means and said brake means;

a solenoid operated throttle valve means for establishing a torque signal that is a measure of engine torque, said throttle valve means communicating with said main pressure regulator valve whereby the latter responds to changes in said torque signal to alter the pressure of said servo means;

a shift control valve means including shift solenoid valves for controlling selectively actuation of said servo means whereby ratio changes may be effected in a range of ratios between low ratio and a high ratio including at least one underdrive ratio;

means for calculating a signal value for static torque transferred through said transmission for each torque flow path, said static torque being equal to combustion torque of said engine, and means for calculating a signal value for inertia torque resulting from a change in engine speed during a shift;

a microprocessor means communicating with said throttle valve means for actuating said throttle valve means including means for storing in addressable data registers functional relationships between static torque capacity and said engine combustion torque signal values, said means for calculating said static torque signal value including said addressable data registers;

each ratio shift corresponding to a separate one of said functional relationships and having a discrete slope value and a discrete constant intercept value;

said means for calculating an inertia torque signal value during ratio shifts including other addressable data registers in said microprocessor containing functional relationship between engine throttle position and inertia torque signal values;

means for adding said inertia torque signal value and said static torque signal value to obtain an effective torque signal output received by said solenoid operated valve means to establish optimum pressure control for said servo means; and means for adding to said inertia torque signal value an incremental torque signal value for upshifts whereby the effective dynamic torque signal value is greater for upshifts than for downshifts; and a timer means for controlling the time said incremental torque signal valve is added to said inertia torque signal value during an upshift following the initiation of said upshift.

30. The combination as set forth in claim 29 wherein said microprocessor includes data registers adapted to store temperature values representative of fluid temperature in said fluid circuit, and means for modifying the effective torque signal value during ratio shifts to account for the effects of changes in fluid temperature on shift timing and shift smoothness.

31. The combination as set forth in claim 29 wherein said microprocessor executes said static and inertia torque calculations during sequential background control loops, said torque flow paths being defined in part by a hydrokinetic torque converter with an impeller driven by said engine and a turbine connected to torque input elements of said gearing;

said microprocessor including means for establishing foreground control loops with less execution time than the time required to execute said background control loops, means for monitoring turbine speed following initiation of an upshift each foreground loop, and means for modulating engine torque in response to a decrease in turbine speed as measured by said processor in said foreground control loop as the execution sequence of said background control loop is interrupted.

32. The combination as set forth in claim 31 wherein said microprocessor includes means for determining a desired gear ratio as part of sequentially executed control loops in response to vehicle speed and torque signals;

means for delaying a command of a change in gear ratio following determination of said desired gear whereby the gear ratio change is verified; and means for timing the actuation of said throttle valve means by said microprocessor means so that a change in said engine torque signal value in response to the actuation by said microprocessor occurs following a determination of a desired gear but before command of a ratio change by said microprocessor is effected.

33. A pressure control system for an automatic transmission control fluid circuit in an automotive vehicle having a throttle controlled combustion engine, said circuit having a pressure source and a main pressure regulator valve;

multiple ratio gearing adapted to establish torque flow paths between said engine and a driven shaft;

clutch means and brake means in said circuit for establishing and disestablishing said torque flow paths and fluid pressure operated clutch servo means and brake servo means in said fluid circuit for actuating selectively said clutch means and said brake means;

a solenoid operated throttle valve means for establishing a torque signal that is a measure of engine torque, said throttle valve means communicating with said main pressure regulator valve whereby the latter responds to changes in said torque signal value to alter the pressure of said servo means;

a shift control valve means including shift solenoid valves for controlling selectively actuation of said servo means whereby ratio changes may be effected in a range of ratios between low ratio and a high ratio including at least one underdrive ratio;

means for calculating a signal value for static torque transferred through said transmission for each torque flow path, said static torque being equal to combustion torque of said engine, and means for calculating a signal value for inertia torque resulting from a change in engine speed during a shift;

a microprocessor means communicating with said throttle valve means for actuating said throttle valve means including means for storing in addressable data registers functional relationships between static torque capacity and said engine combustion torque signal values, said means for calculating said static torque signal value including said addressable data registers;

each ratio shift corresponding to a separate one of said functional relationships and having a discrete slope value and a discrete constant intercept value;

said means for calculating an inertia torque signal value during ratio shifts including other addressable data registers in said microprocessor containing functional relationship between engine throttle position and inertia torque signal values;

means for adding said inertia torque signal value and said static torque signal value to obtain an effective torque signal output received by said solenoid operated valve means to establish optimum pressure control for each of said servo means;

the torque transmitting capacity of said clutch means and said brake means being proportional to circuit pressure transferred to said clutch servo means and said brake servo means by said shift control valve means, the torque capacity of one servo means falling and the torque capacity of another servo means increasing during an upshift from one ratio to a higher ratio following initiation of said upshift;

and timer means for measuring the time required to complete the torque capacity decrease of said one servo during said upshift;

said processor having register locations for storing servo pressure multipliers that are addressable and used by said torque signal value calculating means;

a low multiplier being fetched when the time measured by said timer means is less than a calibrated range of values and a higher multiplier being fetched when the time measured by said timer means is greater than a calibrated range of values.

34. A pressure control system for an automatic transmission control fluid circuit in an automotive vehicle having a throttle controlled combustion engine, said circuit having a pressure source and a main pressure regulator valve;

multiple ratio gearing adapted to establish torque flow paths between said engine and a driven shaft;

clutch means and brake means in said circuit for establishing and disestablishing said torque flow paths and fluid pressure operated clutch servo means and brake servo means in said fluid circuit for actuating selectively said clutch means and said brake means;

a solenoid operated throttle valve means for establishing a torque signal that is a measure of engine torque, said throttle valve means communicating with said main pressure regulator valve whereby the latter responds to changes in said torque signal valve to alter the pressure of said servo means;

a shift control valve means including shift solenoid valves for controlling selectively actuation of said clutch servo means and said brake servo means whereby ratio changes may be effected in a range of ratios between low ratio and a high ratio including at least one underdrive ratio;

means for calculating a signal value for static torque transferred through said transmission for each torque flow path, said static torque being equal to combustion torque of said engine, and means for calculating a signal value for inertia torque resulting from a change in engine speed during a shift;

a microprocessor means communicating with said throttle valve means for actuating said throttle valve means including means for storing in addressable data registers functional relationships between static torque capacity and said engine combustion torque signal values, said means for calculating said static torque signal value including said addressable data registers;

each ratio shift corresponding to a separate one of said functional relationships and having a discrete slope value and a discrete constant intercept value;

said means for calculating an inertia torque signal value during ratio shifts including other addressable data registers in said microprocessor containing functional relationship between engine throttle position and inertia torque signal values;

means for adding said inertia torque signal value and said static torque signal value to obtain an effective torque signal output received by said solenoid operated valve means to establish optimum pressure control for each of said servo means;

a timer means for establishing a calibrated time for a ratio change to occur following initiation of a ratio change to said one underdrive ratio from a higher ratio;

means initiated by actuation of said timer means for augmenting the effective torque signal value at the beginning of said ratio change relative to the effective torque signal value calculated during a final stage of said ratio change;

the torque transmitting capacity of each servo means being proportional to circuit pressure transferred to it by said shift control valve means, the torque capacity of one servo means falling and the torque capacity of another servo means increasing during an upshift from one ratio to a higher ratio following initiation of said upshift;

and timer means for measuring the time required to complete the torque capacity decrease of said one servo means during said upshift;

said processor having register locations for storing servo pressure multipliers that are addressable and used by said torque signal calculating means;

a low multiplier being fetched when the time measured by said timer means is less than a calibrated range of values and a higher multiplier being fetched when the time measured by said timer means is greater than a calibrated range of values.

35. The combination as set forth in claim 34 wherein said inertia torque signal value calculating means includes means for adding to said inertia torque signal value an incremental torque signal value for upshifts whereby an effective inertia torque signal is greater for upshifts than for downshifts.

36. The combination as set forth in claim 35 wherein said microprocessor includes means for determining a desired gear ratio as part of sequentially executed control loops in response to vehicle speed and torque signals;

means for delaying a command of a change in gear ratio following determination of said desired gear whereby the gear ratio change is verified; and means for timing the actuation of said throttle valve means by said microprocessor means so that a change in said engine torque signal value in response to the actuation by said microprocessor occurs following a determination of a desired gear but before command of a ratio change by said microprocessor is effected.

* * * * *